United States Patent Office 3,255,241
Patented June 7, 1966

3,255,241
(2-ALKYLIDENE ACYL)PHENOXY- AND (2-ALKYL-
IDENE ACYL)PHENYLMERCAPTOCARBOXYLIC
ACIDS
Everett M. Schultz, Ambler, and James M. Sprague,
Gwynedd Valley, Pa., assignors to Merck & Co., Inc.,
Rahway, N.J., a corporation of New Jersey
No Drawing. Filed Dec. 6, 1961, Ser. No. 155,961
36 Claims. (Cl. 260—516)

This application is a continuation-in-part of application Serial No. 83,635, filed January 19, 1961, now abandoned.

This invention is concerned with (α-alkylidene acyl)-phenyl compounds in which said phenyl ring is further linked to an organic carboxylic acid moiety through a divalent atom of Group VI-A of the Periodic Table having an atomic weight less than 33 and in which the said phenyl ring has $n$ further substituents, $n$ being a whole number greater than −1 and less than 5, as well as the salts, esters and amides thereof. More particularly the invention is concerned with (α-alkylidene acyl)phenyl compounds wherein said organic carboxylic acid moiety is selected from an alkanoic acid or an aromatic carboxylic acid having a six membered ring such as benzoic acid or a phenyl alkanoic acid.

This invention more specifically is concerned with (α-alkylidene acyl)phenoxy and (α-alkylidene acyl)phenylmercapto derivatives of monocarboxylic acids wherein the monocarboxylic acid portion thereof is derived from an aliphatic-aliphatic-aromatic- or an aromatic-monocarboxylic acid. These compounds can be illustrated by the structural formula

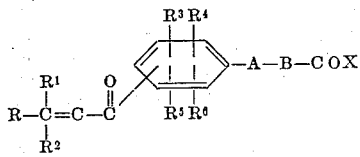

wherein:

R, $R^1$ and $R^2$ respectively is selected from the group consisting of
  Hydrogen;
  Halogen or halogen-like radicals;
  Hydroxyl;
  Lower aliphatic, lower aliphatic-oxy or lower aliphatic-thio, straight or branched chain, saturated or unsaturated, and unsubstituted or substituted, the substituent group(s) being alkyl, amino, halogen-like, carboxyl or substituted carboxyl, cyano, hydroxyl, alkyl thio, aryl thio, arylsulfonyl, alkylsulfonyl, nitro, and the like.
  Alicyclic, either unsubstituted or substituted, the substituent groups being the same as those described above for the aliphatic group;
  Aryl or aryl-oxy or aryl-thio, especially phenyl, phenoxy or phenylthio, wherein the aryl-(phenyl) moiety can be unsubstituted or a substituent can be attached to one or more of its carbon atoms selected advantageously from lower, straight or branched chain—alkyl, alkoxy, alkylthio, hydroxyl, halogen or halogen-like;
  Arylaliphatic, especially a mononuclear-arylaliphatic, advantageously phenalkyl which can be attached through an oxygen or a sulfur atom to the grouping

and which is either unsubstituted or substituted in the aryl and/or alkyl portions by substituents of the type hereinbefore described;

Cyano; and wherein R and $R^2$ additionally can be linked together to form preferably a 5 to 6 carbon ring with the carbons to which they are attached;

$R^3$, $R^4$, $R^5$ and $R^6$ respectively can represent the same or different group selected from hydrogen, halogen, lower aliphatic, straight or branched chain;

Lower aliphatic-oxy or lower aliphatic-thio, straight or branched chain; unsubstituted or having a substituent of the type described above for attachment to the lower aliphatic group; and wherein the lower aliphatic-oxy or lower aliphatic-thio is advantageously lower alkoxy or lower-alkylthio, unsubstituted or substituted, as, for example, carboxyalkoxy, carboxyalkylthio, and the like;

Aliphaticsulfonyl, especially an alkylsulfonyl;
Hydroxy;
Nitro;
Amino;

Carboxy or substituted carboxy, especially carbamoyl and N-substituted carbamoyl;

Aryl, especially phenyl, unsubstituted or substituted as described above for attachment to aryl (phenyl) moieties; or wherein $R^3$ and $R^4$ and/or
$R^5$ and $R^6$ can additionally be linked together to form, with the ring carbons to which they are attached, a 5- or 6-membered carbocyclic ring;

A represents oxygen or sulfur which can be oxidized to the sulfoxide or sulfone.

B represents a divalent aliphatic, aromatic or aliphatic-aromatic group, preferably a straight or branched chain lower aliphatic group which can contain oxygen or sulfur atoms as part of the aliphatic chain; a phenyl-lower alkyl, or a phenyl group.

X represents hydroxyl or salts of the resulting acids, i.e., metal salts, especially sodium, potassium, calcium and the like or amine salts; alkoxy, unsubstituted or substituted, the substituent(s) being dialiphatic amino and the like; amino, such as an amino group of the structure —$NR^7R^8$ wherein $R^7$ and $R^8$ are the same or different; aliphatic, unsubstituted or substituted, group or aromatic, unsubstituted or substituted, group, especially substituted phenyl or $R^7$ and $R^8$ can be joined together to form, with the nitrogen atom to which they are attached, a hetero ring containing one or more hetero atoms as morpholinyl, piperazinyl, pyrrolidyl and the like;

Hydrazine, unsubstituted or substituted, advantageously with lower-alkyl group or groups.

In the above definitions and in the claims, the term halogen embraces halogen-like groups and represents chlorine, bromine, iodine, fluorine, halomethyl especially trichloromethyl, trifluoromethyl and the like. Also in the above definitions and in the claims, the term amino should be understood to embrace primary, secondary and tertiary amino groups; including N-containing heterocycles as piperidyl, pyrrolidyl, morpholinyl, N-lower alkyl-piperazinyl and the like, as well as the usual pharmaceutically acceptable salts thereof.

The compounds of this invention and particularly compounds having the structure illustrated above wherein at least one lower aliphatic or aromatic group is attached to the α-alkylidene acyl portion of the compound, as well as derivatives thereof or precursors thereof which will generate the α-alkylidene acyl compounds of this invention upon administration possess diuretic, natriuretic and chloruretic properties and are therefore useful in the treatment of many ailments resulting from an excessive retention of electrolytes especially sodium chloride or sodium and chloride ions, as in the treatment of hypertension, edema and other conditions associated with electrolyte and fluid retention. These compounds also can be used in increase urine flow. Exceptionally good activity is exhibited by (α-alkylidene acyl)phenoxyacetic acid and (α-alkylidene acyl)phenylmercaptoacetic acid compounds wherein the α-alkylidene moiety is lower-aliphatic and wherein at least one substituent, advantageously a halogen or halogen-like or lower alkyl substituent is attached to the phenyl ring.

Pharmacological studies of the products of this invention demonstrate that they possess the unique property among diuretic agents in that they can cause from 2 to 5 times more electrolyte to be excreted than can be caused to be excreted by known diuretic agents. Thus, while most known diuretic agents reach a threshold or ceiling in the amount of electrolyte they can cause to be excreted (which is not exceeded even when the dose of agent is increased), the compounds of this invention can bring about the excretion of from 2 to 5 or more times this ceiling value.

While a single dose of a compound of this invention can cause a very large amount of electrolyte to be excreted, especially when the compound is administered intravenously, the activity of the product decreases rapidly to about the ceiling excretion value of, for example, the thiazide type diuretic agents. It is thus possible to use the products of this invention to achieve a very rapid and marked removal of electrolytes without danger of electrolyte depletion.

The α-methyleneacylphenoxy-and the α-methyleneacylphenylmercapto derivatives of organic carboxylic acids and especially organic monocarboxylic acids, generally are prepared by converting the corresponding saturated acyl compounds which lack the α-methylene group to a salt of a Mannich base by reaction with a salt of a secondary amine as a di-lower alkylamine, or cyclic amine as piperidine, morpholine and the like in the presence of formaldehyde or paraformaldehyde. Treatment of the Mannich salt with a weak base such as sodium bicarbonate either with or without heat gives the desired unsaturated acyl compound.

The salts of the Mannich bases prepare by the above procedure are new products and form another feature of this invention. It has been found that these compounds also possess saluretic and diuretic properties.

When the starting material in the above procedure is a saturated acylphenoxy- or saturated acylphenylmercapto derivative having two methyl groups and a hydrogen attached to the carbon adjacent to the carbonyl group of the acyl function, the unsaturated acyl group is formed by brominating the saturated acyl group and then removing hydrogen bromide, thus introducing a double bond, by treatment with dehydrohalogenating agents such as silver acetate or silver fluoride in benzene or lithium chloride in dimethylformamide and the like. If one of the methyl groups in the above starting material is replaced by ethyl or a higher alkyl, unsaturation will occur mainly between said higher alkyl group and the carbon in alpha position to the carbonyl function. When each of the methyl groups in the above starting material is replaced by a higher alkyl group, unsaturation will mainly occur between the α-carbon and the alkyl group having the larger number of carbon atoms.

When it is desired to prepare compounds having an unsaturated acyl group of the type

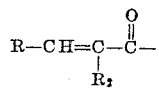

wherein R is an unsubstituted or substituted aryl (i.e. phenyl) group and R² is hydrogen or a group of the type hereinabove included in the definition of R², these compounds preferably are prepared by condensing, for example, benzaldehyde, in an alkaline medium with the saturated acylphenoxy- or acylphenylmercapto compound, that is one having the saturated acyl grouping

and then treating the intermediate product formed with acid to produce the unsaturated grouping illustrated above.

The saturated acylphenoxy- and the saturated acylphenylmercapto- derivatives of monocarboxylic acids employed as starting materials in the foregoing procedures can be prepared by the following methods.

The Friedel-Craft reaction can be used to prepare the saturated acyl intermediates wherein the acyl group is a straight chain, or if branched, the branching is either at least two carbons removed from the carbonyl function or if the branching occurs on the α-position carbon, it is the methyl group. These compounds can be prepared by reacting together the selected acyl halide and selected phenoxy- or phenylmercapto-monocarboxylic acid in the presence of aluminum chloride with or without a solvent such as carbon disulfide.

The acyl halides that do not react with the phenoxy-monocarboxylic acids by the above procedure generally will react with the corresponding anisoles or phenetoles in the presence of aluminum chloride and a solvent such as ligroin (petroleum ether). When a phenetole is employed, an excess of aluminum chloride can be employed to simultaneously convert the ethoxy to the hydroxy group in the end product. When an anisole is employed, the intermediate acyl-substituted anisole is converted to the acylphenol by subsequent treatment with aluminum chloride advantageously with heating in the presence of a solvent such as heptane.

Some acylphenols can also be obtained from the corresponding phenols and required carboxylic acid in the presence of boron trifluoride.

The acylphenol obtained by any of the above procedures then can be reacted with an α-halo ester, for example, a haloacetate, and the acylphenoxyacetate thus obtained treated with alkali to form the acylphenoxyacetic acid or other desired acylphenoxy derivative of a monocarboxylic acid.

The ortho-acylphenols can be made by the Fries rearrangement wherein the selected phenol is esterified with an acid halide and the resulting ester is heated with aluminum chloride causing the acyl group to enter the ring.

The saturated acylphenoxy- or acylphenylmercapto derivatives of organic carboxylic acids also can be prepared by hydrogenation of the (α-alkylidene acyl)phenyl derivative of an organic carboxylic acid to produce the corresponding alkylacylphenyl derivative of an organic carboxylic acid.

While the above discussion outlines general methods suitable for the preparation of the novel compounds of this invention, it is to be understood that the methods described above as well as those described in the following examples are illustrative of those methods which can be employed and are not to be construed as limiting the invention to the particular methods or the particular compounds specifically described.

The words "Mannich cpd." used in the following examples refer to the salts of the Mannich bases prepared by a procedural step described in the example.

EXAMPLE 1

*4-methacryloylphenoxyacetic acid*

STEP A.—PREPARATION OF 4-ISOBUTYRYLPHENOXY-ACETIC ACID

Powdered aluminum chloride (160 g., 1.2 mole) and carbon disulfide (200 ml.) are placed in a 1-liter, 4-necked flask equipped with a stirrer, dropping funnel, reflux condenser and internal thermometer. Phenoxyacetic acid (61 g., 0.4 mole) is added in portions with stirring and then isobutyryl chloride (53.5 g., 0.5 mole) is added dropwise with stirring over a period of 0.5 hour at a temperature of about 22–26° C. After stirring 1 hour at room temperature, the reaction flask was placed in a water bath and the temperature maintained at 50° C. for 3 hours. The carbon disulfide then is decanted and the aluminum complex remaining is added to a mixture of 500 g. of ice and 125 ml. of concentrated hydrochloric acid. The yellow oil that forms is separated giving 51.6 g. of 4-isobutyrylphenoxyacetic acid, B.P. 185–190° C. (1 mm. pressure).

STEP B.—PREPARATION OF 4-(2-BROMOISOBUYTRYL) PHENOXYACETIC ACID 4-isobutyrylphenoxyacetic acid (35.6 g., 0.16 mole) is added to 125 ml. of glacial acetic acid at room temperature. Bromine (25.7 g., 0.16 mole) in 30 ml. of glacial acetic acid is added dropwise to the reaction mixture at 25° C. with stirring during a period of 1 hour. Stirring is continued an additional hour and then the mixture is added to a mixture of 300 g. of ice and 500 ml. of water. The solid which separates is collected on the filter, washed and recrystallized from benzene to give 33 g. of 4-(2-bromoisobutyryl)phenoxyacetic acid, M.P. 144–145° C.

Analysis.—Calculated for $C_{12}H_{13}BrO_4$: Br, 26.54. Found: Br. 26.57.

STEP C.—PREPARATION OF 4-METHACRYLOYL-PHENOXYACETIC ACID

The brominated compound obtained as described in Step B (12 g., 0.04 mole) is dissolved in benzene (800 ml.) and silver acetate (15 g., 0.09 mole) is added. The mixture is stirred and refluxed for 4 hours and then cooled. Water (150 ml.) and 15 ml. of concentrated hydrochloric acid is added whereupon the silver salts precipitate and are removed by filtration. The benzene then is evaporated to a small volume, diluted with hexane, and the solid that separates is crystallized from benzene to give 4-methacryloylphenoxyacetic acid, M.P. 124.5–126.5° C., yield 4.1 g.

Analysis.—Calculated for $C_{12}H_{12}O_4$: C, 65.45; H, 5.49; neut. eq., 220.2. Found: C, 65.65; H, 5.59; neut. eq., 221.7.

EXAMPLE 2

*4-methacryloyl-3-chlorophenoxyacetic acid*

STEP A.—PREPARATION OF 3-CHLOROPHENOXY-ACETIC ACID m-Chlorophenol (64.27 g., 0.5 mole) is added to a solution of sodium hydroxide (75 g., 1.875 mole) in 150 ml. of water. To this is added slowly at 40° C. a solution of chloroacetic acid (80.5 g., 0.852 mole) in 80.5 ml. of water. When the addition is complete, the mixture is heated with stirring on a steam bath for one hour after which the reaction mixture is cooled and 1 liter of water is added. The solution is filtered and acidified to Congo red with concentrated hydrochloric acid and the pink oil that separates is extracted with ether. The ether solution then is extracted with a total of 400 ml. of a 10% sodium bicarbonate solution in several portions to remove the product from unreacted phenol. Acidification of the sodium bicarbonate extract yields an oil that soon solidifies. The solid is collected and dried in an oven at 65° C. to give 67.8 g. (73%) of 3-chlorophenoxyacetic acid, M.P. 110–111° C. (corr.).

STEP B.—PREPARATION OF 4-ISOBUTYRYL-3-CHLOROPHENOXYACETIC ACID

The above product was prepared by substantially the same method described in Example 1, Step A, using the following substances:

Powdered aluminum chloride _____ 83.9 g., 0.63 mole.
Carbon disulfide _____ 200 ml.
m-Chlorophenoxyacetic acid _____ 37.3 g., 0.20 mole.
Isobutyryl chloride _____ 26.6 g., 0.25 mole.

Crude 4-isobutyryl-3-chlorophenoxyacetic acid (23.9 g.) is obtained in the form of a solid which is dissolved in saturated sodium bicarbonate solution. The undissolved yellow solid is removed by filtration and the filtrate acidified with concentrated hydrochloric acid which produces a white precipitate which is collected by filtration and dried at 65° C., yielding 8.93 g. (17.3%) of 4-isobutyryl-3-chlorophenoxyacetic acid, M.P. 137–139° C. (corr.).

Analysis.—Calculated for $C_{12}H_{13}ClO_4$: C, 56.15; H, 5.10; Cl, 13.82. Found: C, 56.04; H, 5.34; Cl, 14.05.

STEP C.—PREPARATION OF 4-(2-BROMOISOBUTYRYL)-3-CHLOROPHENOXYACETIC ACID

The above product was prepared by substantially the same method described in Example 1, Step B, employing the following substances:

3-chloro-4-isobutyrylphenoxy acetic acid _____ 10.17 g., 0.0397 mole.
Glacial acetic acid _____ 250 ml.
Bromine _____ 6.34 g., 0.0397 mole.
Glacial acetic acid _____ 30 ml.

The crude product obtained is crystallized from a mixture of hexane and benzene. Upon cooling the mixture at 5° C. for 1 hour the product precipitates and is collected, dried at 65° C. to give 8.39 g. (63%) of 4-(2-bromoisobutyryl) - 3 - chlorophenoxyacetic acid, M.P. 124.5–125° C. (corr.).

Analysis.—Calculated for $C_{12}H_{12}BrClO_4$: C, 42.94; H, 3.61; Br, 23.81. Found: C, 43.33; H, 3.78; Br. 23.22.

STEP D.—PREPARATION OF 4-METHACRYLOYL-3-CHLOROPHENOXYACETIC ACID

The above product was prepared by substantially the same method described in Example 1, Step C, using the following substances:

4 - (2-bromoisobutyryl) - 3 - chlorophenoxyacetic acid _____ 5 g., 0.0149 mole.
Benzene _____ 200 ml.
Silver acetate _____ 5 g., 0.02990 mole.
Water _____ 150 ml.
Concentrated hydrochloric acid _____ 15 ml.

The crude product separated as a solid which was collected on a filter to give 2.8 g., M.P. 125–127° C. After 4 recrystallizations from benzene there is obtained 1.05 g. of 4-methacrylol-3-chlorophenoxyacetic acid, M.P. 128–129° C. (Corr.)

Analysis.—Calculated for $C_{12}H_{11}ClO_4$: C, 56.54; H, 4.35; Cl, 13.93. Found: C, 56.31; H, 4.45; Cl, 14.10.

The above procedure describes a method by which the phenoxyacetic acids of this invention can be prepared by first making the 2-bromoacylphenoxyacetic acid and then removing hydrogen bromine thereby forming the $\alpha,\beta$-unsaturated acyl group. The following example describes an alternate method for making the same compound which involves first preparing the Mannich cpd. of the saturated acyl moiety and then removing the amine group thus creating the $\alpha,\beta$-unsaturated acyl grouping.

EXAMPLE 3

*4-methacryloyl-3-chlorophenoxyacetic acid*

STEP A.—PREPARATION OF 4-PROPIONYL-3-CHLOROPHENOXYACETIC ACID

The above product is prepared following substantially the same method described in Example 1, Step A, using the substances identified below:

Propionyl chloride _____ 57.8 g., 0.625 mole.
3-chlorophenoxyacetic acid _____ 93.29 g., 0.5 mole.
Powdered aluminum chloride _____ 216 g., 1.625 mole.
Carbon disulfide _____ 400 ml.

There is thus obtained 77 g. of 4-propionyl-3-chlorophenoxyacetic acid, M.P. 108–109.5° C. (Corr.)

Analysis.—Calculated for $C_{11}H_{11}ClO_4$: C, 54.44; H, 4.57; Cl, 14.61. Found: C, 54.88; H, 4.46; Cl, 14.36.

STEP B.—PREPARATION OF 4-(2-DIMETHYLAMINO-METHYLPROPIONYL) - 3 - CHLOROPHENOXYACETIC ACID HYDROCHLORIDE

In a 100 ml. round flask equipped with an outlet tube suitable for application of intermittent suction, an intimate mixture of 4-propionyl-3-chlorophenoxyacetic acid (14.52 g., 0.06 mole), paraformaldehyde (2.1 g., 0.072 mole), dry dimethylamine hydrochloride (5.34 g., 0.066 mole) and acetic acid (4 drops) is heated on the steam bath for about 1.5 hours during which period suction is applied for about one-minute intervals five or six times. Upon cooling, a solid (19 g.) is obtained, which after triturating with ether melts at 147–149° C. Upon recrystallization from methanol there is obtained 4-[2-(dimethylaminomethyl)propionyl] - 3 - chlorophenoxyacetic acid hydrochloride, M.P. 158–160° C.

*Analysis.*—Calculated for $C_{14}H_{18}ClNO_4 \cdot HCl$: C, 50.09; H, 5.69; N, 4.16. Found: C, 49.98; H, 5.71; N, 4.10.

STEP C.—PREPARATION OF 4-METHACRYLOYL-3-CHLOROPHENOXYACETIC ACID

The Mannich cpd. obtained as described in Step B (1 g., 0.003 mole) is dissolved in 25 ml. of water and the solution made slightly basic by the addition of 10% sodium bicarbonate solution. The resulting solution is heated for 25 minutes on a steam bath, cooled and acidified with 6 N hydrochloric acid to give 0.7 g. of solid 4-methacryloyl-3-chlorophenoxyacetic acid, M.P. 125–127° C. After recrystallization from benzene the product melts at 127–128° C., yield 0.5 g. (66%).

The procedures described in Example 3, Steps A and B, are found to be entirely suitable for the preparation of salts of the novel Mannich base intermediates of this invention. While salts of Mannich base intermediates were not prepared in every instance when making the α,β-unsaturated acyl-substituted phenoxyacetic acids, it is possible to prepare substantially all of the novel compounds of this invention by first making the Mannich intermediate by the above described procedure.

EXAMPLE 4

*3-chloro-4-[3-(dimethylamino)propionyl]phenoxyacetic acid hydrochloride*

STEP A.—PREPARATION OF 3-CHLORO-4-ACETYL-PHENOXYACETIC ACID

The above product is obtained by following substantially the same method described in Example 3, Step A, using the ingredients listed below:

3-chlorophenoxyacetic acid _____ 17.06 g., 0.1 mole.
Acetyl chloride _____ 7.85 g., 0.125 mole.
Powdered aluminum chloride _____ 43.5 g., 0.325 mole.
Carbon disulfide _____ 150 ml.

The product obtained is reprecipitated from a sodium bicarbonate solution by acidification with hydrochloric acid to give a white solid which, when crystallized from benzene, gives 4.94 g. of 3-chloro-4-acetylphenoxyacetic acid, M.P. 107–109° C.

*Analysis.*—Calculated for $C_{10}H_9ClO_4$: C, 52.53; H, 3.97; Cl, 15.51. Found: C, 52.29; H, 4.35; Cl, 15.24.

STEP B.—PREPARATION OF 3-CHLORO-4-[3-(DIMETHYLAMINO)PROPIONYL]PHENOXYACETIC ACID HYDROCHLORIDE

The above product is prepared following substantially the same procedure described in Example 3, Step B, using the substances given below:

3-chloro-4-acetylphenoxyacetic
  acid _____ 13.68 g., 0.06 mole.
Paraformaldehyde _____ 2.1 g., 0.072 mole.
Dimethylamine hydrochloride ____ 5.34 g., 0.066 mole.
Acetic acid _____ 8 drops.

The solid product that forms is dissolved in methanol (40 ml.) and ether is added until precipitation is complete. The solid then is collected and washed with ether to give 15.4 g. of product, M.P. 127–136° C. which, after crystallization from isopropyl alcohol and then from ethanol, gives 4 g. of 3-chloro-4-[3-(dimethylamino)propionyl]phenoxyacetic acid hydrochloride, M.P. 143–145° C.

*Analysis.*—Calculated for $C_{13}H_{16}ClNO_4 \cdot HCl$: C, 48.46; H, 5.32; Cl, 22.01; N, 4.35. Found: C, 48.64; H, 5.75; Cl, 21.45; N, 4.23.

The following examples describe methods by which derivatives of the α,β-unsaturated acyl-phenoxyacetic acid compounds of this invention can be prepared. Example 5 describes a method by which a mercaptan is added across the double bond. Other examples hereinbelow describe methods for adding hydrogen bromide across the double bond, or adding halogen across the double bond and the like.

EXAMPLE 5

*4-[2-(carboxymethylmercaptomethyl)propionyl]-3-chlorophenoxyacetic acid*

Equimolecular amounts of 4-methacryloyl-3-chlorophenoxyacetic acid, prepared as described in either Example 2 or 3, and thioglycollic acid are heated on a steam bath for about 5 minutes. The solid product that forms on cooling is recrystallized from benzene to give 4 - [2 - (carboxymethylmercaptomethyl)propionyl] - 3 - chlorophenoxyacetic acid which has a melting point at about 102° C.

*Analysis.*—Calculated for $C_{14}H_{16}ClO_6S$: C, 48.34; H, 4.64; Cl, 10.02. Found: C, 48.58; H, 4.82; Cl, 10.08.

EXAMPLE 6

*4-(2-bromopropionyl)-3-chlorophenoxyacetic acid*

4-propionyl-3-chlorophenoxyacetic acid prepared as described in Example 3, Step A, (10.7 g., 0.04 mole) in 90 ml. of acetic acid is treated with an equimolecular quantity of bromine by substantially the same method described in Example 1, Step B, to give 12 g. of 4-(2-bromopropionyl) - 3 - chlorophenoxyacetic acid, M.P. 151–153° C. After recrystallization from a 5:2 mixture of hexane and isopropyl alcohol, the product melts at 152–154° C.

*Analysis.*—Calculated for $C_{10}H_{10}BrClO_4$: C, 41.08; H, 3.13; Br, 24.85; Cl, 11.04. Found: C, 40.85; H, 3.13; Br, 24.70; Cl, 10.88.

EXAMPLE 7

*4-methacryloyl-2-chlorophenoxyacetic acid*

STEP A.—PREPARATION OF 4-PROPIONYL-2-CHLOROPHENOXYACETIC ACID

The above product is prepared following substantially the same method described in Example 1, Step A, using the ingredients given below:

Propionyl chloride _____ 15.5 g., 0.168 mole.
2-chlorophenoxyacetic acid _____ 25 g., 0.134 mole.
Powdered aluminum chloride ___ 58 g., 0.435 mole.
Carbon disulfide _____ 200 ml.

There is thus obtained 22 g. of 4-propionyl-2-chlorophenoxyacetic acid which after crystallization from benzene melts at 147–148° C. (Corr.)

*Analysis.*—Calculated for $C_{11}H_{11}ClO_4$: C, 54.44; H, 4.57; Cl, 14.61. Found: C, 54.64; H, 4.79; Cl, 14.43.

STEP B.—PREPARATION OF 4-[2-(DIMETHYLAMINO-METHYL)PROPIONYL] - 2 - CHLOROPHENOXYACETIC ACID HYDROCHLORIDE

The above product is prepared following substantially the same procedure described in Example 3, Step B, using the products given below:

4-propionyl-2-chlorophenoxy-
  acetic acid _____ 13.9 g., 0.0604 mole.
Paraformaldehyde _____ 1.99 g., 0.0665 mole.
Dimethylamine hydrochloride __ 4.94 g., 0.0604 mole.
Acetic acid _____ 8 drops.

The product (3.36 g.) is obtained in the form of a solid, and after crystallization from isopropyl alcohol, melts at 175.5–176.5° C.

STEP C.—PREPARATION OF 4-METHACRYLOYL-2-CHLOROPHENOXYACETIC ACID

The Mannich cpd., prepared as described in Step B, (3.36 g., 0.01 mole) is dissolved in 30 ml. of water and the solution made basic with 10% sodium bicarbonate. The mixture is heated at 80° C. for 30 minutes, cooled and acidified with 6 N hydrochloric acid. The gummy precipitate that separates is taken up in dilute sodium bicarbonate solution and reprecipitated with hydrochloric acid. After drying, the product is recrystallized from a 2:1 mixture of cyclohexane and benzene and then crystallized again from benzene to give 0.7 g. of 4-methacryloyl-2-chlorophenoxyacetic acid, M.P. 122–124° C.

*Analysis.*—Calculated for $C_{12}H_{11}ClO_4$: C, 56.59; H, 4.35; Cl, 13.93. Found: C, 56.53; H, 4.67; Cl, 13.74.

EXAMPLE 8

*4-(2-methylenebutyryl)-phenoxyacetic acid*

STEP A.—PREPARATION OF 4-BUTYRYLPHENOXYACETIC ACID

A dry, 1-liter, round flask is equipped with a stirrer and reflux condenser. Into the flask is placed n-butyryl chloride (13.18 g., 0.125 mole), phenoxyacetic acid (15.21 g., 0.1 mole) and carbon disulfide (240 ml.). Aluminum chloride (43.5 g., 0.325 mole) is added in small portions at 10° with mechanical stirring. After half of the aluminum chloride is added, the mixture becomes quite viscous and the remainder of the aluminum chloride is added with hand stirring. When the mixture becomes mobile enough, mechanical stirring is resumed and continued for 1 hour. The mixture then is heated at 50° C. with stirring for an additional three hours. The carbon disulfide is decanted and the residue is added to a mixture of 1 kg. of ice and 30 ml. of concentrated hydrochloric acid. The oil that separates is extracted with ether and the ether extract then is extracted with 10% sodium bicarbonate solution. The bicarbonate extract is acidified with concentrated hydrochloric acid to give 17.09 g. of 4-butyrylphenoxyacetic acid which, after crystallization from acetonitrile, melts at 137–139° C.

*Analysis.*—Calculated for $C_{12}H_{14}O_4$: C, 64.85; H, 6.35. Found: C, 64.69; H, 6.53.

STEP B.—PREPARATION OF 4-[2-(DIMETHYLAMINOMETHYL)BUTYRYL]PHENOXYACETIC ACID HYDROCHLORIDE

The above product was prepared following substantially the same method described in Example 3, Step B, using the products listed below:

4-butyrylphenoxyacetic acid _____ 11.1 g., 0.05 mole.
Paraformaldehyde _____ 1.5 g., 0.05 mole.
Dimethylamine hydrochloride _____ 4.05 g., 0.05 mole.
Acetic acid _____ 4 drops.

The waxy solid obtained is triturated with 20 to 30 ml. of acetone and 125 ml. of ether is added to produce a solid (15 g.) which melts at 148–150° C. After recrystallization from isopropyl alcohol, acetonitrile and isopropyl alcohol there is obtained 4-[2-(dimethylaminomethyl)butyryl]phenoxyacetic acid hydrochloride melting at 160–161° C.

*Analysis.*—Calculated for $C_{15}H_{21}NO_4 \cdot HCl$: C, 57.05; H, 7.02; N, 4.44. Found: C, 57.05; H, 7.40; N, 4.30.

STEP C.—PREPARATION OF 4-(2-METHYLENEBUTYRYL)PHENOXYACETIC ACID

The Mannich cpd. prepared as described in Step B (10 g.) is dissolved in a 5 mole excess of 10% sodium bicarbonate solution and the solution heated at 80–90° C. for 1¼ hours, cooled and acidified with 6 N hydrochloric acid. The solid that separates is reprecipitated from sodium bicarbonate solution and crystallized from benzene to give 3.2 g. of 4-(2-methylenebutyryl)phenoxyacetic acid, M.P. 110–111° C.

*Analysis.*—Calculated for $C_{13}H_{14}O_4$: C, 66.65; H, 6.02. Found: C, 66.68; H, 6.19.

EXAMPLE 9

*3-fluoro-4-(2-methylenebutyryl)phenoxyacetic acid*

STEP A.—PREPARATION OF 3-FLUORO-4-BUTYRYLPHENOXYACETIC ACID

The above product is prepared following substantially the same procedure described in Example 1; Step A, using the following products:

3-fluorophenoxyacetic acid _____ g__ 42.5
n-Butyryl chloride _____ g__ 33.3
Carbon disulfide _____ ml__ 230
Aluminum chloride _____ g__ 108.5

There thus is obtained 3-fluoro-4-butyrylphenoxyacetic acid which after crystallization from 1000 ml. of benzene melts at 131.5–133.5° C. (yield, 40 g., 67%).

STEP B.—PREPARATION OF 3-FLUORO-4-[2-(DIMETHYLAMINMETHYL)BUTYRYL]PHENOXYACETIC ACID HYDROCHLORIDE

This Mannich cpd. is prepared by following substantially the same procedure described in Example 3, Step B, employing the ingredients listed below:

3-fluoro-4-butyrylphenoxyacetic acid _____ g__ 9.6
Paraformaldehyde _____ g__ 1.4
Dimethylamine hydrochloride _____ g__ 3.56
Glacial acetic acid _____ ml__ 0.5

The viscous, homogeneous mixture obtained is dissolved in 100 ml. of isopropyl alcohol, filtered and the product precipitated with 100 ml. of ether. The product is again recrystallized from a mixture of isopropyl alcohol and ether to give 9.6 g. (73%) of 3-fluoro-4[2-(dimethylaminomethyl)butyryl]phenoxyacetic acid hydrochloride, M.P. 173.5–175.5° C.

*Analysis.*—Calculated for $C_{15}H_{21}ClFNO_4$: C, 53.97; H, 6.34; N, 4.20. Found: C, 54.16; H, 6.63; N, 4.07.

STEP C.—PREPARATION OF 3-FLUORO-4-(2-METHYLENEBUTYRYL)PHENOXYACETIC ACID

A 300 ml. 3-necked round-bottomed flask fitted with stirrer, condenser, dropping funnel and calcium chloride tube is charged with 10.3 g. of 3-fluoro-4-[2-(dimethylaminomethyl)butyryl]phenoxyacetic acid hydrochloride and 100 ml. of 0.31 molar sodium hydroxide in isopropyl alcohol. Methyl iodide, 52 g., is added dropwise over two hours while the mixture is stirred and heated at 90° C. on a steam bath. The alcohol and excess methyl iodide are removed in vacuo, the residue dissolved in 150 ml. of water and 50 ml. of saturated aqueous sodium bicarbonate and heated on the steam bath for 75 minutes. After cooling, the solution is acidified with concentrated HCl, extracted with 300 ml. of ether and the ether extract dried over sodium sulfate. The ether is removed in vacuo and the residue (5.4 g.) dissolved in 40 ml. of hot benzene, treated with 125 ml. of warm cyclohexane and cooled. The light yellow solid which forms is recrystallized from a mixture of benzene and cyclohexane, filtered and dried to give 3-fluoro-4-(2-methylenebutyryl)phenoxyacetic acid, M.P. 84–85.5° C. (Corr.)

*Analysis.*—Calculated for $C_{13}H_{13}FO_4$: C, 61.90; H, 5.20. Found: C, 62.35; H, 5.35.

EXAMPLE 10

*4-(2-methylenebutyryl)-3-chlorophenoxyacetic acid*

STEP A.—PREPARATION OF 4-BUTYRYL-3-CHLOROPHENOXYACETIC ACID

This product is prepared by substantially the same method as described in Example 1, Step A, using the substances listed below:

Aluminum chloride _____ 217 g., 1.625 moles.

Carbon disulfide _____ 400 ml.
3-chlorophenoxyacetic acid _____ 93.3 g., 0.5 mole.
n-Butyryl chloride _____ 66.6 g., 0.625 mole When the carbon disulfide is decanted, a gummy reaction product is obtained which is added to a mixture of ice (1 kg.) and concentrated hydrochloride acid (100 ml.). A solid separates and is dissolved in saturated sodium bicarbonate solution (1.5 liters). The solution is filtered, and the clear yellow filtrate obtained is acidified with hydrochloric acid. The yellow oil that separates solidifies slowly to give a solid melting at 76–85° C. After recrystallization from benzene, there is obtained 66.7 g. (51%) of 4-butyryl-3-chlorophenoxyacetic acid, M.P. 89–90° C.

*Analysis.*—Calculated for $C_{12}H_{13}ClO_4$: C, 56.15; H, 5.10; Cl, 13.81. Found, C, 56.24; H, 5.43; Cl, 13.57.

STEP B.—PREPARATION OF 4-[2-(DIMETHYLAMINOMETHYL)BUTYRYL] - 3 - CHLOROPHENOXYACETIC ACID HYDROCHLORIDE

This Mannich cpd. is prepared by substantially the same procedure described in Example 3, Step B, using the following products:

4-butyryl-3-chlorophenoxyacetic acid _ 5.12 g., 0.02 mole.
Paraformaldehyde _____ 0.7 g., 0.022 mole.
Dimethylamine hydrochloride _____ 1.78 g., 0.02 mole.
Acetic acid _____ 4 drops.

Following the heating of the reaction mixture as described in Example 3, Step B, it is cooled and then triturated with acetone. The white solid that forms is crystallized from acetonitrile and from isopropyl alcohol to give 4 - [2-(dimethylaminomethyl)butyryl] - 3 -chlorophenoxyacetic acid hydrochloride, M.P. 127–129° C.

*Analysis.*—Calculated for $C_{15}H_{20}ClNO_4 \cdot HCl$: C, 51.44; H, 6.04; Cl, 20.25. Found: C, 51.32; H, 5.90; Cl, 20.19.

STEP C.—PREPARATION OF 4-(2-METHYLENEBUTYRYL)-3-CHLOROPHENOXYACETIC ACID

The Mannich cpd. obtained as described in Step B is treated with 10% sodium bicarbonate by substantially the same method described in Example 3, Step C, to give 3.7 g. (69%) of crude product, M.P. 108–109.5° C. After recrystallization from a mixture of cyclohexane and benzene there is obtained 4-(2-methylenebutyryl)-3-chlorophenoxyacetic acid in the form of a colorless crystal, M.P. 109–111° C.

*Analysis.*—Calculated for $C_{13}H_{13}ClO_4$: C, 58.11; H, 4.88; Cl, 13.20. Found: C, 57.87; H, 5.05; Cl, 13.02.

The following example describes the preparation of a derivative of the product thus obtained wherein hydrogen bromide is added across the double bond of the 2-methylenebutyryl moiety.

EXAMPLE 11

*3-chloro-4-[2-(bromomethyl)butyryl]phenoxyacetic acid*

3-chloro-4 - (2-methylenebutyryl)phenoxyacetic acid, obtained as described in Example 10, (5 g., 0.0186 mole) is dissolved in dry ether (25 ml.) and treated with dry ether saturated with dry hydrogen bromide at 25° C. There is an immediate exothermic reaction with the deposition of a white solid. After standing for an hour, the solid is removed by filtration and dried. The yield is 5.25 g. of 3-chloro-4-[2-(bromomethyl)butyryl]phenoxyacetic acid, M.P. 137–140.5° C. Concentration of the mother liquors gives another 0.66 g. of slightly lower melting material, bringing the total to 5.91 g. (91%). The combined products are recrystallized several times from benzene to give material melting at 140.5–142.5° C. (Corr.)

*Analysis.*—Calculated for $C_{13}H_{14}BrClO_4$: C, 44.66; H, 4.04; Cl, 44.97; H, 3.94; Br, 22.62.

The following example describes the preparation of another derivative wherein hydrogen chloride is added across the double bond of the 2-methylenebutyryl moiety of the compound prepared as described in Example 10.

EXAMPLE 12

*3-chloro-4-[2-(chloromethyl)butyryl]phenoxyacetic acid*

3-chloro-4 - (2-methylenebutyryl)phenoxyacetic acid, prepared as described in Example 10, (2 g., 0.0074 mole) is dissolved in dry ether (20 ml.) and treated with a saturated solution of dry hydrogen chloride in dry ether (20 ml.). A white solid soon separates from the solution. After standing for an hour at room temperature, the mixture is filtered to give 1.75 g. (77%) of 3-chloro-4-[2-(chloromethyl)butyryl]phenoxyacetic acid in the form of a white solid, M.P. 139.5–141.5° C. After recrystallization from benzene, the melting point is 142–143° C. (Corr.)

*Analysis.*—Calculated for $C_{13}H_{14}Cl_2O_4$: C, 51.17; H, 4.62; Cl, 23.24. Found: C, 51.64; H, 4.92; Cl, 22.90.

The following example describes the preparation of still another derivative of the product prepared as described in Example 10 wherein ethyl mercaptan is added across the doubled bond of the 2-methylenebutyryl moiety of the compound.

EXAMPLE 13

*3-chloro-4-[2-(ethylmercaptomethyl)butyryl]phenoxyacetic acid*

3-chloro-4 - (2-methylenebutyryl)phenoxyacetic acid, prepared as described in Example 10, (4.03 g., 0.015 mole) and ethyl mercaptan (12.4 g., 0.2 mole) are dissolved in dry ether (15 ml.) and the stoppered solution allowed to stand at room temperature for 48 hours. The volatile materials are evaporated at room temperature and the white solid that remains weighs 4.65 g. (70%) and has a melting point of 86–89° C. Several recrystallizations of this material from a mixture of benzene and cyclohexane give 3-chloro-4 - [2-(ethylmercaptomethyl)butyryl]phenoxyacetic acid, M.P. 88–90° C. (Corr.)

*Analysis.*—Calculated for $C_{15}H_{19}ClO_4S$: C, 54.46; H, 5.79. Found: C, 54.94; H, 5.90.

The following example describes the preparation of another derivative of the product prepared as described in Example 10, wherein two atoms of bromine are added across the double bond of the 2-methylenebutyryl moiety of the compound.

EXAMPLE 14

*3-chloro-4-[2-bromo-2-(bromomethyl)butyryl]-phenoxyacetic acid*

3 - chloro-4-(2-methylenebutyryl)phenoxyacetic acid (4.03 g., 0.015 mole) is dissolved in 150 ml. of boiling carbon tetrachloride and a solution of bromine (2.4 g., 0.015 mole) in 50 ml. of carbon tetrachloride is added over a period of 5 minutes. The bromine color rapidly disappears after addition to the boiling solution. The solution is cooled and the white solid that separates is removed by filtration and washed with fresh carbon tetrachloride to yield 5.94 g. (92%) of 3-chloro-4-[2-bromo-2-(bromomethyl)butyryl]phenoxyacetic acid, M.P. 146–149° C. The product is recrystallized alternately from toluene and then acetonitrile to give material melting at 153.5–155° C. (Corr.)

*Analysis.*—Calculated for $C_{13}H_{13}Br_2ClO_4$: C, 36.44; H, 3.06; Br, 37.30. Found: C, 36.81; H, 3.09; Br, 37.04.

EXAMPLE 15

*2,3-dichloro-4-(2-methylenebutyryl)phenoxyacetic acid*

STEP A.—PREPARATION OF 2,3-DICHLORO-4-BUTYRYLPHENOXYACETIC ACID

The above product is prepared employing substantially the same techniques and apparatus described in Example 1, Step A, using the following products:

2,3-dichlorophenoxyacetic acid _____ 22.1 g., 0.1 mole.
n-Butyryl chloride _____ 21.3 g., 0.2 mole.
Powdered aluminum chloride _____ 53.3 g., 0.4 mole.

The 2,3-dichlorophenoxyacetic acid and n-butyryl chloride are placed in the reaction vessel and stirred while the aluminum chloride is added portionwise over a 45 minute period. The mixture then is heated on the steam bath for 3 hours, and allowed to cool to room temperature. The gummy product obtained is added to a mixture of 300 ml. of crushed ice and 30 ml. concentrated hydrochloric acid. The resulting mixture is extracted with ether, and the extract evaporated at reduced pressure. The residue is suspended in boiling water and dissolved by addition of a minimum quantity of 40% sodium hydroxide. After treatment with decolorizing charcoal and filtering, the hot filtrate is made acid to Congo red paper and chilled in ice. The oil that separates is extracted with ether, the extract dried over anhydrous sodium sulfate and then evaporated at reduced pressure. The residue is dissolved in boiling benzene (75 ml.) treated with decolorizing charcoal, filtered, treated with boiling cyclohexane (275 ml.) and cooled to give 22.3 g. of 2,3-dichloro-4-butyrylphenoxyacetic acid. After several recrystallizations from a mixture of benzene and cyclohexane, then from methylcyclohexane, next from a mixture of acetic acid and water, and finally from methylcyclohexane, the product melts at 110–111° C. (Corr.)

*Analysis.*—Calculated for $C_{12}H_{12}Cl_2O_4$: C, 49.51; H, 4.15; Cl, 24.36. Found: C, 49.81; H, 4.22; Cl, 24.40.

STEP B.—PREPARATION OF 2,3-DICHLORO-4-[2-(DIMETHYLAMINOMETHYL)BUTYRYL]PHENOXYACETIC ACID HYDROCHLORIDE

The above product is prepared following substantially the same procedure described in Example 3, Step B, using the following substances:

2,3 - dichloro - 4 - butyrylphenoxyacetic acid _____ 5.20 g. (0.0179 mole).
Paraformaldehyde _____ 0.63 g. (0.0209 mole).
Dimethylamine hydrochloride (dry) _____ 1.59 g. (0.0195 mole).
Acetic acid _____ 4 drops.

The crude reaction product is triturated with ether to give 5.8 g. (85%) of 2,3-dichloro-4-[2-(dimethylaminomethyl)butyryl]phenoxyacetic acid hydrochloride in the form of a white solid. After two recrystallizations from a mixture of methanol and ether, the product melts at 165–167° C.

*Analysis.*—Calculated for $C_{15}H_{20}Cl_3NO_4$: C, 46.83; H, 5.24; Cl, 27.65; N, 3.64. Found: C, 46.69; H, 5.31; Cl, 27.59; N, 3.53.

STEP C.—PREPARATION OF 2,3-DICHLORO-4-(2-METHYLENEBUTYRYL)PHENOXYACETIC ACID

The Mannich cpd. obtained as described above is treated with aqueous sodium bicarbonate by substantially the same method described in Example 3, Step C, to form 2,3 - dichloro - 4 - (2 - methylenebutyryl)phenoxyacetic acid, M.P. 115–118° C. Two recrystallizations from a mixture of benzene and cyclohexane give white solid material melting at 118.5–120.5° C.

*Analysis.*—Calculated for $C_{13}H_{12}Cl_2O_4$: C, 51.51; H, 3.99; Cl, 23.39. Found: C, 51.23; H, 4.18; Cl, 23.49.

STEP D.—PREPARATION OF SODIUM 2,3-DICHLORO-4-(2-METHYLENEBUTYRYL)PHENOXYACETATE 2,3 - dichloro - 4 - (2 - methylenebutyryl)phenoxyacetic acid (5.0 g., 0.0165 mole), sodium bicarbonate (1.39 g., 0.0165 mole) and water (50 ml.) are combined to give a clear solution. The solution is evaporated under reduced pressure to give 5.36 g. (theory) of sodium 2,3-dichloro - 4 - (2 - methylenebutyryl)phenoxyacetate in the form of a white solid.

*Analysis.*—Calculated for $C_{13}H_{11}Cl_2NaO_4$: C, 48.02; H, 3.41; Cl, 21.81. Found: C, 48.19; H, 3.31; Cl, 21.71.

EXAMPLE 16

*2,5-dichloro-4-(2-methylenebutyryl)phenoxyacetic acid*

STEP A.—PREPARATION OF 2,5-DICHLORO-4-BUTYRYLPHENOXYACETIC ACID

The above product is prepared following substantially the same procedure described in Example 15, Step A, using the following substances:

2,5-dichlorophenoxyacetic acid _ 70.2 g., 0.318 mole.
Carbon disulfide _____ 450 ml.
Butyryl chloride _____ 42.41 g., 0.398 mole.
Powdered aluminum chloride __ 137.87 g., 1.034 moles.

The product obtained is employed without purification in the following step to prepare the Mannich cpd.

STEP B.—PREPARATION OF 4-[2-(DIMETHYLAMINOMETHYL)BUTYRYL] - 2,5 - DICHLOROPHENOXYACETIC ACID HYDROCHLORIDE

The above product is prepared by substantially the same method described in Example 15, Step B, employing the following materials:

2,5-dichloro-4-butyrylphenoxyacid _____ 55.44 g., 0.1905 mole.
Paraformaldehyde _____ 6.66 g., 0.2219 mole.
Dimethylamino hydrochloride (dry) _____ 16.93 g., 0.2076 mole.
Acetic acid _____ 38 drops.

The Mannich cpd. obtained as described above is employed in the following step without first purifying it.

STEP C.—PREPARATION OF 2,5-DICHLORO-4-(2-METHYLENEBUTYRYL)PHENOXYACETIC ACID

The Mannich cpd. obtained as described above is treated as described in Example 15, Step C, to form 2,5-dichloro-4-(2-methylenebutyryl)phenoxyacetic acid, M.P. 120–123° C., yield 3.2 g. (6%). Two recrystallizations of the product thus obtained from a mixture of benzene and cyclohexane followed by two recrystallizations from methylcyclohexane gives the product in the form of white needles, M.P. 125.7–127.7° C. (Corr.)

*Analysis.*—Calculated for $C_{13}H_{12}Cl_2O_4$: C, 51.51; H, 3.99; Cl, 23.39. Found: C, 51.70; H, 4.23; Cl, 23.58.

EXAMPLE 17

*2,6-dichloro-4-(2-methylenebutyryl)phenoxyacetic acid*

STEP A.—PREPARATION OF 2,6-DICHLORO-4-BUTYRYLPHENOXYACETIC ACID 3,5-dichloro-4-hydroxybutyrophenone [prepared by the Fries rearrangement of 2,6-dichlorophenyl butyrate], (51.5 g., 0.221 mole) in water (250 ml.) is combined with a solution of sodium hydroxide (17.68 g., 0.442 mole) in 35 ml. of water. To the resulting solution at 55° C. is added a solution of chloroacetic acid (20.88 g., 0.221 mole) in 21 ml. of water over a period of 30 minutes at temperature of 55–57° C. with stirring. The temperature is raised to 100° C. and the reaction solution treated simultaneously with a solution of chloroacetic acid (104.40 g., 1.105 moles) in 105 ml. of water and a solution of sodium hydroxide (88.40 g., 2.21 moles) in 180 ml. of water (keeping the reaction solution slightly basic during the entire period) over a period of 10 hours with stirring. The boiling solution is acidified with concentrated hydrochloric acid. The solid that separates after chilling in an ice bath to room temperature is collected, crystallized two times from a mixture of benzene and cyclohexane and then from benzene alone to give 25.4 g. (40%) of 2,6-dichloro-4-butyrylphenoxyacetic acid, M.P. 136–137° C. (Corr.)

*Analysis.*—Calculated for $C_{12}H_{12}O_4Cl_2$: C, 49.51; H, 4.15; Cl, 24.36. Found: C, 49.95; H, 4.23; Cl, 24.08.

STEP B.—PREPARATION OF 4-[2-(DIMETHYLAMINO-METHYL)BUTYRYL] - 2,6 - DICHLOROPHENOXYACE-TIC ACID HYDROCHLORIDE

This Manich cpd. is prepared following substantially the same procedure described in Example 15, Step B, using the following substances:

2,6-dichloro-4-butyrylphenoxy-
  acetic acid _____ 11.65 g., 0.04 mole.
Paraformaldehyde _____ 1.40 g., 0.0466 mole.
Dimethylamine hydrochloride
  (dry) _____ 3.56 g., 0.0436 mole.
Acetic acid _____ 8 drops.

The Mannich cpd. thus obtained is used without purification in the following step to prepare the unsaturated product.

STEP C.—PREPARATION OF 2,6-DICHLORO-4-(2-METH-YLENEBUTYRYL)PHENOXYACETIC ACID

The above product was prepared by substantially the same method as described in Example 15, Step C, from the above Mannich cpd. to give 8.5 g. (70%) of 2,6-dichloro-4- (2-methylenebutyryl)phenoxyacetic acid in the form of a solid, M.P. 77–91° C. Two recrystallizations from methylcyclohexane gives the product in the form of white prisms, M.P. 92–93° C.

Analysis.—Calculated for $C_{13}H_{12}Cl_2O_4$: C, 51.51; H, 3.99; Cl 23.39. Found: C, 51.38; H, 4.15; Cl, 23.54.

EXAMPLE 18

*3-bromo-4-(2-methylenebutyryl)phenoxyacetic acid*

STEP A.—PREPARATION OF 3-BROMO-4-BUTYRYL-PHENOXYACETIC ACID

This product was prepared following substantially the same procedure described in Example 15, Step A, using the following substances:

m-Bromophenoxyacetic acid ___ 130.7 g., 0.566 mole.
Carbon disulfide _____ 450 ml.
Butyryl chloride _____ 75.38 g., 0.7075 mole.
Aluminum chloride _____ 245.3 g., 1.8395 moles.

The crude product obtained is employed with out first purifying it in the following step to prepare the Mannich cpd.

STEP B.—PREPARATION OF 4-[2-(DIMETHYLAMINO-METHYL)BUTYRYL] - 3 - BROMOPHENOXYACETIC ACID HYDROCHLORIDE

The Mannich cpd. is prepared following substantially the same procedure described in Example 15, Step B, using 30.12 g. (0.10 mole) of 3-bromo-4-butyrylphenoxyacetic acid to give 4-[2-(dimethylaminomethyl)butyryl]-3-bromophenoxyacetic acid. The crude product is employed in the following step without first purifying it.

STEP C.—PREPARATION OF 3-BROMO-4-(2-METHYL-ENEBUTYRYL)PHENOXYACETIC ACID

The Mannich cpd. is treated with sodium bicarbonate by substantially the same procedure described in Example 15, Step C, to give 3-bromo-4-(2-methylenebutyryl)phenoxyacetic acid in the form of a solid, M.P. 92–106° C., yield 13.2 g. (42%). Two recrystallizations from a mixture of benzene and cyclohexane give the product in the form of white needles, M.P. 111–112° C.

Analysis.—Calculated for $C_{13}H_{13}BrO_4$: C, 49.86; H, 4.18; Br, 25.52. Found: C, 49.85; H, 4.23; Br, 25.37.

EXAMPLE 19

*3-iodo-4-(2-methylenebutyryl)phenoxyacetic acid*

STEP A.—PREPARATION OF 3-IODO-4-BUTYRYL-PHENOXYACETIC ACID

This product is prepared following substantially the same procedure described in Example 15, Step A, employing the following substances:

m-Iodophenoxyacetic acid _____ 55.61 g., 0.2 mole.
Carbon disulfide _____ 450 ml.
Butyryl chloride _____ 26.64 g., 0.25 mole.
Powdered aluminum chloride _____ 86.67 g., 0.65 mole.

This procedure produces a waxy solid in theoretical yield. After four recrystallizations from a mixture of benzene and cyclohexane and one recrystallization from methylcyclohexane there is obtained 3-iodo-4-butyrylphenoxyacetic acid melting at 86–87° C.

Analysis.—Calculated for $C_{12}H_{13}IO_4$: C, 41.40; H, 3.76; I, 36.45. Found: C, 41.27; H, 3.92; I, 36.23.

STEP B.—PREPARATION OF 4-[2-(DIMETHYLAMINO-METHYL)BUTYRYL] - 3 - IODOPHENOXYACETIC ACID HYDROCHLORIDE

The above Mannich cpd. is prepared following substantially the same procedure described in Example 15, Step B, from 10.44 g. (0.03 mole) of 3-iodo-4-butyrylphenoxyacetic acid. The crude product is used in the following step without first purifying it.

STEP C.—PREPARATION OF 3-IODO-4-(2-METHYLENE-BUTYRYL)PHENOXYACETIC ACID

The Mannich cpd. obtained as described above is treated with sodium bicarbonate solution by substantially the same procedure described in Example 15, Step C, to give 6.4 g. (60%) of 3-iodo-4-(2-methylenebutyryl)phenoxyacetic acid in the form of a solid, M.P. 94–104° C. Three recrystallizations from a mixture of benzene and cyclohexane give the product in the form of white rods, M.P. 106.5–107.5° C.

Analysis.—Calculated for $C_{13}H_{13}IO_4$: C, 43.35; H, 3.64. Found: C, 43.53; H, 3.78.

EXAMPLE 20

*2-methyl-4-(2-methylenebutyryl)phenoxyacetic acid*

STEP A.—PREPARATION OF 2-METHYL-4-BUTYRYL-PHENOXYACETIC ACID

This product is prepared following substantially the same procedure described in Example 1, Step A, using the following substances:

2-methylphenoxyacetic acid _____ g__ 83
n-Butyryl chloride _____ g__ 66.6
Carbon disulfide _____ ml__ 400
Powdered aluminum chloride _____ g__ 217

The above procedure yields 97.5 g. (83%) of 2-methyl-4-butyrylphenoxyacetic acid which after recrystallization from a mixture of benzene and cyclohexane melts at 84–86° C.

Analysis.—Calculated for $C_{13}H_{16}O_4$: C, 66.08; H, 6.83. Found: C, 67.03; H, 6.92.

STEP B.—PREPARATION OF 2-METHYL-4-[2-(DIMETH-YLAMINOMETHYL)BUTYRYL]PHENOXYACETIC ACID HYDROCHLORIDE

The Mannich cpd. is prepared following substantially the same procedures described in Example 3, Step B, employing the following materials:

2-methyl-4-butyrylphenoxyacetic acid _____ g__ 23.6
Paraformaldehyde _____ g__ 3.5
Dimethylamine hydrochloride _____ g__ 8.9
Glacial acetic acid _____ ml__ 1

The viscous, homogeneous mixture obtained as a result of the above procedure is dissolved in 160 ml. of ethyl alcohol, filtered and precipitated with 300 ml. of ether. After recrystallization from a mixture of ethyl alcohol and ether, there is obtained 28.8 g. (87%) of the Mannich cpd., M.P. 182–184.5° C. (Corr.)

Analysis.—Calculated for $C_{16}H_{24}ClNO_4$: C, 58.26; H, 7.33; N, 4.25. Found: C, 58.62; H, 7.11; N, 4.14.

STEP C.—PREPARATION OF 2-METHYL-4-(2-METHYL-ENEBUTYRYL)PHENOXYACETIC ACID

This product is prepared from 20 g. of the Mannich cpd. by substantially the same method described in Example 3, Step C. The crude product is crystallized several times from 400 ml. of methylcyclohexane yielding 7.4 g.

(50% of 2-methyl-4-(2-methylenebutyryl)phenoxyacetic acid, M.P. 72–74° C.

*Analysis.*—Calculated for $C_{14}H_{16}O_4$: C, 67.73; H, 6.50. Found: C, 67.97; H, 6.74.

EXAMPLE 21

*3-methyl-4-(2-methylenebutyryl)phenoxyacetic acid*

STEP A.—PREPARATION OF 3-METHYL-4-BUTYRYL-PHENOXYACETIC ACID

This product is prepared following substantially the same procedure described in Example 1, Step A, using the following substances:

| | | |
|---|---|---|
| 3-methylphenoxyacetic acid | g | 83 |
| n-Butyryl chloride | g | 66.6 |
| Carbon disulfide | ml | 400 |
| Powdered aluminum chloride | g | 217 |

The above procedure gives 77 g. (65%) of crude 3-methyl-4-butyrylphenoxyacetic acid which when distilled melts at 65–66.5° C.

*Analysis.*—Calculated for $C_{13}H_{16}O_4$: C, 66.08; H, 6.83. Found: C, 65.42; H, 7.09.

STEP B.—PREPARATION OF 3-METHYL-4-[2-(DIMETHYLAMINOMETHYL)BUTYRYL]PHENOXYACETIC ACID HYDROCHLORIDE

The 3-methyl-4-butyrylphenoxyacetic acid obtained as described above is converted to the Mannich cpd. by substantially the same method described in Example 3, Step B, using the following ingredients:

| | | |
|---|---|---|
| 3-methyl-4-butyrylphenoxyacetic acid | g | 9.54 |
| Paraformaldehyde | g | 1.4 |
| Dimethylamine hydrochloride | g | 3.56 |
| Glacial acetic acid | ml | 0.5 |

The viscouse homogeneous mixture obtained by the above procedure is dissolved in 70 ml. of isopropyl alcohol, filtered and precipitated with 400 ml. of ether. The product obtained is recrystallized from a mixture of isopropyl alcohol and ether, filtered and dried in vacuo over phosphorus pentoxide to give 9.65 g. (70%) of the Mannich cpd., M.P. 120–126° C. (Corr.) (Sintering at 111° C.)

STEP C.—PREPARATION OF 3-METHYL-4-(2-METHYLENEBUTYRYL)PHENOXYACETIC ACID

The Mannich cpd. obtained as described above (6.35 g.) is treated with a saturated sodium bicarbonate solution by substantially the same method described in Example 3, Step C, to give 3-methyl-4-(2-methylenebutyryl)phenoxyacetic acid which after recrystallization several times from a 1:3 mixture of benzene and cyclohexane gives 3.7 g. (60%) of purified product, M.P. 77.5–79.5° C.

*Analysis.*—Caluclated for $C_{14}H_{16}O_4$: C, 67.73; H, 6.50. Found: C, 67.48; H, 6.55.

EXAMPLE 22

*2,3-dimethyl-4-(2-methylenebutyryl)phenoxyacetic acid*

STEP A.—PREPARATION OF 2,3-DIMETHYL-4-BUTYRYL-PHENOXYACETIC ACID

This product was prepared following substantially the same procedure described in Example 1, Step A, using the following ingredients:

| | | |
|---|---|---|
| 2,3-dimethylphenoxyacetic acid | g | 90 |
| n-Butyryl chloride | g | 66.6 |
| Carbon disulfide | ml | 400 |
| Powdered aluminum chloride | g | 217 |

The above procedure yields 83.7 g. (67%) of crude product which after recrystallization from a mixture of benzene and cyclohexane gives 2,3-dimethyl-4-butyrylphenoxyacetic acid, M.P. 87–88° C.

*Analysis.*—Calculated for $C_{14}H_{18}O_4$. C, 67.18; H, 7.25. Found: C, 67.74; H, 7.27.

STEP B.—PREPARATION OF 2,3-DIMETHYL-4-[2-(DIMETHYLAMINOMETHYL)BUTYRYL]PHENOXYACETIC ACID HYDROCHLORIDE

This Mannich cpd. is prepared following substantially the same procedure described in Example 3, Step B, using the following substances:

| | | |
|---|---|---|
| 2,3-dimethyl-4-butyrylphenoxyacetic acid | g | 10 |
| Paraformaldehyde | g | 1.4 |
| Dimethylamine hydrochloride | g | 3.56 |
| Glacial acetic acid | ml | 0.5 |

The viscous homogeneous mixture obtained as result of the above procedure is dissolved in 90 ml. of ethyl alcohol, filtered an precipitated with 150 ml. of ether. The product is recrystallized from a mixture of ethyl alcohol and ether, filtered and dried in vacuo over phosphorus pentoxide to give 11.8 g. (90%) of Mannich cpd., M.P. 178.5–180° C. (Corr.)

*Analysis.*—Calculated for $C_{17}H_{26}ClNO_4$: C, 59.38; H, 7.62; N, 4.07. Found: C, 59.52; H, 7.35; N, 3.87.

STEP C.—PREPARATION OF 2,3-DIMETHYL-4-(2-METHYLENEBUTYRYL)PHENOXYACETIC ACID

This produce is prepared by substantially the same method described in Example 3, Step C, using 28.1 g. of 2,3-dimethyl-4-[2-(dimethylaminomethyl)butyryl]-phenoxyacetic acid hydrochloride. The crude product is recrystallized several times from 250 ml. of methylcyclohexane to give 7.0 g. (33%) of 2,3-dimethyl-4-(2-methylenebutyryl)phenoxyacetic acid, M.P. 83.5–84.5° C. (Corr.)

*Analysis.*—Calculated for $C_{15}H_{18}O_4$: C, 68.68; H, 6.92. Found: C, 68.46; H, 7.24.

EXAMPLE 23

*2,5-dimethyl-4-(2-methylenebutyryl)phenoxyacetic acid*

STEP A.—PREPARATION OF 2,5-DIMETHYL-4-BUTYRYL-PHENOXYACETIC ACID

The above product was prepared following substantially the same procedure described in Example 1, Step A, using the following substances:

| | | |
|---|---|---|
| 2,5-dimethylphenoxyacetic acid | g | 51 |
| n-Butyryl chloride | g | 37 |
| Carbon disulfide | ml | 230 |
| Powdered aluminum chloride | g | 123 |

The above procedure yields 59.6 g. (84%) of crude product which after crystallization from benzene gives 2,5-dimethyl-4-butyrylphenoxyacetic acid, M.P. 125.8–127° C.

*Analysis.*—Calculated for $C_{14}H_{18}O_4$: C, 67.18; H, 7.25. Found: C, 67.50; H, 7.14.

STEP B.—PREPARATION OF 2,5-DIMETHYL-4-[2-(DIMETHYLAMINOMETHYL)BUTYRYL]PHENOXYACETIC ACID HYDROCHLORIDE

The Mannich cpd. was prepared by substantially the same method described in Example 3, Step B, using the following substances:

| | | |
|---|---|---|
| 2,5-dimethyl-4-butyrylphenoxyacetic acid | g | 20 |
| Paraformaldehyde | g | 2.8 |
| Dimethylamine hydrochloride | g | 7.12 |
| Glacial acetic acid | ml | 0.5 |

The viscous homogeneous mixture obtained as a result of the above procedure is dissolved in 80 ml. of ethyl alcohol. The product is recrystallized from a mixture of ethyl alcohol and ether, filtered and dried in vacuo over phosphorus pentoxide to give 23.2 g. (84%) of the Mannich cpd., M.P. 176.5–178.5° C. (Corr.)

*Analysis.*—Calculated for $C_{17}H_{26}ClNO_4$: C, 59.38; H, 7.62; N, 4.07. Found: C, 59.22; H, 7.37; N, 3.99.

STEP C.—PREPARATION OF 2,5-DIMETHYL-4-(2-METHYLENEBUTYRYL)PHENOXYACETIC ACID

The Mannich cpd. (13 g.) was treated with a saturated sodium bicarbonate solution by substantially the same procedure described in Example 3, Step C, to give the crude product which after recrystallization several times from 400 ml. of methylcyclohexane gave 7.4 g. (78%) of 2,5 - dimethyl - 4 - (2-methylenebutyryl)phenoxyacetic acid, M.P. 88–89.5° C. (Corr.)

*Analysis.*—Calculated for $C_{15}H_{18}O_4$: C, 68.68; H, 6.92. Found: C, 68.51; H, 7.19.

EXAMPLE 24

*2,6-dimethyl-4-(2-methylenebutyryl)phenoxyacetic acid*

STEP A.—PREPARATION OF 2,6-DIMETHYL-4-BUTYRYL-PHENOXYACETIC ACID

This product is prepared by substantially the same procedure described in Example 1, Step A, using the following substances:

| | | |
|---|---|---|
| 2,6-dimethylphenoxyacetic acid | g__ | 54 |
| n-Butyryl chloride | g__ | 40 |
| Carbon disulfide | ml__ | 240 |
| Powdered aluminum chloride | g__ | 130 |

The above procedure yields 48 g. (63%) of crude product which after crystallization from a mixture of benzene and cyclohexane gives 2,6-dimethyl-4-butyrylphenoxyacetic acid, M.P. 119–120° C.

*Analysis.*—Calculated for $C_{14}H_{18}O_4$: C, 67.18; H, 7.25. Found: C, 67.03; H, 7.29.

STEP B.—PREPARATION OF 2,6 - DIMETHYL-4-[2-(DI-METHYLAMINOMETHYL)BUTYRYL]PHENOXYACETIC ACID HYDROCHLORIDE

The Mannich cpd. is prepared by substantially the same method described in Example 3, Step B, using the following substances:

| | | |
|---|---|---|
| 2,6-dimethyl-4-butyrylphenoxyacetic acid | g__ | 20 |
| Paraformaldehyde | g__ | 2.8 |
| Dimethylamine hydrochloride | g__ | 7.12 |
| Glacial acetic acid | ml__ | 0.5 |

The viscous homogeneous mixture obtained by the above procedure is dissolved in 100 ml. of ethyl alcohol, filtered and precipitated with 300 ml. of ether. The product then is recrystallized from a mixture of ethyl alcohol and ether, filtered and dried in vacuo over phosphorus pentoxide to give 25.2 g. (92%) of the Mannich cpd., M.P. 186.5–188.5° C. (Corr.)

*Analysis.*—Calculated for $C_{17}H_{26}ClNO_4$: C, 59.38; H, 7.62; N, 4.07. Found: C, 59.27; H, 7.55; N, 3.80.

STEP C.—PREPARATION OF 2,6-DIMETHYL-4-(2-METHYLENEBUTYRYL)PHENOXYACETIC ACID

The Mannich cpd. obtained as described above (15 g.) is treated with a saturated aqueous sodium bicarbonate solution by substantially the same procedure described in Example 3, Step C, to give crude product which after recrystallization several times from 280 ml. of methylcyclohexane yields 6.6 g. (57%) of 2,6-dimethyl-4-(2-methylenebutyryl)phenoxyacetic acid, M.P. 89.5–90.5° C.

*Analysis.*—Calculated for $C_{15}H_{18}O_4$: C, 68.68; H, 6.92. Found: C, 68.38; H, 7.16.

EXAMPLE 25

*2,3,5-trimethyl-4-(2-methylenebutyryl)phenoxyacetic acid*

STEP A.—PREPARATION OF 2,3,5-TRIMETHYL-4-BUTYRYLPHENOXYACETIC ACID

This product is prepared by substantially the same procedure described in Example 1, Step A, using the following substances:

| | | |
|---|---|---|
| 2,3,5-trimethylphenoxyacetic acid | g__ | 97 |
| n-Butyryl chloride | g__ | 66.6 |
| Carbon disulfide | ml__ | 400 |
| Powered aluminum chloride | g__ | 217 |

The above procedure gives 108 g. (82%) of crude product which after crystallization from methylcyclohexane gives 2,3,5-trimethyl-4-butyrylphenoxyacetic acid, M.P. 128–129.5° C.

*Analysis.*—Calculated for $C_{15}H_{20}O_4$: C, 68.16; H, 7.63. Found: C, 67.98; H, 7.42.

STEP B.—PREPARATION OF 2,3,5-TRIMETHYL-4-(2-METHYLENEBUTYRYL)PHENOXYACETIC ACID

The above product is prepared following substantially the same process described in Example 3, Step B, using the following substances:

| | | |
|---|---|---|
| 2,3,5-trimethyl-4-butyrylphenoxyacetic acid | g__ | 26.4 |
| Paraformaldehyde | g__ | 3.5 |
| Dimethylamine hydrochloride | g__ | 8.9 |
| Glacial acetic acid | ml__ | 1.0 |

The Mannich cpd. prepared by the above procedure decomposed spontaneously during the reaction to give 19.2 g. (71%) of 2,3,5-trimethyl-4-(2-methylenebutyryl)phenoxyacetic acid which after recrystallization several times from 300 ml. of methylcyclohexane melts at 103.5–106.5° C.

*Analysis.*—Calculated for $C_{16}H_{20}O_4$: C, 69.54; H, 7.30. Found: C, 69.84; H, 7.05.

EXAMPLE 26

*2,3,6-trimethyl-4-(2-methylenebutyryl)phenoxyacetic acid*

STEP A.—PREPARATION OF 2,3,6-TRIMETHYL-4-BUTYRYLPHENOXYACETIC ACID

This product is prepared by substantially the same procedure described in Example 1, Step A, using the following substances:

| | | |
|---|---|---|
| 2,3,6-trimethylphenoxyacetic acid | g__ | 58 |
| n-Butyryl chloride | g__ | 40 |
| Carbon disulfide | ml__ | 350 |
| Powdered aluminum chloride | g__ | 130 |

There is obtained by the above process 68 g. (95%) of crude product which, after crystallization from methylcyclohexane, gives 2,3,6-trimethyl-4-butyrylphenoxyacetic acid, M.P. 109.5–112° C.

*Analysis.*—Calculated for $C_{15}H_{20}O_4$: C, 68.16; H, 7.63. Found: C, 68.15; H, 7.86.

STEP B.—PREPARATION OF 2,3,6-TRIMETHYL-4-[2-(DI-METHYLAMINOMETHYL)BUTYRYL]PHENOXYACETIC ACID HYDROCHLORIDE

This Mannich cpd. is prepared by substantially the same method described in Example 3, Step B, using the following substances:

| | | |
|---|---|---|
| 2,3,6-trimethyl-4-butyrylphenoxyacetic acid | g__ | 26.4 |
| Paraformaldehyde | g__ | 3.5 |
| Dimethylamine hydrochloride | g__ | 8.9 |
| Glacial acetic acid | ml__ | 1.0 |

The viscous homogeneous mixture obtained by the above procedure is dissolved in 400 ml. of ethyl alcohol, filtered and precipitated with 600 ml. of ether. The product is again recrystallized from a mixture of ethyl alcohol and ether, filtered and dried in vacuo over phosphorus pentoxide to give 22.0 g. (61.5%) of Mannich cpd., M.P. 185.5–187.5° C.

*Analysis.*—Calculated for $C_{18}H_{28}ClNO_4$: C, 60.40; H, 7.89; N, 3.91. Found: C, 60.07; H, 7.88; N, 3.85.

STEP C.—PREPARATION OF 2,3,6-TRIMETHYL-4-(2-METHLYENEBUTYRYL)PHENOXYACETIC ACID

The Mannich cpd. obtained as described above, 15 g., is treated with sodium bicarbonate by substantially the same method described in Example 3, Step C. The product obtained is recrystallized several times from 200 ml. of methylcyclohexane to give 9.5 g. (83%) of 2,3,6-trimethyl-4-(2-methylenebutyryl)phenoxyacetic acid, M.P. 124–125° C.

*Analysis.*—Calculated for $C_{16}H_{20}O_4$: C, 69.54; H, 7.30. Found: C, 69.48; H, 7.44.

EXAMPLE 27

*2,3,5,6 - tetramethyl - 4 - (2 - methylenebutyryl)phenoxyacetic acid*

STEP A.—PREPARATION OF 2,3,5,6-TETRAMETHYL-PHENOXYACETIC ACID

A 500 ml., 4-necked, round-bottomed flask fitted with stirrer, condenser and two dropping funnels is charged with 40.0 g. of 2,3,5,6-tetramethylphenol and 21.5 g. of sodium hydroxide in 90 ml. of water. The solution is heated at 85–95° C. on a steam bath while 34.5 g. of chloroacetic acid in 35 ml. of water is slowly added. Heating is continued one-half hour and sodium hydroxide (21.5 g.) and chloroacetic acid (34.5 g.) are added to the reaction mixture. Heating is continued for an additional 40 minutes, the solution filtered, acidified with concentrated hydrochloric acid and cooled whereupon a solid product, 45 g. (82%), is formed. After recrystallization from 600 ml. of heptane, purified 2,3,5,6-tetramethylphenoxyacetic acid is obtained, M.P. 117–118° C.

*Analysis.*—Calculated for $C_{12}H_{16}O_3$: C, 69.21; H, 7.74. Found: C, 69.05; H, 7.67.

STEP B.—PREPARATION OF 2,3,5,6-TETRAMETHYL-4-BUTYRYLPHENOXYACETIC ACID

This product is prepared following substantially the same procedure described in Example 3, Step A, using the following substances:

2,3,5,6-tetramethylphenoxyacetic acid _____ g__ 25
n-Butyryl chloride _____ g__ 16
Carbon disulfide _____ ml__ 150
Powdered aluminum chloride _____ g__ 52

The above procedure yields 9.6 g. (29%) of the crude product which after recrystallization from methylcyclohexane gives 2,3,5,6-tetramethyl-4-butyrylphenoxyacetic acid, M.P. 143–145° C.

STEP C.—PREPARATION OF 2,3,5,6-TETRAMETHYL-4-[2-(DIMETHYLAMINOMETHYL)BUTYRYL]PHENOXYACETIC ACID HYDROCHLORIDE

The Mannich cpd. is prepared by substantially the same method described in Example 3, Step B, using the following substances:

2,3,5,6 - tetramethyl - 4 - butyrylphenoxyacetic acid _____ g__ 6.1
Paraformaldehyde _____ g__ 0.77
Dimethylamine hydrochloride _____ g__ 1.96
Glacial acetic acid _____ ml__ 0.5

The viscous, homogeneous mixture obtained by the above procedure is dissolved in 160 ml. of ethyl alcohol, filtered and precipitated with 80 ml. of ether. The product is again recrystallized from a mixture of ethyl alcohol and ether, filtered and dried in vacuo over phosphorus pentoxide to give 3 g. (37%) of the Mannich cpd., M.P. 185.5–187.5° C.

*Analysis.*—Calculated for $C_{19}H_{30}ClNO_4$: C, 61.36; H, 8.13; N, 3.77. Found: C, 62.06; H, 7.98; N, 3.49.

STEP D.—PREPARATION OF 2,3,5,6-TETRAMETHYL-4-(2-METHYLENEBUTYRYL)PHENOXYACETIC ACID

The Mannich cpd. obtained as described in Step C, 3 g., is treated with aqueous sodium bicarbonate by substantially the same method described in Example 3, Step C, to give the crude product which after recrystallization several times from 100 ml. of methylcyclohexane yields 1.3 g. (56%) of 2,3,5,6-tetramethyl-4-(2-methylenebutyryl)phenoxyacetic acid, M.P. 140.5–141.5° C. (Corr.)

*Analysis.*—Calculated for $C_{17}H_{22}O_4$: C, 70.32; H, 7.64. Found: C, 70.27; H, 7.77.

EXAMPLE 28

*3,5-dimethyl-4-(2-methylenebutyryl)phenoxyacetic acid*

STEP A.—PREPARATION OF 3,5-DIMETHYL-4-BUTYRYL-PHENOXYACETIC ACID

This product is prepared following substantially the same procedure described in Example 3, Step A, using the following substances:

3,5-dimethylphenoxyacetic acid _____ g__ 108
n-Butyryl chloride _____ g__ 80
Carbon disulfide _____ ml__ 480
Powdered aluminum chloride _____ g__ 260

The above procedure yields 7.3 g. of crude product which after distillation and recrystallization from methylcyclohexane gives 3,5-dimethyl-4-butyrylphenoxyacetic acid, M.P. 83–86° C.

*Analysis.*—Calculated for $C_{14}H_{18}O_4$: C, 67.18; H, 7.25. Found: C, 67.11; H, 7.33.

STEP B.—PREPARATION OF 3,5-DIMETHYL-4-(2-METHYLENEBUTYRYL)PHENOXYACETIC ACID

The above product is prepared following substantially the same procedure described in Example 3, Step B, using the following substances:

3,5-dimethyl-4-butyrylphenoxyacetic acid _____ g__ 6.8
Paraformaldehyde _____ g__ 0.93
Dimethylamine hydrochloride _____ g__ 2.38
Glacial acetic acid _____ ml__ 0.5

The Mannich compound formed during this reaction decomposes spontaneously to give 4.3 g. of crude 3,5-dimethyl-4-(2-methylenebutyryl)phenoxyacetic acid contaminated with starting material. The crude product is again reacted with paraformaldehyde, dimethylamine hydrochloride and glacial acetic acid as described initially in order to convert unreacted starting material to the desired product. The product is recrystallized from methylcyclohexane to give pure 3,5-dimethyl-4-(2-methylenebutyryl)phenoxyacetic acid, M.P. 76.6–77.6° C.

*Analysis.*—Calculated for $C_{15}H_{18}O_4$: C, 68.68; H, 6.92. Found: C, 68.49; H, 6.87.

EXAMPLE 29

*3-ethyl-4-(2-methylenebutyryl)phenoxyacetic acid*

STEP A.—PREPARATION OF 3-ETHYL-4-BUTYRYL-PHENOXYACETIC ACID

This product is prepared following substantially the same procedure described in Example 15, Step A, using the following substances:

m-Ethylphenoxyacetic acid ___ 72.3 g., 0.401 mole.
Carbon disulfide _____ 400 ml.
n-Butyryl chloride _____ 53.39 g., 0.501 mole.
Powdered aluminum chloride _ 173.74 g., 1.303 moles.

The above procedure yields 64 g. (64%) of yellow liquid boiling at 203–205° C. at 0.7 mm. pressure having $n_D^{25}$ 1.5433. Redistillation of the yellow liquid gives material boiling at 197–199° C. at 0.2 mm. pressure, $n_D^{25}$ 1.5428.

*Analysis.*—Calculated for $C_{14}H_{18}O_4$: C, 67.18; H, 7.25. Found: C, 67.13; H, 7.27.

STEP B.—PREPARATION OF 3-ETHYL-4-[2-(DIMETHYLAMINOMETHYL)BUTYRYL]PHENOXYACETIC ACID HYDROCHLORIDE

The Mannich cpd. is prepared by substantially the same procedure described in Example 3, Step B, using the following substances:

3-ethyl-4-butyrylphenoxyacetic acid _____ 5.01 g., 0.02 mole.
Paraformaldehyde _____ 0.70 g., 0.0233 mole.
Dimethylamine hydrochloride (dry) _____ 1.78 g., 0.218 mole.
Acetic acid _____ 4 drops.

The crude Mannich cpd. obtained by the above procedure is used directly in the following step without first purifying it.

STEP C.—PREPARATION OF 3-ETHYL-4-(2-METHYL-ENEBUTYRYL)PHENOXYACETIC ACID

The Mannich cpd. obtained as described in Step B is treated with sodium bicarbonate solution by substantially the same procedure described in Example 3, Step C, to give 4 g. (69%) of 3-ethyl-4-(2-methylenebutyryl)phenoxyacetic acid, M.P. 65–69° C. After two recrystallizations from a mixture of cold benzene and cyclohexane the product is obtained in the form of white needles, M.P. 71.5–72.5° C.

*Analysis.*—Calculated for $C_{15}H_{18}O_4$: C, 68.68; H, 6.92. Found: C, 68.92; H, 7.05.

EXAMPLE 30

*2-isopropyl-5-methyl-4-(2-methylenebutyryl) phenoxyacetic acid*

STEP A.—PREPARATION OF 2-ISOPROPYL-4-BUTYRYL-5-METHYLPHENOXYACETIC ACID

This product is prepared following substantially the same procedure described in Example 3, Step A, using the following substances:

2-isopropyl-5-methylphenoxyacetic acid _____ g__ 77.5
n-Butyryl chloride _____ g__ 50
Carbon disulfide _____ ml__ 350
Powdered aluminum chloride _____ g__ 162

The above procedure gives 99.6 (96%) of crude product. After recrystallization from methylcyclohexane there is obtained 2-isopropyl-4-butyryl-5-methylphenoxyacetic acid, M.P. 100–101.5° C.

*Analysis.*—Calculated for $C_{16}H_{22}O_4$: C, 69.04; H, 7.97. Found: C, 68.72; H, 7.69.

STEP B.—PREPARATION OF 2-ISOPROPYL-5-METHYL-4-(2-METHYLENEBUTYRYL)PHENOXYACETIC ACID

This product is prepared following substantially the same procedure described in Example 3, Step B, using the following substances:

2-isopropyl-4-butyryl-5-methylphenoxyacetic acid _____ g__ 22.2
Paraformaldehyde _____ g__ 2.8
Dimethylamine hydrochloride _____ g__ 7.12
Glacial acetic acid _____ ml__ 1.0

The Mannich cpd. formed by the above reaction spontaneously decomposed to give 2-isopropyl-5-methyl-4-(2-methylenebutyryl)phenoxyacetic acid, which after recrystallization from 200 ml. of methylcyclohexane yields 11.6 g. (50%) of product, M.P. 105.5–106.5° C.

*Analysis.*—Calculated for $C_{17}H_{22}O_4$: C, 70.32; H, 7.64. Found: C, 70.30; H, 7.74.

EXAMPLE 31

*3-methoxy-4-(2-methylenebutyryl)phenoxyacetic acid*

STEP A.—PREPARATION OF 3-HYDROXY-4-BUTYRYL-PHENOXYACETIC ACID

The above product was obtained following substantially the same procedure described in Example 15, Step A, using the following substances:

m-Methoxyphenoxyacetic acid __ 80.6 g., 0.4424 mole.
Carbon disulfide _____ 500 ml.
Butyryl chloride _____ 58.71 g., 0.551 mole.
Powdered aluminum chloride ___ 191.08 g., 1.433 mole.

The above procedure yields 15.6 g. (15%) of a yellow waxy solid boiling at 197–199° C. at 0.1 mm. pressure. Redistillation gives material boiling at 203–204° C. at 0.10 mm. pressure. Further recrystallization from a mixture of benzene and cyclohexane gives 3-hydroxy-4-butyrylphenoxyacetic acid in the form of a white crystalline solid, M.P. 120–121° C.

STEP B.—PREPARATION OF 3-METHOXY-4-BUTYRYL-PHENOXYACETIC ACID

To a solution of 3-hydroxy-4-butyrylphenoxyacetic acid (10.9 g., 0.0458 mole) dissolved in 100 ml. of water containing sodium hydroxide (4.0 g., 0.1 mole) is added methyl sulfate (5.78 g., 0.0458 mole) over a period of 15 minutes at a temperature of 25–28° C. with stirring. The temperature is raised to 50° C. and the reaction solution treated simultaneously with methyl sulfate (8.67 g., 0.0687 mole) and a solution of sodium hydroxide (6.0 g., 0.15 mole) in 35 ml. of water over a period of 45 minutes at a temperature of 50–60° C. The reaction solution then is heated under reflux with stirring for an additional two hours. The boiling reaction solution is acidified with concentrated hydrochloric acid and the oil that forms solidifies after cooling to room temperature. There is thus obtained 3-methoxy-4-butyrylphenoxyacetic acid, M.P. 118–132° C., yield 11 g. (95%). After four recrystallizations from benzene the product is obtained in the form of white needles, M.P. 137–138° C. (Corr.)

*Analysis.*—Calculated for $C_{13}H_{16}O_5$: C, 61.89; H, 6.39. Found: C, 61.47; H, 6.42.

STEP C.—PREPARATION OF 3-METHOXY-4-[2-(DIMETHYLAMINOMETHYL)BUTYRYL]PHENOXYACETIC ACID HYDROCHLORIDE

This Mannich cpd. is prepared by substantially the same procedure described in Example 3, Step B, using the following substances:

3-methoxy-4-butyrylphenoxy-
  acetic acid _____ 5.05 g., 0.02 mole.
Paraformaldehyde _____ 0.70 g., 0.0233 mole.
Dimethylamine hydrochloride
  (dry) _____ 1.78 g., 0.218 mole.
Acetic acid _____ 4 drops.

The Mannich cpd. obtained by the above procedure is used directly in the following step without first purifying it.

STEP D.—PREPARATION OF 3-METHOXY-4-(2-METHYLENEBUTYRYL)PHENOXYACETIC ACID

The Mannich cpd. obtained as described above is treated with a saturated sodium bicarbonate solution by substantially the same method described in Example 3, Step C, to give 4.9 g. (93%) of 3-methoxy-4-(2-methylenebutyryl)phenoxyacetic acid in the form of a solid melting at 105–111° C. After two recrystallizations from a mixture of benzene and cyclohexane the product is obtained in the form of white needles, M.P. 110–111.5° C.

*Analysis.*—Calculated for $C_{14}H_{16}O_5$: C, 63.63; H, 6.10. Found: C, 63.70; H, 6.05.

EXAMPLE 32

*3-hydroxy (and 3-methoxy)-4-(2-methylenebutyryl)-phenoxyacetic acid*

STEP A.—PREPARATION OF 3-ETHOXYPHENOXY-ACETIC ACID

A 2-liter, four-necked, round-bottomed flask equipped with stirrer, thermometer, dropping funnel and condenser is charged with 130 g. of 3-ethoxyphenol and 119 g. of sodium hydroxide in 280 ml. of water. The temperature is raised to 50° C. and a solution of 150 g. of chloroacetic acid in 150 ml. of water is added dropwise over 1½ hours. The reaction mixture is heated for an additional 1½ hours on a steam bath, filtered, treated with 1 liter of water and acidified with concentrated hydrochloric acid thus forming a yellow solid which becomes white after several recrystallizations from benzene to give 80 g. (38%) of 3-ethoxyphenoxyacetic acid, M.P. 90–91° C.

*Analysis.*—Calculated for $C_{10}H_{12}O_4$: C, 61.21; H, 6.16. Found: C, 60.88; H, 6.23.

STEP B.—PREPARATION OF 3-HYDROXY-4-BUTYRYL-PHENOXYACETIC ACID

This product is prepared by substantially the same procedure described in Example 3, Step A, using the following substances:

| | |
|---|---:|
| 3-ethoxyphenoxyacetic acid _____ g__ | 78.5 |
| n-Butyryl chloride _____ g__ | 53 |
| Carbon disulfide _____ ml__ | 320 |
| Powdered aluminum chloride _____ g__ | 173 |

The above procedure gives 65 g. (61%) of crude 3-hydroxy-4-butyrylphenoxyacetic acid which after recrystallization from 100 ml. of benzene melts at 120–121° C.

*Analysis.*—Calculated for $C_{12}H_{14}O_5$: C, 60.49; H, 5.92. Found: C, 60.46; H, 5.88.

The above product can be treated with methyl sulfate by substantially the same procedure described in Example 31, Step B, and then further treated as described in Example 31, Steps C and D, to form the corresponding Mannich compound which when treated with sodium bicarbonate gives 3 - methyoxy - 4-(2-methylenebutyryl)-phenoxyacetic acid.

Additionally, the 3 - hydroxy-4-butyrylphenoxyacetic acid can be converted to the corresponding 3-hydroxy-4-(2-methylenebutyryl)phenoxyacetic acid by the procedure described below.

STEP C.—PREPARATION OF 3-HYDROXY-4-(2-METHYL-ENEBUTYRYL)PHENOXYACETIC ACID

The above product is prepared following substantially the same procedure described in Example 3, Step B, using the following substances:

| | |
|---|---:|
| 3-hydroxy-4-butyrylphenoxyacetic acid _____ g__ | 5.3 |
| Paraformaldehyde _____ g__ | 0.7 |
| Dimethylamine hydrochloride _____ g__ | 1.78 |
| Glacial acetic acid _____ ml__ | 0.3 |

The viscous homogeneous mixture obtained by the above procedure is dissolved in 50 ml. of isopropyl alcohol, filtered and precipitated with 400 ml. of ether. The Mannich cpd. formed during the above reaction was spontaneously decomposed to give 1.4 g. of 3-hydroxy-4-(2-methylenebutyryl)phenoxyacetic acid, M.P. 115.5–117.5° C., after recrystallization from a mixture of 50 ml. of ethanol and 125 ml. of water.

*Analysis.*—Calculated for $C_{13}H_{14}O_5$: C, 62.39; H, 5.64. Found: C, 62.34; H, 5.88.

EXAMPLE 33

*2-methyl-3-chloro-4-(2-methylenebutyryl)phenoxyacetic acid*

STEP A.—PREPARATION OF 2-METHYL-3-CHLORO-4-BUTYRYLPHENOXYACETIC ACID

The above product is prepared following substantially the same procedure described in Example 3, Step A, using the following substances:

| | |
|---|---:|
| 2-methyl-3-chlorophenoxyacetic acid _____ g__ | 50 |
| n-Butyryl chloride _____ g__ | 33.3 |
| Carbon disulfide _____ ml__ | 300 |
| Powdered aluminum chloride _____ g__ | 108.5 |

The above procedure gives 64 g. (94%) of 2-methyl-3-chloro-4-butyrylphenoxyacetic acid which after recrystallization from methylcyclohexane metals at 91–92.5° C.

*Analysis.*—Calculated for $C_{13}H_{15}ClO_4$: C, 57.67; H, 5.59. Found: C, 57.96; H, 5.13.

STEP B.—PREPARATION OF 2-METHYL-3-CHLORO-4-[2-(DIMETHYLAMINOMETHYL)BUTYRYL]PHENOXYACETIC ACID HYDROCHLORIDE

The Mannich compound is prepared following substantially the same procedure described in Example 3, Step B, using the following substances:

| | |
|---|---:|
| 2 - methyl - 3 - chloro - 4 - butyrylphenoxyacetic acid _____ g__ | 10.8 |
| Paraformaldehyde _____ g__ | 1.4 |
| Dimethylamine hydrochloride _____ g__ | 3.56 |
| Glacial acetic acid _____ ml__ | 0.5 |

The viscous homogeneous mixture obtained by the above procedure is dissolved in 70 ml. of isopropyl alcohol, filtered and the product precipitated from the filtrate by addition of 100 ml. of ether. The product obtained is dried in vacuo over phosphorus pentoxide to give the Mannich cpd. which after recrystallization from a mixture of isopropyl alcohol and ether melts at 171.5–172.5° C.

*Analysis.*—Calculated for $C_{16}H_{23}Cl_2NO_4$: C, 52.75; H, 6.36. Found: C, 53.65; H, 6.04.

STEP C.—PREPARATION OF 2-METHYL-3-CHLORO-4-(2-METHYLENEBUTYRYL)PHENOXYACETIC ACID

The Mannich compound obtained as described above, 13 g., is treated with a saturated sodium bicarbonate solution by substantially the same procedure described in Example 3, Step C, to give 3 g. (30%) of 2-methyl-3-chloro-4-(2-methylenebutyryl)phenoxyacetic acid which after recrystallization from 160 ml. of methylcyclohexane melts at 113–114° C.

*Analysis.*—Calculated for $C_{14}H_{15}ClO_4$: C, 59.47; H, 5.35. Found: C, 59.80; H, 5.53.

EXAMPLE 34

*4-(2-methylenevaleryl)-3-chlorophenoxyacetic acid*

STEP A.—PREPARATION OF 4-n-VALERYL-3-CHLOROPHENOXYACETIC ACID

This product is obtained following substantially the same procedure described in Example 8, Step A, using the following substances:

| | |
|---|---|
| n-Valeryl chloride _____ | 36.2 g., 0.30 mole. |
| 3-chlorophenoxyacetic acid _____ | 44.7 g., 0.24 mole. |
| Carbon disulfide _____ | 240 ml. |
| Powdered aluminum chloride _____ | 101 g., 0.755 mole. |

The crude product obtained by the above procedure is crystallized from a 2:1 mixture of ligroin and benzene to give 30 g. of 4-n-valeryl-3-chlorophenoxyacetic acid, M.P. 82.5–83.5° C. (Corr.)

*Analysis.*—Calculated for $C_{13}H_{15}ClO_4$: C, 57.68; H, 5.58; Cl, 13.10. Found: C, 57.71; H, 5.43; Cl, 12.87.

STEP B.—PREPARATION OF 4-[2-(DIMETHYLAMINOMETHYL)VALERYL] - 3 - CHLOROPHENOXYACETIC ACID HYDROCHLORIDE

This Mannich cpd. is prepared by substantially the same procedure described in Example 3, Step B, using the following substances:

| | |
|---|---|
| 4-n-valeryl-3-chlorophenoxyacetic acid _____ | 6.76 g., 0.025 mole. |
| Paraformaldehyde _____ | 0.825 g., 0.0275 mole. |
| Dimethylamine hydrochloride (dry) _____ | 2.24 g., 0.0275 mole. |

The syrupy residue obtained by the above procedure is triturated with ether to give 5.4 g. of the Mannich cpd. in the form of a solid which is collected and used in the following step without further purification.

STEP C.—PREPARATION OF 4-(2-METHYLENEVALERYL)-3-CHLOROPHENOXYACETIC ACID

The Mannich cpd. prepared as described above is dissolved in water and filtered to remove cloudiness. The clear solution then is made basic with sodium bicarbonate and treated by substantially the same procedure described in Example 3, Step C, to give 1.8 g. of 4-(2-methylenevaleryl)-3-chlorophenoxyacetic acid in the form of a solid which after crystallization from benzene gives 1.4 g. of purified product, M.P. 101–102° C.

*Analysis.*—Calculated for $C_{14}H_{15}ClO_4$: C, 59.47; H, 5.35; Cl, 12.54. Found: C, 59.18; H, 5.53; Cl, 12.36.

EXAMPLE 35

*4-(2-methyl-n-valeryl)-3-chlorophenoxyacetic acid*

4-(2-methylenevaleryl) - 3 - chlorophenoxyacetic acid (8.75 g., 0.0309 mole), prepared as described in Example 34, is dissolved in isopropyl alcohol (250 ml.) and 5% palladium charcoal (3 g.) added. The mixture is hydrogenated at an initial pressure of 35 pounds per square inch on a Parr apparatus. When the required amount of hydrogen is absorbed, the solution is warmed and filtered to remove the catalyst, the alcohol evaporated and the residue crystallized from benzene to give 4.8 g. of 4-(2-methyl-n-valeryl)-3-chlorophenoxyacetic acid, M.P. 123–124.5° C.

*Analysis.*—Calculated for $C_{14}H_{17}ClO_4$: C, 59.05; H, 6.02. Found: C, 59.12; H, 5.94.

EXAMPLE 36

*4-(2-methyleneisovaleryl)-3-chlorophenoxyacetic acid*

STEP A.—PREPARATION OF 4-ISOVALERYL-3-CHLOROPHENOXYACETIC ACID

The above product is prepared following substantially the same procedure described in Example 3, Step A, using the following substances:

| | |
|---|---|
| Isovaleryl chloride | 32.6 g., 0.272 mole. |
| 3-chlorophenoxyacetic acid | 44.7 g., 0.24 mole. |
| Aluminum chloride | 101 g., 0.755 mole. |
| Carbon disulfide | 250 ml. |

The crude product obtained as described by the above procedure is obtained in the form of a gummy solid which is triturated with 1 liter of hot 5% sodium bicarbonate and the resulting solution is filtered from insoluble aluminum salts. The filtrate is treated with Darco (decolorizing charcoal) (5 g.) and acidified with hydrochloric acid. The solid that separates is dried and crystallized from benzene to give 33.8 g. of 4-isovaleryl-3-chlorophenoxyacetic acid, M.P. 107–108° C.

*Analysis.*—Calculated for $C_{13}H_{15}ClO_4$: C, 57.68; H, 5.58; Cl, 13.10. Found: C, 57.52; H, 5.71; Cl, 13.13.

STEP B.—PREPARATION OF 4-(2-DIMETHYLAMINOMETHYLISOVALERYL) - 3 - CHLOROPHENOXYACETIC ACID HYDROCHLORIDE

This Mannich cpd. is prepared following substantially the same procedure described in Example 3, Step B, using the following substances:

| | |
|---|---|
| 4-isovaleryl-3-chlorophenoxyacetic acid | 27 g., 0.1 mole. |
| Dimethylamine hydrochloride | 8.15 g., 0.1 mole. |
| Paraformaldehyde | 3 g., 0.1 mole. |
| Acetic acid | 0.5 ml. |

The warm reaction mixture obtained as the result of the above procedure is dissolved in 50 ml. of hot acetone. The solid (22 g.) that separates on cooling melts at 159–163° C. After digesting this product in hot acetone, the purified 4 - (2 - dimethylaminomethylisovaleryl)-3-chlorophenoxyacetic acid hydrochloride is obtained, M.P. 167–169° C.

*Analysis.*—Calculated for $C_{16}H_{22}ClNO_4·HCl$: C, 57.75; H, 6.36; Cl, 19.46. Found: C, 57.47; H, 6.37; Cl, 19.09.

STEP C.—PREPARATION OF 4-(2-METHYLENEISOVALERYL)-3-CHLOROPHENOXYACETIC ACID

The Mannich cpd. obtained as described above (19 g., 0.052 mole) is dissolved in sodium bicarbonate solution and treated by substantially the same procedure described in Example 3, Step C, to give 4-(2-methyleneisovaleryl)-3-chlorophenoxyacetic acid which after crystallization from benzene melts at 122.5–123.5° C., yield 9 g.

*Analysis.*—Calculated for $C_{14}H_{15}ClO_4$: C, 59.47; H, 5.35; Cl, 12.36. Found: C, 59.22; H, 5.52; Cl, 12.33.

The following example describes the preparation of a derivative of the product prepared as described in Example 36.

EXAMPLE 37

*4-(2-bromo-2-methylisovaleryl)-3-chlorophenoxyacetic acid*

STEP A.—PREPARATION OF 4-(2-METHYLISOVALERYL)-3-CHLOROPHENOXYACETIC ACID 4-(2-methyleneisovaleryl)-3-chlorophenoxyacetic acid, prepared as described in Example 36 (8.19 g., 0.0289 mole) is dissolved in isopropyl alcohol (250 ml.) and 5% palladium on charcoal (3 g.) is added. The mixture is hydrogenated at an initial pressure of 35 pounds per square inch on a Parr apparatus. In about 40 minutes the required amount of hydrogen is absorbed. The solution is warmed and filtered to remove the catalyst, the alcohol is evaporated and the residue crystallized from benzene to give 4.95 g. of 4-(2-methylisovaleryl)-3-chlorophenoxyacetic acid, M.P. 138–139° C.

*Analysis.*—Calculated for $C_{14}H_{17}ClO_4$: C, 59.05; H, 6.02. Found: C, 58.82; H, 6.02.

STEP B.—PREPARATION OF 4-(2-BROMO-2-METHYLISOVALERYL)-3-CHLOROPHENOXYACETIC ACID

The keto acid prepared as described in Step A, above, (2.69 g., 0.0094 mole) is dissolved in about 200 ml. of acetic acid and bromine (0.0094 mole) in acetic acid (50 ml.) is added dropwise with stirring over a 10–15 minute period. The reaction is initiated by adding two drops of 48% hydrobromic acid. The mixture is added to about 1 liter of water containing a little sodium bisulfite and the solid that separates is collected, washed with water and dried. The product obtained is crystallized from benzene to give 2.8 g. of 4-(2-bromo-2-methylisovaleryl)-3-chlorophenoxyacetic acid, M.P. 151.5–152° C.

*Analysis.*—Calculated for $C_{14}H_{16}BrClO_4$: C, 46.23; H, 4.44; Br, 21.68; Cl, 9.75. Found: C, 46.29; H, 4.60; Br, 21.68; Cl, 9.78.

EXAMPLE 38

*3-chloro-4-(2-bromoisovaleryl)phenoxyacetic acid*

3-chloro-4-isovalerylphenoxyacetic acid, prepared as described in Example 36, Step A (14.6 g., 0.0054 mole) in acetic acid (100 ml.) is treated with bromine (8.7 g., 0.054 mole) in 20 ml. of acetic acid by substantially the same method described in Example 37, Step B. The product obtained is crystallized from isopropyl alcohol to give 17.0 g. of 3-chloro-4-(2-bromoisovaleryl)phenoxyacetic acid, M.P. 171–172° C.

*Analysis.*—Calculated for $C_{13}H_{14}BrClO_4$: C, 44.66; H, 4.04; Br, 22.86; Cl, 10.01. Found: C, 44.69; H, 4.41; Br, 23.03; Cl, 9.78.

EXAMPLE 39

*3-chloro-4-(2-chloroisovaleryl)phenoxyacetic acid*

A mixture of 3-chloro-4-(2-bromoisovaleryl)phenoxyacetic acid, obtained as described in Example 38 (5.8 g., 0.0165 mole) and lithium chloride (2.12 g., 0.05 mole) are dissolved in dimethylformamide (60 ml.) and heated on a steam bath for 3 hours. The colorless solution obtained is added to 500 ml. of water and the solid that separates is crystallized from benzene to give 4.0 g. of 3-chloro-4-(2-chloroisovaleryl)phenoxyacetic acid, M.P. 146–147° C.

*Analysis.*—Calculated for $C_{13}H_{14}Cl_2O_4$: C, 51.16; H, 4.63; Cl, 23.23. Found: C, 51.48; H, 4.95; Cl, 22.69.

EXAMPLE 40

*4-(2-methylenecaproyl)-3-chlorophenoxyacetic acid*

STEP A.—PREPARATION OF 4-CAPROYL-3-CHLOROPHENOXYACETIC ACID

This product is prepared following substantially the same procedure described in Example 8, Step A, using the following substances:

| | |
|---|---|
| Caproyl chloride | 33.6 g., 0.25 mole. |
| 3-chlorophenoxyacetic acid | 37.3 g., 0.2 mole. |
| Powdered aluminum chloride | 83.9 g., 0.63 mole. |
| Carbon disulfide | 200 ml. |

After decanting the carbon disulfide, the aluminum complex is added to 1 kg. of ice and 100 ml. of concentrated hydrochloric acid, a soft, yellow solid forms which is dissolved in benzene and the benzene solution is extracted with one liter of 10% sodium bicarbonate in 10 portions. The extract is acidified to obtain a green oil which is extracted with ether and the ether extract dried over sodium sulfate. Upon evaporating the ether, the residue obtained is crystallized from a 2:1 mixture of hexane and benzene containing Norite (decolorizing charcoal) to give 13.0 g. of 4-caproyl-3-chlorophenoxyacetic acid, M.P. 88–89° C.

*Analysis.*—Calculated for $C_{14}H_{17}ClO_4$: C, 59.05; H, 6.02; Cl, 12.45. Found: C, 59.05; H, 5.76; Cl, 12.20.

STEP B.—PREPARATION OF 4-(2-DIMETHYLAMINOMETHYLCAPROYL)-3-CHLOROPHENOXYACETIC ACID HYDROCHLORIDE

This Mannich cpd. is prepared by substantially the same procedure described in Example 3, Step B, using the following substances:

4-caproyl-3-chlorophenoxyacetic
  acid _____ 5.68 g., 0.02 mole.
Paraformaldehyde _____ 0.66 g., 0.022 mole.
Dimethylamine hydrochloride ____ 1.79 g., 0.022 mole.
Acetic acid _____ 10 drops.

The syrup which is formed as a result of this procedure solidifies upon trituration with ether to give the Mannich cpd. in the form of a solid, M.P. 114–120° C.

STEP C.—PREPARATION OF 4-(2-METHYLENECAPROYL)-3-CHLOROPHENOXYACETIC ACID

The Mannich cpd. prepared as described in Step B (5 g.), is treated with sodium bicarbonate solution by substantially the same method described in Example 3, Step C, to give 4-(2-methylenecaproyl)-3-chlorophenoxyacetic acid which after crystallization from a 2:1 mixture of cyclohexane and benzene gives 1 g. of product, M.P. 98–99° C.

*Analysis.*—Calculated for $C_{15}H_{17}ClO_4$: C, 60.70; H, 5.78; Cl, 11.95. Found: C, 60.56; H, 5.55; Cl, 11.76.

EXAMPLE 41

*4-(2-methyleneenanthyl)-3-chlorophenoxyacetic acid*

STEP A.—PREPARATION OF 4-ENANTHYL-3-CHLOROPHENOXYACETIC ACID

This product is prepared following substantially the same procedure described in Example 8, Step A, using the following substances:

Enanthyl chloride _____ 37.2 g., 0.25 mole.
3-chlorophenoxyacetic acid _____ 37.3 g., 0.20 mole.
Aluminum chloride _____ 83.9 g., 0.63 mole.
Carbon disulfide _____ 200 ml.

The aluminum complex formed is decomposed with 1 kg. of ice and 100 ml. of concentrated hydrochloric acid. The acid mixture is extracted with benzene and ether, the solvents evaporated and the solid residue dissolved in 2 liters of 10% sodium bicarbonate solution. The alkaline solution is filtered and acidified with concentrated hydrochloric acid to precipitate the sodium salt of the desired product (53.9 g.) which is collected by filtration. The sodium salt is suspended in water in a separatory funnel, 500 ml. of ether is added and concentrated hydrochloric acid is added gradually with shaking. The sodium salt gradually converts to the acid, is taken up in the ether layer, the ether layer is separated and the solvent evaporated to give an oily residue which is dried by azeotropic distillation with 100 ml. of benzene. The solid residue is crystallized from a 1:1 mixture of hexane and benzene to give 19.8 g. of 4-enanthyl-3-chlorophenoxyacetic acid, M.P. 102.5–103.5° C. (Corr.)

*Analysis.*—Calculated for $C_{15}H_{19}ClO_2$: C, 60.30; H, 6.40; Cl, 11.87. Found: C, 60.60; H, 6.52; Cl, 11.78.

STEP B.—PREPARATION OF 4-(2-DIMETHYLAMINOMETHYLENANTHYL)-3-CHLOROPHENOXYACETIC ACID HYDROCHLORIDE

This Mannich cpd. is prepared following substantially the same procedure described in Example 3, Step B, using the following substances:

4-enanthyl-3-chlorophenoxyacetic
  acid _____ 11.42 g., 0.038 mole.
Paraformaldehyde _____ 1.26 g., 0.0421 mole.
Dimethylamine hydrochloride ____ 3.43 g., 0.0421 mole.
Acetic acid _____ 10 drops.

The product is obtained from the reaction mixture by triturating with ether to give 10.86 g. of product which after crystallization from acetonitrile yields 7.93 g. of the Mannich cpd., M.P. 146–148.5° C. (Uncorr.)

*Analysis.*—Calculated for $C_{18}H_{27}Cl_2NO_4$: C, 55.10; H, 6.94; Cl, 18.08. Found: C, 55.01; H, 6.65; Cl, 17.64.

STEP C.—PREPARATION OF 4-(2-METHYLENEENANTHYL)-3-CHLOROPHENOXYACETIC ACID

The Mannich cpd. prepared as described in Step B (6 g., 0.016 mole) is treated with a 10% sodium bicarbonate solution by substantially the same procedure described in Example 3, Step C, to give 4.15 g. of 4-(2-methyleneenanthyl)-3-chlorophenoxyacetic acid which after being twice recrystallized from benzene gives 2.1 g. of product, M.P. 81–82° C.

*Analysis.*—Calculated for $C_{16}H_{19}ClO_4$: C, 61.83; H, 6.16; Cl, 11.41. Found: C, 61.75; H, 6.39; Cl, 11.54.

EXAMPLE 42

*3-methacryloyl phenoxyacetic acid*

STEP A.—PREPARATION OF 3-PROPIONYLPHENOXYACETIC ACID

A solution of 0.1 mole of 3-propionylphenol in 60 cc. of ethylene glycol dimethyl ether is added to a suspension of 0.1 mole of sodium hydride in 40 cc. of the same solvent. Then 0.11 mole of ethyl bromoacetate is added during 25 minutes. The mixture is refluxed 1 hour and the precipitated sodium bromide is filtered off and solvent distilled in vacuo. To the residue is added 80 cc. of 10% sodium hydroxide solution and the mixture heated on the steam bath for 10 minutes until a clear solution is formed. The solution is acidified to precipitate the product which soon crystallizes. Recrystallization from a mixture of benzene and cyclohexane gives 3-propionylphenoxyacetic acid, M.P. 72–78° C.

STEP B.—PREPARATION OF 3-[2-(DIMETHYLAMINOMETHYL)PROPIONYL]PHENOXYACETIC ACID HYDROCHLORIDE

A mixture of 3-propionylphenoxyacetic acid (17.0 g., 0.082 mole), paraformaldehyde (3.2 g., 0.105 mole), dimethylamine hydrochloride (7.4 g., 0.9 mole) and 0.8 cc. of acetic acid is heated 1.7 hours on the steam bath. The crystalline mass thus obtained is triturated with 120 cc. boiling isopropyl alcohol. The insoluble 3-[2-(dimethylaminomethyl)propionyl]phenoxyacetic acid hydrochloride weighs 18.0 g., M.P. 148–152° C.

STEP C.—PREPARATION OF 3-METHYACRYLOYLPHENOXYACETIC ACID

A solution of 14 g. of the Mannich cpd. obtained as described above in 120 cc. of saturated sodium bicarbonate solution is heated 3 minutes on the steam bath. Acidification with hydrochloric acid precipitates the crystalline unsaturated ketone which after recrystallization from a mixture of benzene and cyclohexane gives 2.8 g. of 3-methacryloylphenoxyacetic acid, M.P. 69–71° C.

*Analysis.*—Calculated for $C_{12}H_{12}O_4$: C, 65.44; H, 5.49. Found: C, 65.43; H, 5.79.

EXAMPLE 43

*4-chloro-3-methacryloylphenoxyacetic acid*

STEP A.—PREPARATION OF 2-CHLORO-5-NITROPROPIOPHENONE 2-chloro-propiophenone (84.5 g., 0.5 mole) is added to 300 cc. of fuming nitric acid (density 1.5) at a temperature of 5–10° C. during 18 minutes. The mixture is allowed to stand at 0–5° C. for 30 minutes and then poured into ice water. The solid product is recrystallized from isopropyl alcohol to give 75 g. of 2-chloro-5-nitropropiophenone, M.P. 52–56° C. After recrystallization from isopropyl alcohol, the product has a melting point of 54–56° C.

*Analysis.*—Calculated for $C_9H_8ClNO_3$: C, 50.60; H, 3.77; N, 6.56. Found: C, 51.47; H, 4.01; N, 6.62.

STEP B.—PREPARATION OF 2-CHLORO-5-AMINOPROPIOPHENONE

A solution of 25.9 g. (0.121 mole) of 2-chloro-5-nitropropiophenone in 60 cc. of acetic acid is added to 240 cc. of a 7.5 N hydrochloric acid solution in which is dissolved 100 g. of stannous chloride dihydrate. The solution is heated 1 hour on the steam bath and then made basic by addition of sodium hydroxide solution. The oily product is taken up in ether, the ether then evaporated to give a yellow oil weighing 18 g. Upon distillation the product has a boiling point of 143–146° C. at 0.5 mm. pressure.

*Analysis.*—Calculated for $C_9H_{10}ClNO$: C, 58.86; H, 5.49; N, 7.63. Found C, 59.10; H, 5.58; N, 7.54.

STEP C.—PREPARATION OF 4-CHLORO-3-PROPIONYLPHENOL 2-chloro-5-aminopropiophenone (48.5 g.) (0.26 mole) is dissolved in 192 cc. of water and 26 cc. of concentrated sulfuric acid and diazotized with a solution of 17.9 g. (0.26 mole) of sodium nitrite in 40 cc. of water. The diazonium mixture is added dropwise during 30 minutes to a stirred mixture of 340 cc. of 1 N sulfuric acid containing 48 g. of cupric sulfate pentahydrate and 250 cc. of toluene. The toluene layer then is separated and extracted with a 5% solution of sodium hydroxide. Acidification precipitates an oily product which is purified by distillation to give 130.0 g. of 4-chloro-3-propionylphenol, B.P. 135–140° C. at 0.5 mm. pressure.

STEP D.—PREPARATION OF 4-CHLORO-3-PROPIONYLPHENOXYACETIC ACID 4-chloro-3-propionylphenol is alkylated with ethylbromoacetate by substantially the same procedure described in Example 42, Step A, to give 4-chloro-3-propionylphenoxyacetic acid, M.P. 77.5–80.5° C.

STEP E.—PREPARATION OF 4-CHLORO-3-[2-(1-PIPERIDYLMETHYL)PROPIONYL]PHENOXYACETIC ACID HYDROCHLORIDE

A mixture of 14.6 g. (0.06 mole) of 4-chloro-3-propionylphenoxyacetic acid, 2.5 g. (0.085 mole) of paraformaldehyde, 8.2 g. (0.066 mole) of piperidine hydrochloride and 1 cc. of alcoholic hydrogen chloride is heated 1.5 hours on the steam bath. The solid crystalline cake which is obtained is triturated with boiling isopropyl alcohol to give 10.7 g. of 4-chloro-3-[2-(1-piperidylmethyl)propionyl]phenoxyacetic acid hydrochloride, M.P. 162–167° C.

STEP F.—PREPARATION OF 4-CHLORO-3-METHACRYLOYLPHENOXYACETIC ACID

A solution of 4.5 g. of the above Mannich cpd. in 16 cc. of saturated sodium bicarbonate solution and 40 cc. of water is heated 10 minutes on the steam bath. Acidification precipitates the solid unsaturated ketone which is recrystallized from a mixture of benzene and cyclohexane to give 1.4 g. of purified 4-chloro-3-methacryloylphenoxyacetic acid, M.P. 98–99.5° C.

*Analysis.*—Calculated for $C_{12}H_{11}ClO_4$: C, 56.59; H, 4.35; Cl, 13.93. Found: C, 56.99; H, 4.44; Cl, 13.84.

EXAMPLE 44

*2,4-dimethyl-5-(2-methylenebutyryl)phenoxyacetic acid*

STEP A.—PREPARATION OF 2,4-DIMETHYL-5-BUTYRYLPHENOL 2,4-dimethyl-5-aminobutyrophenone (119.5 g., 0.63 mole) in a solution of 190 cc. of sulfuric acid in 945 cc. of water is diazotized at 5° C. with 46 g. (0.67 mole) of sodium nitrite. The solution of diazonium salt is heated on the steam bath for 30 minutes. The phenol separates as an oil which recrystallizes when the mixture is cooled. The product is taken up in ether, extracted into 5% sodium hydroxide solution and reprecipitated by acidification. After recrystallization from ethanol there is obtained 76.5 g. of 2,4-dimethyl-5-butyrylphenol, M.P. 95–100° C. Further recrystallization from the same solvent gives the product melting at 100.5–102.0° C.

*Analysis.*—Calculated for $C_{14}H_{18}O_4$: C, 67.18; H, 7.25. Found; C, 74.41; H, 8.29.

STEP B.—PREPARATION OF 2,4-DIMETHYL-5-BUTYRYLPHENOXYACETIC ACID

This product is prepared following substantially the same procedure described in Example 42, Step A, employing 19.2 g. (0.1 mole) of 2,4-dimethyl-5-butyrylphenol and 18.3 g. (0.11 mole) of ethyl bromoacetate. Upon recrystallization of the end product from a mixture of benzene and cyclohexane there is obtained 2,4-dimethyl-5-butyrylphenoxyacetic acid, M.P. 98.5–99.5° C.

*Analysis.*—Caculated for $C_{14}H_{18}O_4$: C, 67.18; H, 7.25. Found: C, 67.44; H, 6.98.

STEP C.—PREPARATION OF 2,4 - DIMETHYL - 5-[2 - (DIMETHYLAMINOMETHYL)BUTYRYL]PHENOXYACETIC ACID HYDROCHLORIDE

This Mannich cpd. is prepared by substantially the same procedure described in Example 3, Step B, using the following substances:

2,4-dimethyl-5-butyrylphenoxyacetic
 acid _____ 8.3 g., 0.033 mole.
Paraformaldehyde _____ 1.6 g., 0.055 mole.
Dimethylamine hydrochloride _____ 3.3 g., 0.04 mole
Acetic acid _____ 0.5 cc.

The above procedure gives a melt which after trituration with 75 cc. of hot ethyl acetate gives 8.6 g. of 2,4-dimethyl-5-[2 - (dimethylaminomethyl)butyryl]phenoxyacetic acid HCl in the form of a crystalline product, M.P. 85–96° C.

STEP D.—PREPARATION OF 2,4-DIMETHYL-5-(2-METHYLENEBUTYRYL)PHENOXYACETIC ACID

A solution of the Mannich cpd. in 70 cc. of saturated sodium bicarbonate solution is treated by substantially the same procedure described in Example 3, Step C, to give 2,4-dimethyl-5-(2 - methylenebutyryl)phenoxyacetic acid which after recrystallization from isopropyl alcohol gives 2.2 g. of product, M.P. 131–133° C.

*Analysis.*—Calculated for $C_{15}H_{18}O_4$: C, 68.68; H, 6.92. Found: C, 68.81; H, 6.91.

EXAMPLE 45

*3-[2,4-dimethyl-5-(2-methylenebutyryl)phenoxy] propionic acid*

STEP A.—PREPARATION OF 3-(2,4-DIMETHYL-5-BUTYRYLPHENOXY)PROPIONIC ACID 2,4-dimethyl-5-butyrylphenol (46 g., 0.24 mole) is dissolved in 250 cc. of 10% sodium hydroxide solution. The solution is heated to boiling and 180 g. (2.4 mole) of β-propiolactone is added dropwise at such a rate to keep the solution boiling. During the addition, a 10% sodium hydroxide solution is added in portions to keep the mixture constantly alkaline. The solution is cooled and acidified to give a precipitate which is taken up in ether and the product extracted into sodium bicarbonate solution. Acidification of this solution precipitates the desired product which after recrystallization from aqueous ethanol gives 24.5 g. of 3-(2,4-dimethyl-5-butyrylphenoxy)propionic acid, M.P. 97.5–99.0° C.

*Analysis.*—Calculated for $C_{15}H_{20}O_4$: C, 68.16; H, 7.63. Found: C, 68.33; H, 7.63.

STEP B.—PREPARATION OF 3-[2,4-DIMETHYL-5-[2-(DIMETHYLAMINOMETHYL)BUTYRYL]PHENOXY]PROPIONIC ACID HYDROCHLORIDE

The Mannich cpd. is prepared from 3-(2,4-dimethyl-5-butyrylphenoxy)propionic acid following substantially the same procedure described in Example 3, Step B, to give the Mannich cpd., M.P. 159–162° C.

STEP C.—PREPARATION OF 3 - [2,4-DIMETHYL - 5 - (2-METHYLENEBUTYRYL)PHENOXY]PROPIONIC ACID

This product was prepared from the Mannich cpd. by treatment with a saturated solution of sodium bicarbonate by substantially the same procedure described in Example 3, Step C, to give 3-[2,4-dimethyl-5-(2-methylenebutyryl)phenoxy]propionic acid, which after recrystallization from a mixture of benzene and cyclohexane melts at 75–77° C.

Analysis.—Calculated for $C_{16}H_{20}O_4$: C, 69.54; H, 7.30. Found: C, 69.24; H, 7.33.

EXAMPLE 46

2-(2-methylenebutyryl)-3,5-dimethylphenoxyacetic acid

STEP A.—PREPARATION OF 2-BUTYRYL-3,5-DIMETHYLPHENOL

To a solution of 0.15 mole of 3,5-dimethylphenol in 60 cc. of pyridine is added during 15 minutes 0.18 mole of butyryl chloride with ice bath cooling. The mixture is permitted to stand 1 hour at room temperature, then diluted with 300 cc. of water to give an oily product which is taken up in ether. The ether solution is washed thoroughly with dilute acid and water, dried and the ether evaporated to leave the butyric acid ester of 3,5-dimethylphenol. The ester is mixed with 0.29 mole of aluminum chloride and then heated 1.6 hours on the steam bath. The reaction mixture is poured onto ice and the solid product obtained is recrystallized from cyclohexane to give 2-butyryl-3,5-dimethylphenol, M.P. 57–58° C.

Analysis.—Calculated for $C_{12}H_{16}O_2$: C, 74.97; H, 8.39. Found: C, 74.63; H, 8.35.

STEP B.—PREPARATION OF 2-BUTYRYL-3,5-DIMETHYLPHENOXYACETIC ACID

This product is obtained by alkylation of 2-butyryl-3,5-dimethyylphenol with ethyl bromoacetate by substantially the same procedure described in Example 42, Step A, to give 2-butyryl-3,5-dimethylphenoxyacetic acid which, after recrystallization from aqueous acetic acid melts at 108–109° C.

STEP C.—PREPARATION OF 2-[2 -( DIMETHYLAMINOMETHYL)BUTYRYL] - 3,5 - DIMETHYLPHENOXYACETIC ACID HYDROCHLORIDE

This Mannich cpd. is prepared following substantially the same procedure described in Example 3, Step B, to give the Mannich cpd. with M.P. 165–167° C.

STEP D.—PREPARATION OF 2-(2-METHYLENEBUTYRYL)-3,5-DIMETHYLPHENOXYACETIC ACID

This product is obtained from the Mannich cpd. by treatment with sodium bicarbonate solution by substantially the same procedure described in Example 3, Step C, to give 2-(2-methylenebutyryl)-3,5-dimethylphenoxyacetic acid which after recrystallization from aqueous acetic acid melts at 109.5–111.0° C.

Analysis.—Calculated for $C_{15}H_{18}O_4$: C, 68.68; H, 6.92. Found: C, 68.68, H, 7.04.

EXAMPLE 47

2-(2-methylenebutyryl)-3,5-dichlorophenoxyacetic acid

STEP A.—PREPARATION OF 2-BUTYRYL-3,5-DICHLOROPHENOL

This product is prepared following substantially the same procedure described in Example 46, Step A, employing 24.4 g. (0.15 mole) of 3,5-dichlorophenol and 19.3 g. (0.18 mole) of butyryl chloride. This procedure gives 33.2 g. of the liquid butyric acid ester of 3,5-dichlorophenol and 21.5 g. of 2-butyryl-3,5-dichlorophenol which after recrystallization from ligroin melts at 45–48° C. A further recrystallization from the same solvent gives the product with a M.P. of 47–48.5° C.

Analysis.—Calculated for $C_{10}H_{10}Cl_2O_2$: C, 51.52; H, 4.32. Found: C, 52.37; H, 4.35.

STEP B.—PREPARATION OF 2-BUTYRYL-3,5-DICHLOROPHENOXYACETIC ACID

This product is prepared following substantially the same procedure described in Example 42, Step A, by alkylation of 2-butyryl-3,5-dichlorophenol with ethyl bromoacetate. This procedure yields 2-butyryl-3,5-dichlorophenoxyacetic acid which after recrystallization from a mixture of benzene and cyclohexane melts at 99–101° C.

Analysis.—Calculated for $C_{12}H_{12}Cl_2O_4$: C, 49.50; H, 4.16. Found: C, 49.70; H, 4.19.

STEP C.—PREPARATION OF 2-[2 - (DIMETHYLAMINOMETHYL)BUTYRYL] - 3,5 - DICHLOROPHENOXYACETIC ACID HYDROCHLORIDE

This Mannich cpd. is prepared from 2-butyryl-3,5-dichlorophenoxyacetic acid following substantially the same procedure described in Example 3, Step B, to give the Mannich cpd. with M.P. 164–167° C.

STEP D.—PREPARATION OF 2-(2-METHYLENEBUTYRYL)-3,5-DICHLOROPHENOXYACETIC ACID

This product was obtained by treatment of the Mannich cpd. with sodium bicarbonate solution by substantially the same procedure described in Example 3, Step C, to give 2-(2-methylenebutyryl)-3,5-dichlorophenoxyacetic acid which after recrystallization from aqueous acetic acid melts at 103.5–104.5° C.

Analysis.—Calculated for $C_{13}H_{12}Cl_2O_4$: C, 51.50; H, 3.99. Found: C, 51.45; H, 3.88.

EXAMPLE 47

2-methacryloyl-5-chlorophenoxyacetic acid

STEP A.—PREPARATION OF 2-ISOBUTYRYL-5-CHLOROPHENOL 3-chlorophenol (50 g., 0.39 mole) is added gradually to isobutyryl chloride (41.5 g., 0.39 mole). The mixture is heated on the steam bath for one hour and then distilled to give 3-chlorophenyl isobutyrate boiling at 119–120° C. at 11 mm. pressure, yield 66 g. (85%). The 3-chlorophenyl isobutyrate (60 g., 0.3 mole) is placed in a 1-liter round flask and anhydrous aluminum chloride (54 g., 0.36 mole) is added slowly with stirring and cooling at 30–40° C. A thick amber mixture results. The flask is plunged into a metal bath at 140° C. and kept at this temperature for 20 minutes at which time evolution of hydrogen chloride ceases. The flask is cooled slowly while rotating slowly. A thin glassy layer forms on the walls of the flask. Benzene (150 ml.) is added and the aluminum complex is decomposed by careful addition of 3 N hydrochloric acid with cooling. The benzene layer is separated and washed with 3 N hydrochloric acid and with water. The benzene is evaporated and the residue (58 g.) is taken up in ether and extracted with 500 ml. of 5% sodium hydroxide in several portions. The aqueous extract is acidified with 12 N hydrochloric acid and the oil that separates is extracted with ether and the ether solution dried over sodium sulfate. The ether then is evaporated and the residue is distilled to give 33.8 g. (57%) of 2-isobutyryl-5-chlorophenol), B.P. 133–138° C. at 11 mm. pressure.

Analysis.—Calculated for $C_{10}H_{11}ClO_2$: C, 60.44; H, 5.58; Cl, 17.84. Found: C, 60.43; H, 5.65; Cl, 17.92.

STEP B.—PREPARATION OF 2-ISOBUTYRYL-5-CHLOROPHENOXYACETIC ACID

Sodium hydride (51% in mineral oil), (2.4 g., 0.05 mole) is added to dry glycol dimethyl ether (50 ml.) in a dry 500 ml. round flask equipped with a stirrer, dropping funnel and reflux condenser protected from moisture. 2-isobutyryl-5-chlorophenol (10 g., 0.05 mole) is added cautiously. After gas evolution ceases, ethyl bromoacetate is added gradually. After 1 hour at 30° C., the mixture is refluxed for 2 hours. Water (4 ml.) is added dropwise and the solvent is distilled on the steam bath. Sodium hydroxide (8%, 100 ml.) is added to the residue and the mixture stirred and heated on the steam bath for 25 minutes. Norite (3 g.) is added and the mixture stirred for an additional 10 minutes. The Norite then is removed from the cool solution which is acidified with hydrochloric acid and extracted with ether. The ether extract is then extracted with 200 ml. of 10% sodium bicarbonate solution in several portions and the aqueous extract is acidified with hydrochloric acid to give a solid that is collected, dried and recrystallized from a 2:1 mixture of hexane and benzene to give 7.25 g. of 2-isobutyryl-5-chlorophenoxyacetic acid, M.P. 86–88° C. Further recrystallization from the same solvent gives the product melting at 89–90° C.

Analysis.—Calculated for $C_{12}H_{13}ClO_4$: C, 56.14; H 5.10; Cl, 13.82. Found: C, 56.25; H, 5.36; Cl, 13.71.

STEP C.—PREPARATION OF 2-(2-BROMOISOBUTYRYL)-5-CHLOROPHENOXYACETIC ACID 2-isobutyryl-5-chlorophenoxyacetic acid (10 g., 0.039 mole) is dissolved in acetic acid (45 ml.) and bromine (6.25 g., 0.039 mole) dissolved in acetic acid (20 ml.) is added to the stirred solution as fast as the bromine is decolorized (15–20 minutes). The reaction mixture is poured into water (300 ml.) with stirring and the solid that separates is crystallized from a 3:1 mixture of hexane and benzene to give 9.5 g. of 2-(2-bromoisobutyryl)-5-chlorophenoxyacetic acid, M.P. 109–111° C.

Analysis.—Calculated for $C_{12}H_{12}BrClO_4$: C, 42.95; H, 3.60; Br, 23.81; Cl, 10.56. Found: C, 42.89; H, 3.85; Br, 23.59; Cl, 10.71.

STEP D.—PREPARATION OF 2-METHACRYLOYL-5-CHLOROPHENOXYACETIC ACID

2 - (2-bromoisobutyryl)-5-chlorophenoxyacetic acid (4.3 g., 0.0128 mole) is dissolved in dry benzene (65 ml.) and silver fluoride (4.3 g.) is added. The mixture is stirred and heated for 10 minutes and water (50 ml.) is added and the mixture thereafter cooled to 20° C. and acidified with 6 N hydrochloric acid. The precipitated silver salts are removed by suction filtration and the benzene layer is separated from the aqueous layer of the filtrate and diluted with an equal volume of ether. This solution is extracted with several portions of 10% sodium bicarbonate solution and the aqueous extract then is acidified with hydrochloric acid to give an oil that gradually solidifies. When separated, dried and crystallized 4 times from a mixture of benzene and hexane there is obtained 0.8 g. of 2-methacryloyl-5-chlorophenoxyacetic acid, M.P. 100–101° C.

Analysis.—Calculated for $C_{12}H_{11}ClO_4$: C, 56.59; H, 4.35; Cl, 13.93. Found: C, 56.65; H, 4.58; Cl, 13.81.

The following example describes an alternate procedure for the preparation of the compound of Example 48.

EXAMPLE 49

*2-methacryloyl-5-chlorophenoxyacetic acid*

STEP A.—PREPARATION OF 3-CHLOROPHENYL PROPIONATE 3-chlorophenol (1.1 mole) is added gradually to propionyl chloride (101.5 g., 1.1 mole) and the mixture then heated on the steam bath for one hour and distilled to give 3-chlorophenyl propionate, B.P. 122.5° C. at 16 mm. pressure, $N_D^{25}$ 1.5105.

Analysis.—Calculated for $C_9H_9ClO_2$: C, 58.55; H, 4.91; Cl, 19.20. Found: C, 58.79; H, 5.00; Cl, 19.26.

STEP B.—PREPARATION OF 2-PROPIONYL-5-CHLOROPHENOL 3-chlorophenyl propionate (147 g., 0.8 mole) is placed in a 1-liter round flask and anhydrous aluminum chloride (128 g., 0.96 mole) is added slowly with stirring and cooling at 30–40° C. The flask then is plunged into a metal bath at 140° C. and kept at this temperature for 20 minutes. The flask then is cooled slowly while rotating slowly. Benzene (150 ml.) then is added and the aluminum complex is decomposed by the careful addition of 3 N hydrochloric acid with cooling. The benzene is separated and washed with 3 N hydrochloric acid and with water and the benzene then evaporated and the residue taken up in ether and extracted with 500 ml. of 5% sodium hydroxide in several portions. The aqueous extract is acidified with 12 N hydrochloric acid, and the oil that separates is extracted with ether and the ether solution dried over sodium sulfate. The ether then is evaporated and the residue distilled to give 2-propionyl-5-chlorophenol, B.P. 130–140° C. at 60 mm. pressure, M.P. 45–47° C., yield 78.5 g.

Analysis.—Calculated for $C_9H_9ClO_2$: C, 58.55; H, 4.91; Cl, 19.21. Found: C, 58.50; H, 5.12; Cl, 19.08.

STEP C.—PREPARATION OF 2-PROPIONYL-5-CHLOROPHENOXYACETIC ACID

This product is prepared following substantially the same procedure described in Example 48, Step B, employing the following substances:

2-propionyl-5-chlorophenol _____ 70 g., 0.379 mole.
51% sodium hydride _____ 18.2 g., 0.379 mole.
Ethylbromoacetate _____ 88.5 g., 0.530 mole.
Glycol dimethyl ether _____ 250 ml.

The procedure gives 62.5 g. of 2-propionyl-5-chlorophenoxyacetic acid which after crystallization from benzene melts at 117–118° C. A further recrystallization from benzene gives the product with M.P. 118.5–119.5° C.

Analysis.—Calculated for $C_{11}H_{11}ClO_4$: C, 54.44; H, 4.57; Cl, 14.61. Found: C, 54.33; H, 4.52; Cl, 14.33.

STEP D.—PREPARATION OF 2-[2-(DIMETHYLAMINOMETHYL)PROPIONYL] - 5 - CHLOROPHENOXYACETIC ACID HYDROCHLORIDE

The Mannich cpd. is prepared following substantially the same procedure described in Example 3, Step B, using the following substances:

2-propionyl-5-chlorophenoxyacetic
  acid _____ 10.02 g., 0.044 mole.
Paraformaldehyde _____ 1.44 g., 0.048 mole.
Dimethylamine hydrochloride ____ 3.58 g., 0.044 mole.
Acetic acid _____ 8 drops.

A solid product was obtained as a result of the above reaction and after crystallization from isopropyl alcohol gives 6.2 g. of 2-[2-(dimethylaminomethyl)propionyl]-5-chlorophenoxyacetic acid hydrochloride, M.P. 157–158° C. (Corr.)

Analysis.—Calculated for $C_{14}H_{18}ClNO_4 \cdot MCl$: C 50.1; H, 5.70; N, 4.17. Found: C, 50.16; H, 5.54; N, 4.18.

STEP E.—PREPARATION OF 2-METHACRYLOYL-5-CHLOROPHENOXYACETIC ACID

The Mannich cpd. (3.36 g., 0.01 mole), obtained as described above, is treated with a 10% sodium bicarbonate solution by substantially the same method described in Example 3, Step C, to give a syrup that slowly solidifies. After separating the solid, it is dissolved in dilute sodium bicarbonate and reprecipitated with hydrochloric acid, dried and when crystallized from a mixture of ligroin and benzene gives 1.2 g. (48%) of 2-methacryloyl-5-chlorophenoxyacetic acid, M.P. 100–101° C.

EXAMPLE 50

*[4-(2-methylenebutyryl)-m-phenylenedioxy]-diacetic acid*

STEP A.—PREPARATION OF (4-BUTYRYL-m-PHENYLENEDIOXY)DIACETIC ACID 4-butyrylresorcinol, 54 g., is reacted with 113 g. of chloroacetic acid and 96 g. of sodium hydroxide in 480 ml. of water on a steam bath for 5 hours after which it is acidified with hydrochloric acid to give 47.8 g. of (4-butyryl-m-phenylenedioxy)diacetic acid which after recrystallization from water melts at 159.2–160° C.

STEP B.—PREPARATION OF {4-[2-(DIMETHYLAMINO-METHYL)BUTYRYL]-m-PHENYLENEDIOXY}DIACETIC ACID HYDROCHLORIDE

The Mannich cpd. is prepared by substantially the same procedure described in Example 3, Step B, using the following substances:

| | | |
|---|---|---|
| (4-butyryl-m-phenylenedioxy)diacetic acid | g. | 23.6 |
| Paraformaldehyde | g. | 2.8 |
| Dimethylamine hydrochloride | g. | 7.12 |
| Glacial acetic acid | ml. | 0.5 |

The reaction yields the Mannich cpd. which is used in the following step without first purifying it.

STEP C.—PREPARATION OF [4-(2-METHYLENE-BUTYRYL)-m-PHENYLENEDIOXY]DIACETIC ACID

The Mannich cpd. obtained as described in Step B (31 g.) is treated with a sodium bicarbonate solution by substantially the same procedure described in Example 3, Step C, to give 19.4 g. (79%) of [4-(2-methylenebutyryl)-m-phenylenedioxy]diacetic acid which after recrystallization from 230 ml. of water melts at 49.5–51.5° C.

*Analysis.*—Calculated for $C_{15}H_{16}O_7$: C, 58.44; H, 5.23. Found: C, 58.12; H, 5.25.

EXAMPLE 51

*3-chloro-4-(2-methylenebutyryl)phenoxyacetamide*

In a 50 ml., round-bottomed flask is placed 3-chloro-4-(2-methylenebutyryl)phenoxyacetic acid obtained as described in Example 10 (5.36 g., 0.02 mole), thionyl chloride (4.76 g., 0.04 mole) and dry benzene (15 ml.) the flask is fitted with a reflux condenser having a drying tube. The mixture is refluxed on a steam bath for 1 hour during the initial part of the heating period there is a vigorous evolution of hydrogen chloride. The volatile materials are removed by distillation at 60° C. and the residual oil added with stirring to a cold 28% aqueous ammonia solution (100 ml.). The white solid that precipitates is removed by filtration, washed with water and dried in vacuo to give 4.2 g. (77%) of 3-chloro-4-(2-methylenebutyryl)phenoxyacetamide, M.P. 96–99° C. After several recrystallizations from a mixture of benzene and cyclohexane and concomitant treatment with decolorizing carbon the product melts at 103.5–105° C. (Corr.)

*Analysis.*—Calculated for $C_{13}H_{14}ClO_3N$: C, 58.22; H, 5.27; N, 5.23. Found: C, 58.16; H, 5.27; N, 5.23.

EXAMPLE 52

*2-(4-methacryloyl-3-chlorophenoxy)propionic acid*

STEP A.—PREPARATION OF 2-(4-PROPIONYL-3-CHLOROPHENOXY)PROPIONIC ACID

This product is prepared following substantially the same procedure described in Example 1, Step A, using the following substances:

| | | |
|---|---|---|
| 2-(3-chlorophenoxy) propionic acid | 20 g., | 0.099 mole. |
| Propionyl chloride | 11.45 g., | 0.1237 mole. |
| Aluminum chloride | 42.89 g., | 0.322 mole. |
| Carbon disulfide | 150 ml. | |

The aluminum complex obtained as a result of the above reaction is decomposed in 1 kg. of ice containing concentrated hydrochloric acid (100 ml.). The solid that separates is reprecipitated from sodium bicarbonate solution and crystallized from a 2:1 mixture of ether and ligroin and then from a 3:1 mixture of benzene and hexane to give 6.3 g. of 2-(4-propionyl-3-chlorophenoxy)propionic acid, M.P. 115–117° C.

*Analysis.*—Calculated for $C_{12}H_{13}ClO_4$: C, 56.15; H, 5.13; Cl, 13.81. Found: C, 55.76; H, 5.28; Cl, 13.49.

STEP B.—PREPARATION OF 2-{4-[2-(DIMETHYLAMINO-METHYL)PROPIONYL]-3-CHLOROPHENOXY}PROPIONIC ACID HYDROCHLORIDE

The Mannich cpd. is prepared by substantially the same procedure described in Example 3, Step B, using the following substances:

| | | |
|---|---|---|
| 2-(4-propionyl-3-chlorophenoxy) propionic acid | 5.65 g., | 0.022 mole. |
| Paraformaldehyde | 0.66 g., | 0.022 mole. |
| Dimethylamine hydrochloride | 1.8 g., | 0.022 mole. |
| Acetic acid | 5 drops. | |

The Mannich cpd. obtained by the above procedure is used in the following step without first purifying it.

STEP C.—PREPARATION OF 2-(4-METHACRYLOYL-3-CHLOROPHENOXY)PROPIONIC ACID

The above Mannich cpd. is treated with a solution of sodium bicarbonate by substantially the same procedure described in Example 3, Step C, to give 2-(4-methacryloyl-3-chlorophenoxy)propionic acid which after recrystallization from benzene gives 1.5 g. of product, M.P. 115.5–116.5° C.

*Analysis.*—Calculated for $C_{13}H_{13}ClO_4$: C, 58.11; H, 4.88; Cl, 13.20. Found: C, 58.25; H, 4.81; Cl, 13.07.

EXAMPLE 53

*2-[4-(2-methylenebutyryl)-3-chlorophenoxy]propionic acid*

STEP A.—PREPARATION OF 2-(4-BUTYRYL-3-CHLOROPHENOXY)PROPIONIC ACID

The above product is prepared by following substantially the same procedure described in Example 1, Step A, using the following substances:

| | | |
|---|---|---|
| 2-(3-chlorophenoxy)propionic acid | 20 g., | 0.099 mole. |
| Butyryl chloride | 13.2 g., | 0.123 mole. |
| Carbon disulfide | 150 ml. | |
| Aluminum chloride | 42.89 g., | 0.322 mole. |

Upon removal of the carbon disulfide, the residue is added to a mixture of 500 g. of ice and 50 ml. 12 N hydrochloric acid to give a tan oil. This oil is dissolved in ether, the ether solution washed with water and then extracted with dilute sodium bicarbonate solution. The bicarbonate extract is clarified with Norite and acidified with 6 N hydrochloric acid. The solid that separates is collected by filtration and the oily material removed by suction. The remaining product is dissolved in bicarbonate solution, washed with ether, filtered and acidified with 6 N hydrochloric acid. The solid that separates (M.P. 79–82° C.) is recrystallized from a mixture of benzene and ligroin to give 8.35 g. of 2-(4-butyryl-3-chlorophenoxy)propionic acid, M.P. 80–83.5° C. Additionally recrystallizations from a mixture of ligroin and benzene gives the product melting at 82.5–84° C.

*Analysis.*—Calculated for $C_{13}H_{15}ClO_4$: C, 57.67; H, 5.58; Cl, 13.10. Found: C, 57.52; H, 5.78; Cl, 13.10.

STEP B.—PREPARATION OF 2-{4-[2-(DIMETHYLAMINO-METHYL)BUTYRYL]-3-CHLOROPHENOXY}PROPIONIC ACID HYDROCHLORIDE

This Mannich cpd. is prepared by following substantially the same procedure described in Example 3, Step B, using the following substances:

| | | |
|---|---|---|
| 2-(4-butyryl-3-chlorophenoxy) propionic acid | 8.34 g., | 0.031 mole. |
| Paraformaldehyde | 1.02 g., | 0.034 mole. |
| Dimethylamine hydrochloride | 2.75 g., | 0.034 mole. |
| Acetic acid | 4 drops. | |

The above procedure gives a waxy solid which after trituration with acetone gives the Mannich cpd. in the form of a white solid, M.P. 152–155° C., yield 6.8 g. Further recrystallization of the Mannich cpd. from isopropyl alcohol gives M.P. 158–159° C.

*Analysis.*—Calculated for $C_{16}H_{22}ClNO_4 \cdot HCl$: C, 52.75; H, 6.36; N, 3.85. Found: C, 52.87; H, 6.64; N, 3.79.

STEP C.—PREPARATION OF 2-[4-(2-METHYLENEBUTYRYL)-3-CHLOROPHENOXY]PROPIONIC ACID

The above Mannich cpd., 5.8 g., is dissolved in water and the aqueous solution then treated with sodium bicarbonate by substantially the same procedure described in Example 3, Step C, to give 2-[4-(2-methylenebutyryl)-3-chlorophenoxy]propionic acid, M.P. 87–88° C., yield 2.9 g. After recrystallization from a 3:1 mixture of ligroin and benzene the melting point remains the same, and there is obtained 2.35 g. of product.

*Analysis.*—Calculated for $C_{14}H_{15}ClO_4$: C, 59.47; H, 5.35; Cl, 12.54. Found: C, 59.80; H, 5.58; Cl, 12.34.

EXAMPLE 54

*N',N'-dibenzylethylenediamine di-{2-[4-(2-methylenebutyryl)-3-chlorophenoxy]butyrate}*

STEP A.—PREPARATION OF 2'-CHLORO-4'-METHOXYBUTYROPHENONE

Petroleum ether (750 ml.) is placed in a 2 liter flask fitted with a mechanical stirrer, thermometer, reflux condenser capped with a calcium chloride drying tube and a flask attached via Gooch tubing. Butyryl chloride (191.8 g., 1.8 mole) and 3-chloroanisole (213.9 g., 1.5 mole) are added and the stirrer started. 200 g., 1.5 mole anhydrous aluminum chloride then is added portionwise via the Gooch tubing to the reaction mixture over 30 minutes. After the addition is completed, stirring is continued for another two hours maintaining the temperature at no more than 30° C. The petroleum ether layer is decanted and the viscous material remaining is poured into a mixture of crushed ice (1 kg.) and concentrated hydrochloric acid (450 ml.). The oil that separates is extracted 3 times with 500 ml. portions of ether, the ether extracts washed with 150 ml. of 5% hydrochloric acid then 2 times with 150 ml. portions of water, and then dried over anhydrous sodium sulfate. The ether is removed and the residue distilled. The fraction boiling at 122–138° C. at 1.5–2.9 mm. pressure is collected giving 298 g. (94%) of 2'-chloro-4'-methoxybutyrophenone admixed with an isomeric compound, 2'-methoxy-4'-chlorobutyrophenone. The mixture is employed in the following step to form the corresponding phenols which are easily separated.

STEP B.—PREPARATION OF 2'-CHLORO-4'-HYDROXYBUTYROPHENONE

The mixture of anisoles obtained as described above (298 g., 1.4 mole) and n-heptane (1,500 ml.) are placed in a reaction flask equipped and assembled as described above. The stirrer is started and aluminum chloride (373.4 g., 2.8 mole) is added portionwise over a period of 15 minutes maintaining the temperature at between 20° to 55° C. The reaction mixture is refluxed for 3 hours on a steam bath and then cooled to room temperature and the heptane layer decanted. The residue is treated with a mixture of crushed ice (1 kg.) and concentrated hydrochloric acid (600 ml.) which gives a yellow solid which is extracted 3 times with 500 ml. portions of ether. The combined ether extracts are washed with 2–250 ml. portions of water and dried over anhydrous sodium sulfate. The ether is removed and the residue fractionated to give a first fraction, B.P. 145° C. at 0.03 mm. of 2'-hydroxy-4'-chlorobutyrophenone and a second fraction, B.P. 160–178° C. at 0.03 mm. of 2'-chloro-4'-hydroxybutyrophenone. Recrystalliaztion from cyclohexane gives 2'-chloro-4'-hydroxybutyrophenone, M.P. 82.5–84° C. which by gas-liquid chromatography is shown to be pure material.

*Analysis.*—Calculated for $C_{10}H_{11}ClO_2$: C, 60.46; H, 5.58; Cl, 17.85. Found: C, 60.15; H, 5.66; Cl, 17.77.

STEP C.—PREPARATION OF 2-(4-BUTYRYL-3-CHLOROPHENOXY)BUTYRIC ACID

Sodium (4.8 g., 0.21 g. atom) is dissolved in 150 ml. of absolute alcohol to form a solution of sodium ethoxide. 2'-chloro - 4' - hydroxybutyrophenone, obtained as described above (39.73 g. 0.20 mole), is added, the solution heated to boiling and ethyl α-bromobutyrate (39.01 g., 0.20 mole) added dropwise with stirring during 0.5 hour. The mixture is stirred and refluxed for 4.5 hours and the solvents then distilled on a steam bath. To the residue sodium hydroxide (16 g., 0.4 mole) in water (150 ml.) is added and the mixture heated with stirring for 2.25 hours. The reaction mixture then is cooled and extracted with ether and acidified with hydrochloric acid. The oil that separates is extracted with ether, the solution dried over anhydrous sodium sulfate and the ether evaporated to give a residue which distills at between 173–197° C. at 0.2 mm. pressure to give 46.5 g. (81%) of 2-(4-butyryl-3-chlorophenoxy)butyric acid.

*Analysis.*—Calculated for $C_{14}H_{17}ClO_4$: C, 59.05; H, H, 6.02; Cl, 12.46. Found: C, 59.22; H, 6.23; Cl, 12.24.

STEP D.—PREPARATION OF 2-{4-[2-(DIMETHYLAMINOMETHYL)BUTYRYL] - 3 - CHLOROPHENOXY}BUTYRIC ACID HYDROCHLORIDE

This Mannich cpd. is prepared following substantially the same procedure described in Example 3, Step D, using the following substances:

2-(4-butyryl-3-chlorophenoxy)butyric acid _____ 22.72 g., 0.08 mole.
Paraformaldehyde _____ 2.4 g., 0.08 mole.
Dimethylamine hydrochloride ____ 6.48 g., 0.08 mole.
Acetic acid _____ 10 drops.

The solid residue obtained as a result of the above procedure is triturated with acetone and collected by filtration to give 11.4 g. of the Mannich cpd., M.P. 157–158° C. After recrystallization from isopropyl alcohol there is obtained 9.55 g. of Mannich cpd., M.P. 158–159° C.

*Analysis.*—Calculated for $C_{17}H_{24}ClNO_4 \cdot HCl$: C, 53.97; H, 6.66; N, 3.70. Found: C, 54.28; H, 6.52; N, 3.63.

STEP E.—PREPARATION OF N',N'-DIBENZYLETHYLENEDIAMINE DI - {2-[4-(2-MTHYLENEBUTYRYL)-3-CHLOROPHENOXY]BUTYRATE}

The Mannich cpd. prepared as described in Step D (9 g., 0.023 mole) is dissolved in 150 ml. of water and the solution made basic with 10% sodium bicarbonate. The solution is heated at 80–90° C. for 5 minutes, cooled and acidified with hydrochloric acid. The oil that separates is taken up in ether, dried and the ether evaporated. The remaining oil is redissolved in dry ether and N',N'-dibenzylethylenediamine (4 g.) is added to give 6.2 g. of the N',N' - dibenzylethylenediamine di-{2-[4-(2-methylenebutyryl) - 3 - chlorophenoxy]butyrate}, M.P. 136.5–137.5° C. After recrystallization from 38 ml. of isopropyl alcohol, the product melts at 137–137.5° C.

*Analysis.*—Calculated for $(C_{15}H_{17}ClO_4)_2 \cdot C_{16}H_{20}N_2$: C, 66.26; H, 6.59; Cl, 8.50; N, 3.36. Found: C, 66.07; H, 6.59; Cl, 8.51; N, 3.36.

EXAMPLE 55

*3-(4-methacryloyl-3-chlorophenoxy)propionic acid*

STEP A.—PREPARATION OF 3-(4-PROPIONYL-3-CHLOROPHENOXY)PROPIONIC ACID

This product is prepared following substantially the same procedure described in Example 1, Step A, using the following substances:

Propionyl chloride _____ 24.55 g. 0.265 mole.
3-(3-chlorophenoxy)propionic acid 42.5 g., 0.213 mole.
Aluminum chloride _____ 92.11 g., 0.691 mole.
Carbon disulfide _____ 300 ml.

After removal of the carbon disulfide, a gummy residue is obtained which is poured into a mixture of 500 g. of ice and 50 ml. of concentrated hydrochloric acid. The solid that separates is reprecipitated twice from sodium bicarbonate and the resulting solid is crystallized four times from benzene to give 14.65 g. of 3-(4-propionyl-3-chlorophenoxy)propionic acid, M.P. 90.5–92.5° C. Following further recrystallization from benzene the product melts at 91.7–93° C.

Analysis.—Calculated for $C_{12}H_{13}ClO_4$: C, 56.15; H, 5.11; Cl, 13.81. Found: C, 56.51; H, 5.34; Cl, 13.69.

STEP B.—PREPARATION OF 3-{4-[2-(DIMETHYLAMINOMETHYL)PROPIONYL] - 3 - CHLOROPHENOXY}PROPIONIC ACID HYDROCHLORIDE

This Mannich cpd. is prepared following substantially the same procedure described in Example 3, Step B, using the following substances:

3-(4-propionyl-3-chlorophenoxy)-
  propionic acid _____ 14.6 g., 0.057 mole.
Paraformaldehyde _____ 1.8 g., 0.06 mole.
Dimethylamine hydrochloride ____ 4.86 g., 0.06 mole.
Acetic acid _____ 10 drops.

The Mannich cpd. obtained by the foregoing procedure is used in the following step without first purifying it.

STEP C.—PREPARATION OF 3-(4-METHACRYLOYL)-3-CHLOROPHENOXY)PROPIONIC ACID

The Mannich cpd. obtained as described above is treated with sodium bicarbonate by substantially the same procedure described in Example 3, Step C, to give 3-(4-methacryloyl-3-chlorophenoxy)propionic acid which after being crystallized twice from a 2:3 mixture of ether and ligroin there is obtained 2.5 g. of product, M.P. 72.5–73.5° C.

Analysis.—Calculated for $C_{13}H_{13}ClO_4$: C, 58.11; H, 4.88; Cl, 13.20; C, 58.22; H, 5.06; Cl, 13.06.

EXAMPLE 56

*4-(2-ethylidenepropionyl)-3-chlorophenoxyacetic acid*

STEP A.—PREPARATION OF 4-(2-METHYLBUTYRYL)-3-CHLOROPHENOXYACETIC ACID

The above product was made following substantially the same procedure described in Example 37, Step A, using the following substances:

4 - (2 - methylenebutyryl) - 3-chloro-
  phenoxyacetic acid _____ 57.1 g., 0.212 mole.
Isopropyl alcohol _____ 200 ml.
5% palladium on carbon _____ 3.0 g.

The above procedure gives 41.2 g. of 4-(2-methylbutyryl)-3-chlorophenoxyacetic acid, M.P. 138–139.5° C. After further recrystallization from benzene the product melts at 139–140° C.

Analysis.—Calculated for $C_{13}H_{15}ClO_4$: C, 57.68; H, 5.58; Cl, 13.10. Found: C, 57.68; H, 5.74; Cl, 13.07.

STEP B.—PREPARATION OF 4-(2-BROMO-2-METHYLBUTYRYL)-3-CHLOROPHENOXYACETIC ACID 4-(2-methylbutyryl)-3-chlorophenoxyacetic acid (10 g., 0.037 mole) is dissolved in acetic acid (200 ml.) and bromine (6.0 g., 0.037 mole) in acetic acid (50 ml.) is added dropwise with stirring over a period of 10–15 minutes. The reaction is initiated by adding 2 drops of 48% hydrobromic acid. The reaction mixture then is added to 1-liter of water containing a little sodium bisulfite and the solid that separates is collected, washed with water and dried in air at 65° C. After crystallization from benzene, there is obtained 10.9 g. of 4-(2-bromo-2-methylbutyryl)-3-chlorophenoxyacetic acid, M.P. 123–124° C.

Analysis.—Calculated for $C_{13}H_{14}BrClO_4$: C, 44.66; H, 4.04; Br, 22.86; Cl, 10.01. Found: C, 44.12; H, 4.03; Br, 22.75; Cl, 10.09.

STEP C.—PREPARATION OF 4-(2-ETHYLIDENEPROPIONYL)-3-CHLOROPHENOXYACETIC ACID

The bromo compound prepared as described in Step B, (14 g., 0.04 mole), lithium chloride (5.1 g., 0.12 mole) and dimethylformamide are mixed and heated at 80–90° C. for 4 hours. The mixture then is poured into 500 ml. of water. The solid that separates is reprecipitated twice from sodium bicarbonate and then crystallized from benzene to give 4.5 g. of 4-(2-ethylidenepropionyl)-3-chlorophenoxyacetic acid, M.P. 114–116° C.

Analysis.—Calculated for $C_{13}H_{13}ClO_4$: C, 58.11; H, 4.88; Cl, 13.20. Found: C, 58.25; H, 4.83; Cl, 13.01.

EXAMPLE 57

*4-(2-ethylidenebutyryl)-3-chlorophenoxyacetic acid*

STEP A.—PREPARATION OF 4-(2-ETHYLBUTYRYL)-3-CHLOROPHENOL

To a mixture of 3-chlorophenetol (31.52 g., 0.2 mole) and α-ethyl-butyrylchloride (26.92 g., 0.2 mole) in petroleum ether, aluminum chloride (73.34 g., 0.6 mole) is added gradually with stirring at 0.5° C. over a period of 0.5 hours. The mixture is stirred at 0.5° C. for 20 minutes and then allowed to warm to 25° C. while stirring for an additional three hours. The mixture then is kept at 25–30° C. for 48 hours. The petroleum ether then is decanted and the residue added to 500 g. of ice containing 40 ml. of concentrated hydrochloric acid. The dark oil that separates is extracted with ether, the ether solution washed with water and extracted with 2.5% sodium hydroxide. The sodium hydroxide extract is treated with Norite and filtered free of carbon, acidified with hydrochloric acid to give a green oil which in turn is extracted with ether. The ether extract is dried over sodium sulfate, the ether evaporated and the residue distilled at 148–181° C. at 0.3 mm. pressure to give 11.44 g. (25%) of 4-(2-ethylbutyryl)-3-chlorophenol.

STEP B.—PREPARATION OF 4-(2-ETHYLBUTYRYL)-3-CHLOROPHENOXYACETIC ACID

To a suspension of sodium hydride (51% in mineral oil), 2.42 g. (0.05 mole) in dry glycol dimethyl ether is added slowly the phenol prepared as described in Step A (11.44 g., 0.050 mole) in enough glycol dimethyl ether to dissolve it. The mixture is stirred for 15 minutes and ethyl bromoacetate (8.45 g., 0.050 mole) is added dropwise with stirring. The mixture then is refluxed for 2.5 hours and the glycol dimethyl ether evaporated under reduced pressure at 80–90° C. Sodium hydroxide (4.14 g., 0.101 mole) in 30 ml. of water is added to the residue, the mixture is stirred and heated at 90° C. for 1.5 hours and the residual mineral oil extracted with ether from the cooled solution. The extract is acidified with hydrochloric acid and the solid that separates is dissolved in sodium bicarbonate solution and treated with Norite, filtered and acidified to give 12.3 g. (85%), of 4-(2-ethylbutyryl)-3-chlorophenoxyacetic acid which after drying in air melts at 146–147° C. Crystallization from benzene gives the product melting at 147–149° C.

Analysis.—Calculated for $C_{14}H_{17}ClO_4$: C, 59.05; H, 6.02; Cl, 12.45. Found: C, 59.29; H, 6.31; Cl, 12.39.

STEP C.—PREPARATION OF 4-(2-ETHYL-2-BROMOBUTYRYL)-3-CHLOROPHENOXYACETIC ACID

To a solution of 4-(2-ethylbutyryl)-3-chlorophenoxyacetic acid (10.64 g., 0.0374 mole) in 200 ml. of acetic acid is added with stirring 48% hydrobromic acid (2 drops) followed by the dropwise addition of bromine (6.0 g., 0.0374 mole) in 50 ml. of acetic acid. After the addition is completed, the mixture is stirred for 15 minutes and then poured into one liter of water containing 2 g. of sodium bisulfite. The solid that separates is collected on a filter, washed with water, dried in air and crystallized from 55 ml. of benzene to give 10.16 g. of 4-(2-ethyl-2-bromobutyryl)-3-chlorophenoxyacetic acid, M.P. 130–131° C.

*Analysis.*—Calculated for $C_{14}H_{16}BrClO_4$: C, 46.23; H, 4.44; Br, 21.98; Cl, 9.75. Found: C, 46.56; H, 4.72; Br, 21.91; Cl, 9.72

STEP D.—PREPARATION OF 4-(2-ETHYLIDENEBUTYR-YL)-3-CHLOROPHENOXYACETIC ACID

The bromoketone prepared as described in Step C. (6. g., 0.0185 mole) is dissolved in 400 ml. of hot benzene. Powdered silver acetate (7 g., 0.042 mole) is added slowly with mechanical stirring. The mixture is heated for about 5.5 hours and then acidified with 6 N hydrochloric acid. The silver salts that form are removed by filtration, the benzene layer separated and two grams of Darco are added thereto and the mixture then kept at 25–30° C. for 48 hours. The solution then is filtered, diluted with ether and extracted with 5% sodium bicarbonate solution. The aqueous extract is treated with Norite and acidified to give 4-(2-ethylidenebutyryl)-3-chlorophenoxyacetic acid which after drying in air at 65° C. and recrystallization from benzene melts at 118–119° C., yield 2.9 g.

*Anaylsis.*—Calculated for $C_{14}H_{15}ClO_4$: C, 59.47; H, 5.35; Cl, 12.54. Found: C, 59.73; H, 5.12; Cl, 12.50.

The following example describes an alternate method for preparing the compound of Example 57.

EXAMPLE 58

*4-(2-ethylidenebutyryl)-3-chlorophenoxyacetic acid*

The bromoketone prepared as described in Example 57, Step C (8.3 g., 0.0228 mole), is dissolved in dimethylformamide (60 ml.) and anhydrous lithium chloride (2.9 g., 0.0684 mole) is added. The mixture is heated on the steam bath with occasional shaking for two hours, cooled and poured into 1 liter of cold water. The solid that separates is collected by filtration, washed with 500 ml. of water and then dissolved in dilute sodium bicarbonate solution. The solution is shaken with Norite, filtered free of solid and acidified. The solid that separates is dried in air to give 5 g. of 4-(2-ethylidenebutyryl)-3-chlorophenoxyacetic acid, M.P. 119–120° C.

EXAMPLE 59

*3-chloro-4-(3-phenylacryloyl)phenoxyacetic acid*

3-chloro-4-acetylphenoxyacetic acid prepared as described in Example 4, Step A (4.4 g., 0.0193 mole), and benzaldehyde (2.1 g., 0.0193 mole) is dissolved in a mixture of sodium hydroxide (1.8 g., 0.045 mole) in 160 ml. of water and 10 ml. of ethanol. The solution is kept at 25–30° C. for 16 hours, acidified and the solid that separates is collected, dried at 65° C. and crystallized from benzene to give 1.2 g. of 3-chloro-4-(3-phenylacryloyl)phenoxyacetic acid, M.P. 139–140° C.

*Analysis.*—Calculated for $C_{17}H_{13}ClO_4$: C, 64.47; H, 4.13; Cl, 11.19. Found: C, 64.09; H, 3.99; Cl, 10.97.

EXAMPLE 60

*3-chloro-4-[3-(o-chlorophenyl)acryloyl]phenoxyacetic acid*

The above product is prepared following substantially the same procedure described in Example 59 employing an equimolecular amount of o-chlorobenzaldehyde in place of the benzaldehyde employed in that example. There is thus obtained 3-chloro-4-[3-(o-chlorophenyl)acryloyl]phenoxyacetic acid which after crystallization from acetonitrile melts at 166–168° C.

*Analysis.*—Calculated for $C_{17}H_{12}Cl_2O_4$: C, 58.13; H, 3.45; Cl, 20.19. Found: C, 58.51; H, 3.52; Cl, 19.91.

EXAMPLE 61

*4-(2-benzylidenepropionyl)-3-chlorophenoxyacetic acid*

The above product was prepared following substantially the same procedure described in Example 59, employing an equimolecular amount of 4-propionyl-3-chlorophenoxyacetic acid in place of the 4-acetyl-3-chlorophenoxyacetic acid employed in that example. There is thus obtained 4-(2-benzylidenepropionyl)-3-chlorophenoxyacetic acid which after crystallization from benzene melts at 140–141.5° C.

*Analysis.*—Calculated for $C_{18}H_{15}ClO_4$: C, 65.35; H, 4.57; Cl, 10.74. Found: , 65.49; H, 4.35; Cl, 10.55.

EXAMPLE 62

*4-[3-(o-hydroxyphenyl)acryloyl]-3-chlorophenoxyacetic acid*

The above product was prepared following substantially the same procedure described in Example 59 employing an equimolecular amount of salicylaldehyde in place of the benzaldehyde employed in that example. There is thus obtained 4-[3-(o-hydroxyphenyl)acryloyl]-3-chlorophenoxyacetic acid in the form of its sodium salt.

*Analysis.*—Calculated for $C_{17}H_{12}ClO_5Na$: C, 57.56; H, 3.41; Cl, 10.00. Found: C, 57.80; H, 3.79; Cl, 9.85.

EXAMPLE 63

*3-chloro-4-methacryloylphenylmercaptoacetic acid*

STEP A.—PREPARATION OF 3-CHLORO-4-PROPIONYL-PHENYLMERCAPTOACETIC ACID

To a mixture of 55 g. (0.27 mole) of 3-chlorophenylmercaptoacetic acid and 112 g. (0.85 mole) of aluminum chloride in 300 cc. of carbon disulfide is added 25.7 g. (0.27 mole) of propionyl chloride slowly and with stirring during a period of 30 minutes. The mixture is refluxed for 3 hours with carbon disulfide decanted and the viscous precipitate added to a mixture of ice and hydrochloric acid. The oily product obtained is added to a saturated solution of sodium bicarbonate and an insoluble impurity is filtered off. The filtrate is acidified to precipitate 3-chloro-4-propionylphenylmercaptoacetic acid which after recrystallization from benzene gives 31 g. of product melting at 89–91.5° C.

*Analysis.*—Calculated for $C_{11}H_{11}ClO_3S$: C, 51.05; H, 4.29. Found: C, 51.02; H, 4.55.

STEP B.—PREPARATION OF 3-CHLORO-4-[2-(1-PIPERI-DYLMETHYL)PROPIONYL]PHENYLMERCAPTOACETIC ACID HYDROCHLORIDE

The above Mannich cpd. is prepared following substantially the same procedure described in Example 3, Step B, using the following substances:

| | |
|---|---|
| 3-chloro-4-propionylphenylmercaptoacetic acid | 12.3 g., 0.0476 mole. |
| Paraformaldehyde | 2.1 g., 0.07 mole. |
| Piperidine hydrochloride | 6.3 g., 0.052 mole. |
| 10% alcoholic hydrogen chloride | 0.75 cc. |

The above reaction gives a viscous melt which is dissolved in 125 cc. of boiling isopropyl alcohol. Upon cooling there is obtained 11.1 g. of 3-chloro-4-[2-(1-piperidylmethyl)propionyl]phenylmercaptoacetic acid hydrochloride, M.P. 153–155° C.

STEP C.—PREPARATION OF 3-CHLORO-4-METHACRYLO-YLPHENYLMERCAPTOACETIC ACID

A solution of 3.1 g. (0.008 mole) of the Mannich cpd. obtained as described above in 30 cc. of saturated sodium bicarbonate solution is heated 1 minute on the steam bath. Acidification of the solution precipitates the unsaturated ketone as a gum which soon crystallizes. Several recrystallizations from a mixture of cyclohexane and benzene give 0.6 g. of 3-chloro-4-methacryloylphenylmercaptoacetic acid, M.P. 110–112° C.

*Analysis.*—Calculated for $C_{12}H_{11}ClO_3S$: C, 53.23; H, 4.10. Found: C, 53.44; H, 4.13.

EXAMPLE 64

*3-methyl-4-methacryloylphenylmercaptoacetic acid*

STEP A.—PREPARATION OF 3-METHYL-4-PROPIONYL-PHENYLMERCAPTOACETIC ACID

This product is prepared following substantially the same procedure described in Example 63, Step A, employing 0.27 mole of m-tolylmercaptoacetic acid in place of the 3-chlorophenylmercaptoacetic acid employed in that example. There is thus obtained 3-methyl-4-propionylphenylmercaptoacetic acid which after crystallization from aqueous ethanol melts at 93.5–94.5° C.

*Analysis.*—Calculated for $C_{12}H_{14}O_3S$: C, 60.48; H, 5.92. Found: C, 60.47; H, 5.84.

STEP B.—PREPARATION OF 3-METHYL-4-[2-(1-PIPERIDYLMETHYL) PROPIONYL] PHENYLMERCAPTOACETIC ACID HYDROCHLORIDE

The above Mannich cpd. is prepared following substantially the same procedure described in Example 3, Step B, using the following substances:

3 - methyl - 4 - propionylphenylmercaptoacetic acid _____ 17.8 g., 0.075 mole.
Paraformaldehyde _____ 3.8 g., 0.125 mole.
Piperidine hydrochloride _____ 10.4 g., 0.085 mole.
10% alcoholic hydrogen chloride ___ 1 cc.

A syrupy melt is obtained as a result of the above procedure which soon crystallizes. After trituration with hot isopropyl alcohol there is obtained 22.5 g. of the Mannich cpd., M.P. 172–174° C.

STEP C.—PREPARATION OF 3-METHYL-4-METHACRYLOYLPHENYLMERCAPTOACETIC ACID

A solution of 13.5 g. (0.036 mole) of the Mannich cpd. obtained as described above in 150 cc. of saturated sodium bicarbonate solution is heated 2 minutes on the steam bath. Acidification precipitates the unsaturated ketone which after recrystallization from a mixture of cyclohexane and benzene gives 3.2 g. of 3-methyl-4-methacryloylphenylmercaptoacetic acid, M.P. 87.5–89.5° C.

*Analysis.*—Calculated for $C_{13}H_{14}O_3S$: C, 62.38; H, 5.64. Found: C, 61.85; H, 5.58.

EXAMPLE 65

*3-(3-chloro-4-methacryloylphenylmercapto)propionic acid*

STEP A.—PREPARATION OF 3-(3-CHLOROPHENYLMERCAPTO)PROPIONIC ACID

A solution of 14.5 g. (0.10 mole) of m-chlorothiophenol in 125 cc. of 5% sodium hydroxide solution is mixed with a solution of 15.9 g. (0.10 mole) of β-bromopropionic acid in 150 cc. of saturated sodium bicarbonate solution. After 4 hours the solution is acidified and the precipitated product recrystallized from aqueous ethanol to give 19.6 g. of 3-(3-chlorophenylmercapto)propionic acid, M.P. 79.5–81.5° C.

*Analysis.*—Calculated for $C_9H_9ClO_2S$: C, 49.88; H, 4.19. Found: C, 50.53; H, 4.23.

STEP B.—PREPARATION OF 3-(3-CHLORO-4-PROPIONYLPHENYLMERCAPTO)PROPIONIC ACID

To a mixture of 8.7 g. (0.04 mole) of 3-(3-chlorophenylmercapto)propionic acid and 16 g. (0.12 mole) of aluminum chloride in 50 cc. of carbon disulfide is added during 30 minutes 4.2 g. (0.045 mole) of propionyl chloride with stirring and refluxing. The mixture is refluxed for an additional 5 hours. Carbon disulfide then is decanted and the viscous precipitate added to ice and hydrochloric acid. The oil that separates solidifies and after recrystallization from aqueous acetic acid gives 3.1 g. of 3-(3-chloro-4-propionylphenylmercapto)propionic acid, M.P. 73–75.5° C.

*Analysis.*—Calculated for $C_{12}H_{13}ClO_3S$: C, 52.84; H, 4.80. Found: C, 52.83; H, 5.00.

STEP C.—PREPARATION OF 3-[3-CHLORO-4-(2-(1-PIPERIDYLMETHYL) PROPIONYL) PHENYLMERCAPTO]-PROPIONIC ACID HYDROCHLORIDE

A mixture of 13.7 g. (0.05 mole) of 3-(3-chloro-4-propionylphenylmercapto)propionic acid, 2.5 g. (0.085 mole) of paraformaldehyde, 6.7 g. (0.055 mole) of piperidine hydrochloride and 1 cc. of 10% alcoholic hydrogen chloride is heated 1.25 hours on the steam bath to give the Mannich cpd. which is used in the following step without further purification.

STEP D.—PREPARATION OF 3-(3-CHLORO-4-METHACRYLOYLPHENYLMERCAPTO)PROPIONIC ACID

The syrupy melt obtained by the process described in Step C is triturated with boiling ether. The residue is dissolved in 250 cc. of saturated sodium bicarbonate solution and after 30 minutes the solution is acidified to precipitate the product which after 5 recrystallizations from a mixture of cyclohexane and benzene gives 4.5 g. of 3-(3-chloro-4-methacryloylphenylmercapto)propionic acid, M.P. 81–83° C.

*Analysis.*—Calculated for $C_{13}H_{13}ClO_3S$: C, 54.83; H, 4.60; Cl, 12.45. Found: C, 54.71; H, 4.62; Cl, 12.28.

EXAMPLE 66

*4-(3-chloro-4-methacryloylphenoxymethyl) benzoic acid*

STEP A.—PREPARATION OF ETHYL 4-(3-CHLORO-4-PROPIONYLPHENOXYMETHYL)BENZOATE 3-chloro-4-propionylphenol 18 g. (0.10 mole) is dissolved in 50 ml. of anhydrous methanol. Clean sodium metal (1.85 g., 0.08 mole) is added in portions. Ethyl 4-chloromethyl-benzoate (10 g., 0.05 mole) is added when the sodium is dissolved. The reaction mixture then is refluxed 4 hours, the mixture allowed to cool and 100 ml. of water is added. The reaction mixture is extracted with ethyl ether, washed with 5% sodium hydroxide and water and the organic phase dried and evaporated to give a brown oil which crystallizes on standing. After recrystallization from ethanol there is obtained 15 g. (86%) of ethyl 4-(3-chloro-4-propionylphenoxymethyl)benzoate, M.P. 58–60° C.

*Analysis.*—Calculated for $C_{19}H_{19}O_4Cl$: C, 65.71; H, 5.47. Found: C, 66.26; H, 5.55.

STEP B.—PREPARATION OF 4-(3-CHLORO-4-PROPIONYLPHENOXYMETHYL)BENZOIC ACID

Ethyl 4-(3-chloro-4-propionylphenoxymethyl)benzoate (5 g., 0.015 mole) in 5% sodium hydroxide solution (20 ml.) is heated with stirring on a steam bath for 3.5 hours. Upon cooling and with acidification with concentrated hydrochloric acid a while solid is obtained, which after recrystallization from a mixture of ethanol and water gives 4.1 g. (90%) of 4-(3-chloro-4-propionylphenoxymethyl)benzoic acid, M.P. 153–155° C.

*Analysis.*—Calculated for $C_{17}H_{15}O_4Cl$: C, 63.95; H, 4.70. Found: C, 64.18; H, 4.91.

STEP C.—PREPARATION OF 4-(3-CHLORO-4-METHACRYLOYLPHENOXYMETHYL)BENZOIC ACID 4-(3-chloro-propionylphenoxymethyl)benzoic acid (5.0 g., 0.016 mole), paraformaldehyde (2 g., 0.070 mole), and dimethylamine hydrochloride (2.5 g., 0.032 mole) are mixed together in a 100 ml. round bottom flask fitted with a drying tube. The flask is heated to 120–130° C. for ½ hour with aspirator vacuum being applied for one minute every 6 or 7 minutes. The mixture then is reduced to a homogeneous yellow oil which is taken up in hot isopropanol (20 ml.) and 200 ml. of ether is added. After cooling, a solid material precipitates, the ether solution is decanted and evaporated to a yellow isopropanol solution. Excess water is added and a solid is formed which after careful fractional crystallization from 10–15 ml. of absolute ethanol gives 1 g. (18%) of 4-(3-chloro-4-methacryloylphenoxymethyl)benzoic acid, M.P. 166.5–168° C.

*Analysis.*—Calculated for $C_{18}H_{15}O_4Cl$: C, 65.35; H, 4.57. Found: C, 65.27; H, 4.85.

EXAMPLE 67

*3-[3-chloro-4-(2-methylenebutyryl)phenoxymethyl] benzoic acid*

STEP A.—PREPARATION OF METHYL 3-BROMOMETHYLBENZOATE 3-methylbenzoyl chloride (105.5 g., 0.68 mole) is placed in a 4 necked flask, fitted with stirrer, reflux condenser, drying tube, thermometer, and dropping funnel, and heated to 180° C., stirring is started and the temperature maintained at 180° C., and bromine (110 g., 0.69 mole) is added dropwise over one hour. The mixture is then stirred an additional 1.5 hours at 180° C. and finally cooled. With stirring maintained, methanol (67 ml.) is added to the mixture dropwise over one hour. The mixture then is distilled to give the pure product which crystallizes upon standing. There is thus obtained 79 g. (50%) of methyl 3-(bromoethyl)benzoate, B.P. 136–137° C. at 8 mm. pressure.

STEP B.—PREPARATION OF METHYL 3-(3-CHLORO-4-BUTYRYLPHENOXYMETHYL)BENZOATE 3-chloro-4-butyrylphenol (19 g., 0.09 mole) is dissolved in anhydrous methanol (200 ml.) and sodium metal (1.75 g., 0.075 mole) is added in portions. When all the sodium is dissolved, methyl 3-bromomethylbenzoate (10 g., 0.044 mole) is added and the mixture refluxed 24 hours. The volume of solvent is reduced to about 50 ml. and about 250 ml. of water is added. The mixture is extracted with ether, washed with 5% sodium hydroxide and water, dried and evaporated to give 6.1 g. (40%) of methyl 3-(3-chloro-4-butyrylphenoxymethyl)-benzoate in the form of an oil which distills at 220–221° C., at 0.3 mm. pressure.

STEP C.—PREPARATION OF 3-(3-CHLORO-4-BUTYRYLPHENOXYMETHYL)BENZOIC ACID

Methyl 3-(3-chloro-4-butyrylphenoxymethyl)benzoate (6 g., 0.018 mole) is heated on the steam bath and stirred for 1.5 hours with 10% sodium hydroxide (25 ml.). After cooling and acidification, there is obtained 3-(3-chloro-4-butyrylphenoxymethyl)benzoic acid which after recrystallization from a mixture of ethanol and water gives 3.7 g. (77%) of product, M.P. 132–133.5° C.

*Analysis.*—Calculated for $C_{18}H_{17}O_4Cl$: C, 64.96; H, 5.15. Found: C, 65.12; H, 5.42.

STEP D.—PREPARATION OF 3-[3-CHLORO-4-(2-METHYLENEBUTYRYL)PHENOXYMETHYL]BENZOIC ACID

3 - (3 - chloro - 4 - butyrylphenoxymethyl)benzoic acid (3.4 g., 0.010 mole), paraformaldehyde (3.0 g., 0.1 mole) and dimethylamine hydrochloride (3.0 g., 0.036 mole) are mixed in a 50 ml. flask fitted with a drying tube, the flask is heated to 120–130° C. for one-half hour, and aspirator vacuum applied for one minute at intervals of 5 to 6 minutes. The oil that forms is taken up into hot isopropanol (20 ml.), ether (200 ml.) is added and the mixture cooled. The liquid is decanted from the solid which precipitates and the ether evaporated to a yellow isopropanol solution. Excess water is added to give 3-[3 - chloro - 4 - (2 - methylenebutyryl)phenoxymethyl] benzoic acid in the form of a white solid which after recrystallization from a mixture of methanol and water gives 2.2 g. (60%) of product, M.P. 120.5–122° C.

*Analysis.*—Calculated for $C_{19}H_{17}O_4Cl$: C, 66.18; H, 5.02. Found: C, 66.40; H, 5.06.

EXAMPLE 68

*Methyl 2-[3-chloro-4-(2-methylenebutyryl) phenoxymethyl]benzoate*

STEP A.—PREPARATION OF METHYL 2-(BROMOMETHYL)BENZOATE 2-methylbenzoyl chloride (135 g., 0.845 mole) is placed in a four-necked flask fitted with stirrer, reflux condenser, drying tube, dropping funnel and thermometer, and heated to 185° C. Stirring is started and bromine (141 g., 0.882 mole) is added dropwise over 1.5 hours. The solution is stirred an additional 1 hour at 180° C. and allowed to cool. Methanol (84.5 ml.) is added dropwise over 1.5 hours and the dark solution obtained is taken up in ether and washed with saturated sodium carbonate and water and dried. The ether is evaporated in vacuo without the application of heat to give 189 g. (95%) of methyl 2-(bromomethyl)benzoate.

STEP B.—PREPARATION OF METHYL 2-(3-CHLORO-4-BUTYRYLPHENOXYMETHYL)BENZOATE

This product is prepared following substantially the same procedure described in Example 66, Step A, using the following substances:

3-chloro-4-butyrylphenol _____ 30 g., 0.13 mole.
Methyl 2-(bromomethyl)benzoate ____ 15 g., 0.065 mole.
Sodium metal _____ 2.65 g., 0.11 mole.
Methanol _____ 300 ml.

There is thus obtained 17 g. (75%) of methyl 2-(3-chloro - 4 - butyrylphenoxymethyl)benzoate, M.P. 82–83° C.

*Analysis.*—Calculated for $C_{19}H_{19}O_4Cl$: C, 65.71; H, 5.47. Found: C, 66.03; H, 5.81.

STEP C.—PREPARATION OF METHYL 2-[3-CHLORO-4-(2 - METHYLENEBUTYRYL)PHENOXYMETHYL]BENZOATE

Methyl 2 - (3 - chloro - 4 - butyrylphenoxymethyl) benzoate (2.0 g., 0.0058 mole), paraformaldehyde (2.0 g., 0.066 mole), and dimethylamine hydrochloride (2.0 g., 0.024 mole) are mixed well in a 50 ml. flask, fitted with a drying tube, and heated to 120–130° C. for one hour. The reduced pressure obtained from a water aspirator is applied for periods of one minute at intervals of 6 to 7 minutes. The mixture is transformed to an oil which is taken up in hot isopropyl alcohol (20 ml.) and ether (200 ml.) is added whereupon an oil precipitates. The ethereal solution is decanted and evaporated to remove the ether. The residual isopropyl alcohol solution is treated with an excess of water which produces a solid. Careful fractional crystallization from methanol gives methyl 2 - [3 - chloro - 4 - (2 - methylenebutyryl) phenoxymethyl]-benzoate in the form of a white solid.

EXAMPLE 69

*4-[3-chloro-4-(2-methylenebutyryl)phenoxymethyl] benzoic acid*

STEP A.—PREPARATION OF 4-CHLOROMETHYLBENZONITRILE p-Tolunitrile (100 g., 0.854 mole) is placed in a 3-necked flask fitted with gas inlet-outlet tube, stirrer and thermometer. The stirring is started and the nitrile is heated to 120–130° C. Chlorine gas is passed into the liquid at a moderate rate, and the reaction activated by an incandescent lamp. The addition is continued until the nitrile takes up 30 g. of the gas (about 2 hours). The material is allowed to stand overnight in air whereupon a crystalline mass forms. This is washed twice with ethanol and dried in air. Concentration of the ethanol solution to half its volume gives 73.4 g. (57%) of 4-chloromethylbenzonitrile, M.P. 75–77° C.

STEP B.—PREPARATION OF 4-CHLOROMETHYLBENZOIC ACID 4-chloromethylbenzonitrile (25 g., 0.164 mole) is refluxed and stirred with concentrated hydrochloride acid (500 ml.) 14 hours. Upon cooling a solid is obtained which is removed by filtration, dried in a desiccator to give 26.6 g. (94.5%) of 4-chloromethylbenzoic acid, M.P. 202–203° C.

STEP C.—PREPARATION OF ETHYL 4-CHLOROMETHYLBENZOATE 4-chloromethylbenzoic acid (26.6 g., 0.156 mole) is dissolved in absolute ethanol (225 ml.) and heated to 60° C. in a four-necked flask fitted with gas inlet tube, thermometer, stirrer, reflux condenser, and drying tube. Stirring is started, and anhydrous hydrogen chloride gas is passed in for 1 hour, the temperature being maintained at 50–60° C. The solution then is refluxed one hour, cooled and permitted to stand overnight. The ethanol then is evaporated in vacuo, the residue taken up in ether, washed with 5% sodium carbonate, dried and evaporated to an oil which distills at 91–93° C. at 0.6 mm. pressure to give 22.7 g. (74%) of ethyl 4-chloromethylbenzoate.

STEP D.—PREPARATION OF 4-(3-CHLORO-4-BUTYRYL-PHENOXYMETHYL)BENZOIC ACID 3-chloro-4-butyrylphenol (50 g., 0.25 mole) is dissolved in anhydrous methanol (500 ml.) and sodium metal (4.6 g., 0.2 mole) is added in portions. When all the sodium dissolves, ethyl 4-chloromethylbenzoate (25 g., 0.125 mole) is added and is refluxed 19 hours. The volume of methanol is reduced to 200 ml. and the mixture cooled, filtered, water added and the mixture extracted with ether. The ether extract is washed with 5% sodium hydroxide, dried and evaporated to a yellow oil which is taken up in 10% sodium hydroxide and heated on a steam bath with stirring for 2 hours. After cooling and acidification with hydrochloric acid there is obtained a white solid which after recrystallization from a mixture of ethanol and water gives 26.6 g. (64%) of 4-(3-chloro-4-butyryl-phenoxymethyl)benzoic acid, M.P. 144–145° C.

*Analysis.*—Calculated for $C_{18}H_{17}O_4Cl$: C, 64.96; H, 5.15. Found: C, 65.39; H, 5.39.

STEP E.—PREPARATION OF 4-[3-CHLORO-4-(2-METHYL-ENEBUTYRYL)PHENOXYMETHYL]BENZOIC ACID 4-(3-chloro-4-butyrylphenoxymethyl)benzoic acid (5 g., 0.015 mole), paraformaldehyde (2.0 g., 0.065 mole) and dimethylamine hydrochloride (3.7 g., 0.045 mole) are mixed in a 100 ml. flask fitted with a drying tube. The flask is heated to 120–130° C. for one-half hour, with aspirator vacuum being applied for one minute at intervals of 6–7 minutes. The mixture is reduced to a yellow oil which is taken up in hot isopropanol. Ether, (200 ml.), is added and after cooling the ether solution is decanted and evaporated to an isopropanol solution. Excess water is added to give a solid material, which after recrystallization from a mixture of ethanol and water yields 3.5 g. (67%) of 4-[3-chloro-4-(2-methylenebutyryl)phenoxymethyl]benzoic acid, M.P. 163–165° C.

*Analysis.*—Calculated for $C_{19}H_{17}O_4Cl$: C, 66.18; H, 5.02. Found: C, 66.21; H, 5.19.

EXAMPLE 70

*4-[3-chloro-4-(2-methylenebutyryl)phenoxy]benzoic acid*

STEP A.—PREPARATION OF 4-(3-CHLOROPHENOXY)ACETOPHENONE 3-chlorophenol (16.2 g., 0.125 mole) and solid potassium hydroxide (8.3 g., 0.125 mole) are combined and heated to 150° C. under aspirator vacuum for 2 hours. 4-bromo-acetophenone (25 g., 0.125 mole) and copper powder (0.2 g., as catalyst) are added and the mixture heated to 190–200° C. for three hours. After cooling the reaction mixture is extracted with a mixture of ether and 5% sodium hydroxide. The ether layer is separated, washed with 5% sodium hydroxide and water, dried and evaporated to an oil. The oil is distilled at 150–165° C. at 0.5 mm. pressure and the product obtained redistilled at 162–164° C. at 2 mm. pressure to give 9 g. (29%) of 4′-(3-chlorophenoxy)acetophenone which in the form of its semicarbazone melts at 165–166.5° C.

STEP B.—PREPARATION OF 4-(3-CHLOROPHENOXY)BENZOIC ACID

4′-(3-chlorophenoxy)acetophenone (5 g., 0.020 mole) is suspended in a solution of potassium permanganate (9.75 g., 0.062 mole) in 10% sodium hydroxide (40 ml.) and heated on the steam bath with stirring for three hours. The acetophenone dissolves and manganese dioxide precipitates. The excess permanganate is reduced with 30% hydrogen peroxide and the manganese dioxide removed by filtration. The clear solution obtained is acidified with concentrated hydrochloric acid to give a white solid, which after recrystallization from a mixture of ethanol and water yields 4 g. (80%) of 4-(3-chlorophenoxy)benzoic acid, M.P. 135–136° C.

*Analysis.*—Calculated for $C_{13}H_9O_3Cl$: C, 62.79; H, 3.65. Found: C, 62.65; H, 3.79.

STEP C.—PREPARATION OF METHYL 4-(3-CHLOROPHENOXY)BENZOATE 4-(3-chlorophenoxy)benzoic acid (16 g., 0.065 mole) is refluxed in anhydrous methanol (100 ml.) with a trace of dry hydrogen chloride for 24 hours. The volume of methanol is reduced to about 25 ml. and water (100 ml.) added. The mixture is extracted with ether and washed with saturated sodium bicarbonate and water, dried and evaporated to an oil. The oil is distilled to give a product boiling at 159–162° C. at 0.1 mm. pressure yielding 14 g. (84%) of methyl 4-(3-chlorophenoxy)benzoate.

STEP D.—PREPARATION OF METHYL 4-(3-CHLORO-4-BUTYRYLPHENOXY)BENZOATE

Methyl 4-(3-chlorophenoxy)benzoate (20 g., 0.076 mole) and butyryl chloride (8.6 g., 0.080 mole) are mixed in a 3-necked, round-bottomed flask fitted with a stirrer, reflux condenser and drying tube, and a Gooch addition tube in which aluminum chloride (32 g., 0.250 mole) has previously been placed. Vigorous stirring is started and the mixture warmed gently on the steam bath. The aluminum chloride is added slowly in small portions over one-half hour. With stirring maintained, the mixture is heated on the steam bath for three hours and then allowed to cool with continued stirring. Chipped ice (300 g.) is added, followed by hydrochloric acid (10%, 150 ml.) which is added dropwise over one-half hour while the mixture is again heated on the steam bath. The mixture then is extracted with ether, washed with 5% sodium hydroxide and water, dried and evaporated to an oil which distilled at 198–202° C. at 0.3 mm. pressure to give 13 g. (52%) of methyl 4-(3-chloro-4-butyrylphenoxy)benzoate.

STEP E.—PREPARATION OF 4-(3-CHLORO-4-BUTYRYLPHENOXY)BENZOIC ACID

Methyl 4-(3-chloro-4-butyrylphenoxy)benzoate (12 g., 0.036 mole) is heated on the steam bath with stirring for 2 hours with 10% sodium hydroxide (100 ml.). After cooling, the solution is acidified with concentrated hydrochloric acid to give a solid material which after recrystallization from a mixture of ethanol and water yields 7 g. (61%) of 4-(3-chloro-4-butyrylphenoxy)benzoic acid, M.P. 122–123° C.

*Analysis.*—Calculated for $C_{17}H_{15}O_4Cl$: C, 64.05; H, 4.75. Found: C, 64.05; H, 5.11.

STEP F.—PREPARATION OF 4-[3-CHLORO-4-(2-METHYLENEBUTYRYL)PHENOXY]BENZOIC ACID 4-(3-chloro-4-butyrylphenoxy)benzoic acid (5 g., 0.015 mole), paraformaldehyde (2.5 g., 0.080 mole) and dimethylamine hydrochloride (2.5 g., 0.030 mole) are mixed in a 100 ml. flask fitted with a drying tube. The flask is heated at 120–130° C. for one-half hour with aspirator vacuum being applied for one minute at intervals of 6 to 7 minutes. The mixture is taken up in hot isopropanol (20 ml.) and ether (200 ml.) is added. The ether solution is decanted and evaporated to an isopropanol solution. Excess water is added to precipitate a solid which after recrystallization from a mixture of ethanol and water gives 3.2 g. (60%) of 4-[3-chloro-4-(2-methylenebutyryl)phenoxy]benzoic acid, M.P. 143–144° C.

*Analysis.*—Calculated for $C_{18}H_{15}O_4Cl$: C, 65.36; H, 4.57. Found: C, 65.17; H, 4.72.

EXAMPLE 71

*2-[3-chloro-4-(2-methylenebutyryl)-phenoxy]benzoic acid*

STEP A.—PREPARATION OF METHYL 2-(3-CHLOROPHENOXY)BENZOATE m-Chlorophenol (64 g., 0.50 mole), o-bromobenzoic acid (50 g., 0.25 mole), potassium hydroxide (28 g., 0.50 mole), and copper metal (15 g.) are mixed and heated on a steam bath under aspirator vacuum for 5 hours. The mixture is taken up in 5% sodium hydroxide, filtered and acidified. The oil which forms is taken up in ether and extracted into saturated sodium bicarbonate and acidified to give an oil. The oil is taken up into ether, dried and evaporated. The remaining oil is dissolved in absolute methanol (200 ml.) and dry hydrogen chloride gas is bubbled through it for one minute. The solution then is refluxed 18 hours and the volume of solvent then reduced to about 100 ml. Water (300 ml.) is added and the mixture then extracted with ether, washed with 5% sodium carbonate and water, dried and evaporated to an oil. The oil is distilled and the fraction boiling at 130–140° C., at 0.5 mm. pressure gives 29.5 g. (45%) of methyl 2-(3-chlorophenoxy)benzoate.

STEP B.—PREPARATION OF METHYL 2-(3-CHLORO-4-BUTYRYLPHENOXY)BENZOATE

Methyl 2-(3-chlorophenoxy)benzoate (19 g., 0.073 mole) and butyryl chloride (7.7 g., 0.073 mole) are placed in a 3-necked flask fitted with stirrer, drying tube and Gooch addition tube. Stirring is started and the mixture warmed on a steam bath while aluminum chloride (29 g., 0.22 mole) is added in small portions over one-half hour through the Gooch tube. The mixture is stirred and heated on a steam bath 24 hours, cooled and 100 g. of ice and concentrated hydrochloric acid (100 ml.) added. The mixture is heated for an additional one-half hour on the steam bath and then cooled. An oil separates and is taken up in ether, washed with saturated sodium bicarbonate and water and dried and evaporated to an oil which distills at 176–180° C. at 0.2 mm. pressure to give 6.2 g. (26%) of methyl 2-(3-chloro-4-butyrylphenoxy)-benzoate.

STEP C.—PREPARATION OF 2-(3-CHLORO-4-BUTYRYL-PHENOXY)BENZOIC ACID

Methyl 2-(3-chloro-4-butyrylphenoxy)benzoate (4.5 g., 0.014 mole) and 10% sodium hydroxide (50 ml.) are heated and stirred on a steam bath for one hour. A clear solution is obtained, which after cooling and acidification with concentrated hydrochloric acid, yields the product as an oil. This oil is purified by dissolving in ether and extracting with saturated aqueous sodium bicarbonate solution. The aqueous solution is acidified and the oil that separates is taken up into ether, dried, and the solvent evaporated, yielding 3.0 g. (70%) of 2-(3-chloro-4-butyrylphenoxy)benzoic acid.

STEP D.—PREPARATION OF 2-[3-CHLORO-4-(2-METHYLENEBUTYRYL)PHENOXY]BENZOIC ACID 2-(3-chloro-4-butyrylphenoxy)benzoic acid (3.0 g., 0.0095 mole), paraformaldehyde (3.0 g., 0.10 mole), and dimethylamine hydrochloride (3.0 g., 0.037 mole) are mixed well in a 50 ml. flask and treated in a manner similar to that described in Step F of Example 70. The 2-[3-chloro-4-(2-methylenebutyryl)phenoxy]benzoic acid precipitates upon the addition of water. The yield is 2.2 g. (70%).

EXAMPLE 72

*4-(2-bromobutyryl)-3-chlorophenoxyacetic acid*

4-butyryl-3-chlorophenoxyacetic acid prepared as described in Example 10, Step A, (12.8 g., 0.05 mole) is brominated by substantially the same method described in Example 38 to give 4-(2-bromobutyryl)-3-chlorophenoxyacetic acid, M.P. 154–155° C. when recrystallized from a 30:1 mixture of benzene and isopropanol, yield 7.8 g. The solvent is removed from the product by drying for about 16 hours at 1 mm. pressure with suction.

*Analysis.*—Calculated for $C_{12}H_{12}BrClO_4$: C, 42.94; H, 3.61; Br, 23.82; Cl, 10.56. Found: C, 43.12; H, 3.60; Br, 24.10; Cl, 10.77.

EXAMPLE 73

*3,5-dichloro-4-(2-methylenebutyryl) phenoxyacetic acid*

STEP A.—PREPARATION OF 2′,6′-DICHLORO-4′-HYDROXYBUTYROPHENONE

A mixture of 3,5-dichloroanisole (52.7 g., 0.298 mole), carbon disulfide (350 ml.) and butyryl chloride (62.33 g., 0.585 mole) is treated, under anhydrous conditions, with aluminum chloride powder (39.74 g., 0.298 mole), over a period of 5 minutes with stirring. The mixture is stirred for 6 hours at room temperature and then allowed to stand at room temperature overnight. The reaction mixture is heated with stirring in a 55° C. water bath until the evolution of hydrogen chloride ceases (1½ hour), cooled to room temperature and treated, under anhydrous conditions, with aluminum chloride powder (39.74 g., 0.298 mole), over a period of 5 minutes with stirring. The mixture is then heated in a 55° C. water bath with stirring for 1½ hours. The carbon disulfide is removed under reduced pressure and the gummy reaction product added to a mixture of ice (450 g.) and concentrated hydrochloric acid (45 ml.). The resulting oil is extracted with ether, duced pressure and the gummy reaction product added moved under reduced pressure. The residual oil was fractionally distilled to give two products. The product boiling at 101–102° C. at 0.15 mm. pressure is 2′,4′-dichloro-6′-hydroxybutyrophenone, yield 36 g. (51%) which after recrystallization from petroleum ether melts at 47–48.5° C.

A second fraction (26 g.) boiling at 115–147° C. at 0.15 mm. pressure appears to be principally 2′,6′-dichloro-4′-butyryloxybutyrophenone. This material is treated with excess 5% aqueous sodium hydroxide solution and heated under reflux for 4½ hours. The cooled reaction mixture is extracted with ether to remove insoluble oil and the clear aqueous solution is acidified with concentrated hydrochloric acid. The resulting oil is extracted with ether, dried over anhydrous sodium sulfate and the ether removed under reduced pressure. The residual oil is fractionally distilled and the material boiling at 162–163° C./0.15 mm. is collected, yield 7.0 g. (10%). After two recrystallizations from hexane and two from cyclohexane, 2′,6′-dichloro-4′-hydroxybutyrophenone is obtained in the form of colorless prisms, M.P. 75.5–76.5° C.

*Analysis.*—Calculated for $C_{10}H_{10}O_2Cl_2$: C, 51.53; H, 4.32; Cl, 30.42. Found: C, 51.73; H, 4.49; Cl, 30.15.

STEP B.—PREPARATION OF 3,5-DICHLORO-4-BUTYRYLPHENOXYACETIC ACID

2′,6′-dichloro-4′-hydroxybutyrophenone (6.41 g., 0.0275 mole) in water (30 ml.) is combined with a solution of sodium hydroxide (2.2 g., 0.055 mole) in water (5 ml.). To the resulting solution at 45° C. is added with stirring a solution of chloroacetic acid (2.6 g., 0.0275 mole) in water (10 ml.), over a period of 1 hour at a temperature of 40–45° C. The temperature is raised to 100° C. over a period of 30 minutes and stirring continued at 100° C. for 40 minutes. The reaction mixture at 100° C. is treated with a solution of chloroacetic acid (5.2 g., 0.055 mole) in water (10 ml.) over a period of 2 hours. Simultaneously and during the following 3 hours of stirring at 100° C., a solution of sodium hydroxide (4.4 g., 0.11 mole) in water (10 ml.) is added at intervals when needed to keep the reaction mixture basic. The boiling solution is acidified with concentrated hydrochloric acid. The oil that separates after chilling in an ice bath to room temperature is extracted with ether, dried over anhydrous sodium sulfate and the ether evaporated at reduced pressure to give an oil. The oil is dissolved in benzene and the benzene removed under reduced pressure to give a waxy solid. After one recrystallization from cyclohexane and one from a mixture of benzene and cyclohexane, there is obtained 5.29 g. (65%) of 3,5-dichloro-4-butyrylphenoxyacetic acid, a crystalline material, M.P. 111.5–113° C. After a further recrystallization from methylcyclohexane the product melts at 112–113° C.

*Analysis.*—Calculated for $C_{12}H_{12}O_4Cl_2$: C, 49.51; H, 4.15; Cl. 24.36. Found: C, 49.94; H, 4.31; Cl, 24.10.

STEP C.—PREPARATION OF 3,5-DICHLORO-4-(2-METHYLENEBUTYRYL)PHENOXYACETIC ACID 3,5-dichloro-4-butyrylphenoxyacetic acid (5.06 g., 0.01738 mole), paraformaldehyde (0.608 g., 0.02025 mole), dried dimethylamine hydrochloride (1.54 g., 0.0189 mole) and acetic acid (4 drops) are combined and heated with stirring on a steam bath for 15 minutes to obtain a homogeneous mixture. The mixture is heated for 2 hours, during which period suction is applied at 15 minute intervals for a duration of 1 minute. The Mannich reaction product is suspended in water (100 ml.) and extracted with ether and the ether extract (I) saved. The aqueous solution (after removing ether soluble oil) is made basic by the addition of saturated sodium bicarbonate solution, heated on a steam bath to 80° C. over a period of 3 minutes and maintained at 80–90° C. for 15 minutes. The basic solution is chilled in an ice bath to room temperature and acidified with hydrochloric acid. The resulting oil is extracted with ether, dried over anhydrous sodium sulfate, and ether removed under reduced pressure to give 0.61 g. of 3,5-dichloro-4-(2-methylenebutyryl)phenoxyacetic acid as shown by infra-red spectra.

The ether extract of the Mannich reaction (I) is dried over anhydrous sodium sulfate and the ether removed by reduced pressure evaporation. The product which is a mixture of 3,5-dichloro-4-(2-methylenebutyryl)phenoxyacetic acid and starting material is placed in a reaction vessel and treated with the same quantities of dimethylamine hydrochloride, paraformaldehyde and glacial acetic acid as used initially. The mixture is heated as before and the reaction product suspended in water, extracted with ether and the ether extract dried over anhydrous sodium sulfate. The ether is removed by reduced pressure evaporation to give another 4.4 g. of 3,5-dichloro-4-(2-methylenebutyryl)phenoxyacetic acid.

The combined product (5.01 g., 95% of theory) is recrystallized from a mixture of benzene and cyclohexane to give 4.55 g., M.P. 115–118° C. A further recrystallization from methylcyclohexane and then from a mixture of benzene and cyclohexane gives pure 3,5-dichloro-4-(2-methylenebutyryl)phenoxyacetic acid, M.P. 117–119° C. (Corr.)

*Analysis.*—Calculated for $C_{13}H_{12}O_4Cl_2$: C, 51.51; H, 3.99; Cl, 23.39. Found: C, 51.46; H, 3.82; Cl, 23.48.

EXAMPLE 74

*3-Chloro-4-(2-methylene-3-phenylpropionyl)phenoxyacetic acid*

STEP A.—PREPARATION OF 3-CHLORO-4-(3-PHENYL-PROPIONYL)PHENOXYACETIC ACID 3-chloro-4-(3-phenylacryloyl)phenoxyacetic acid prepared as described in Example 59 (24.2 g., 0.076 mole) is dissolved in isopropanol (275 ml.) and hydrogenated in the presence of 5% palladium on charcoal at 26° C. and 756 mm. pressure by substantially the same procedure described in Example 37, Step A. The product obtained is crystallized from benzene to give 14.4 g. (59.3%) of 3-chloro-4-(3-phenylpropionyl)phenoxyacetic acid, M.P. 113–115° C.

*Analysis.*—Calculated for $C_{17}H_{15}ClO_4$: C, 64.04; H, 4.74; Cl, 11.13. Found: C, 64.28; H, 4.82; Cl, 11.11.

STEP B.—PREPARATION OF 3-CHLORO-4-(2-METHYL-ENE-3-PHENYLPROPIONYL)PHENOXYACETIC ACID

This product is prepared following substantially the same procedure described in Example 3, Step B, using the following substances:

3-chloro-4-(3-phenylpropionyl)phen-
 oxyacetic acid _____ 10.6 g., 0.033 mole.
Paraformaldehyde _____ 1 g., 0.033 mole.
Dimethylamine hydrochloride ____ 2.69 g., 0.033 mole.
Acetic acid _____ 10 drops.

The reaction mixture is heated for 5 hours and the Mannich compound formed is dissolved in a minimum amount of acetone. On addition of ether, a waxy solid separates. The solid is dissolved in water and the cloudy solution obtained is extracted with ether. The clear aqueous solution is made basic with 10% sodium bicarbonate solution and heated at 80–90° C. for 20 minutes. Upon acidification with hydrochloric acid a solid separates. After drying and crystallizing from benzene there is obtained 1.6 g. of 3-chloro-4-(2-methylene-3-phenylpropionyl)phenoxyacetic acid, M.P. 104–105° C.

EXAMPLE 75

*Methyl 3-chloro-4-(2-methylenebutyryl)phenoxyacetate*

A solution of 3-chloro-4-(2-methylenebutyryl)phenoxyacetic acid prepared as described in Example 10 (15.0 g., 0.056 mole), absolute methanol (100 ml.) and 6 N ethanolic hydrochloric acid (10 drops) are allowed to stand at 25° C. for six days. The solvent then is removed in vacuo and the residual viscous liquid dissolved in ether and traces of the free acid removed by extraction with saturated sodium bicarbonate solution. The ethereal solution is dried over anhydrous sodium sulfate and distilled at B.P. 160° C. at 0.5 mm. pressure to give 13.95 g. (88.4%) of methyl 3-chloro-4-(2-methylenebutyryl) phenoxyacetate, $N_D^{25}$ 1.5389. The product solidifies to a waxy solid on standing at 25° C. in a nitrogen atmosphere.

*Analysis.*—Calculated for $C_{14}H_{15}ClO_4$: C, 59.47; H, 5.35; Cl, 12.54. Found: C, 59.74; H, 5.20; Cl, 12.41

EXAMPLE 76

*3-chloro-4-(1-cyclopentenylcarbonyl)phenoxyacetic acid*

STEP A.—PREPARATION OF CYCLOPENTYL 2-CHLORO-4-METHOXYPHENYL KETONE

To a pre-cooled mixture of m-chloroanisole (47.8 g., 0.334 mole), cyclopentanecarbonyl chloride (44.4 g., 0.334 mole) and petroleum ether (300 ml.) is added powdered aluminum chloride (48.0 g., 0.36 mole) over a period of one hour with stirring. This mixture is heated at 40° C. for 6½ hours with intermittent stirring, cooled, poured into a mixture of ice-water (400 ml.) and concentrated hydrochloric acid (30 ml.) and extracted with ether. The ether extract is distilled to give cyclopentyl 2-chloro-4-methoxyphenyl ketone, B.P. 120–150° C. (0.5 mm. pressure).

STEP B.—PREPARATION OF CYCLOPENTYL 2-CHLORO-4-HYDROXYPHENYL KETONE

To a solution of cyclopentyl 2-chloro-4-methoxyphenyl ketone (105 g., 0.438 mole) in purified n-heptane (300 ml.) is added powdered aluminum chloride (146 g., 1.10 mole) over a period of 15 minutes with stirring. The mixture is heated for 5 hours at 100° C., cooled, and added to a mixture of ice-water (300 ml.) and concentrated hydrochloric acid (30 ml.) extracted with ether and fractionally distilled. The viscous product obtained, B.P. 162–190° C. (0.4 mm. pressure), is purified by crystallization from a mixture of ether and petroleum ether and recrystallized from benzene to give 8.78 g. (8.92%) of cyclopentyl 2-chloro-4-hydroxyphenyl ketone, M.P. 131–133.5° C.

*Analysis.*—Calculated for $C_{12}H_{13}ClO_2$: C, 64.15; H. 5.83; Cl, 15.78. Found: C, 63.95; H, 5.96; Cl, 15.82.

STEP C.—PREPARATION OF 3-CHLORO-4-(CYCLO-PENTYLCARBONYL)PHENOXYACETIC ACID

Cyclopentyl 2-chloro-4-hydroxyphenyl ketone (8.28 g., 0.037 mole) is dissolved in dry 1,2-dimethoxyethane (150 ml.) and 50% sodium hydride in mineral oil (1.92 g., 0.040 mole) is added. To this suspension is added ethyl bromoacetate (7.52 g., 0.045 mole), the mixture refluxed for 2½ hours with stirring, and the solvent then removed and water (50 ml.) and sodium hydroxide (3.6 g., 0.010 mole) added. The mixture is refluxed for 2 hours, cooled and acidified with concentrated HCl. The crude product obtained is purified by repeated crystallizations from an acetone-ether solution to give 5.23 g. of 3-chloro-4-(cyclopentylcarbonyl)phenoxyacetic acid, M.P. 138–139° C.

*Analysis.*—Calculated for $C_{14}H_{15}ClO_4$: C, 59.47; H, 5.35; Cl, 12.54. Found: C, 59.86; H, 5.57; Cl, 12.51.

STEP D.—PREPARATION OF 3-CHLORO-4-(1-BROMO-CYCLOPENTYLCARBONYL)PHENOXYACETIC ACID

To 3-chloro-4 - (cyclopentylcarbonyl)phenoxyacetic acid (4.6 g., 0.016 mole) dissolved in acetic acid (100 ml.), bromine (2.6 g., 0.016 mole) in acetic acid (10 ml.) is added slowly with stirring over ½ hour. The reaction mixture is poured into one liter of water containing sodium disulfite (1 g.). The oil that separates gradually solidifies. The solid is dried in air to obtain 3.9 g. of 3-chloro-4-(1-bromocyclopentylcarbonyl)phenoxyacetic acid, M.P. 149–150° C.

STEP E.—PREPARATION OF 3-CHLORO-4-(1-CYCLO-PENTENYLCARBONYL)PHENOXYACETIC ACID

The bromo compound obtained as described in the preceding step (2.9 g.) is dehydrobrominated by treatment with silver acetate in benzene by substantially the same procedure described in Example 1, Step C, to give 3-chloro-4-(1-cyclopentenylcarbonyl)phenoxyacetic acid.

EXAMPLE 77

*3-chloro-4-(1-cyclohexenylcarbonyl)phenoxyacetic acid*

STEP A.—PREPARATION OF CYCLOHEXYL 2-CHLORO-4-HYDROXYPHENYL KETONE

To a mixture of m-chlorophenetole (29.64 g., 0.188 mole) and cyclohexanecarbonyl chloride (27.6 g., 0.188 mole) in ligroin, aluminum chloride (77.5 g., 0.565 mole) is added gradually with stirring at 5–15° C. After addition is complete, the mixture is allowed to warm to 25° C., stirred for 3 hours and kept at 25–30° C. for 16 hours. The ligroin is decanted and the residue hydrolyzed with 300 ml. of water containing 20 ml. of concentrated hydrochloric acid. The oil that separates is extracted with ether, washed with water, and then with 5% sodium bicarbonate solution. The product is extracted from the washed ether solution with 5% sodium hydroxide solution. The oil that separates upon acidification of the sodium hydroxide extract is extracted with ether and isolated by distillation to give 12.85 g. of cyclohexyl 2-chloro-4-hydroxyphenyl ketone, M.P. 170–200° (1.5 mm. pressure), M.P. 78–81° C.

*Analysis.*—Calculated for $C_{13}H_{15}ClO_2$: C, 65.41; H, 6.33. Found: C, 65.48; H, 6.46.

STEP B.—PREPARATION OF 3-CHLORO-4-(CYCLO-HEXYLCARBONYL)PHENOXYACETIC ACID

Ethyl bromoacetate (9.0 g., 0.054 mole) is added slowly to a mixture of 50% sodium hydride in mineral oil (2.6 g., 0.054 mole) and the phenol prepared as described in Step A (12.85 g., 0.054 mole) in glycol dimethyl ether (70 ml). at 30–45° C. The mixture then is heated on a steam bath for 2½ hours with stirring, the solvent evaporated at reduced pressure and a solution of sodium hydroxide (4.7 g.) in water (25 ml.) added to the residue. The mixture is heated for 2 hours, cooled, extracted with ether and acidified with hydrochloric acid. The solid that separates is dissolved in sodium bicarbonate solution and the solution treated with Norite. The product is precipitated by addition of hydrochloric acid, dried and crystallized from benzene to give 10 g. of 3-chloro-4-(cyclohexylcarbonyl)phenoxyacetic acid, 139–140° C.

*Analysis.*—Calculated for $C_{15}H_{17}ClO_4$: C, 60.71; H, 5.78. Found: C, 60.64; H, 5.74.

STEP C.—PREPARATION OF 3-CHLORO-4-(1-CYCLO-HEXENYLCARBONYL)PHENOXYACETIC ACID

The 3 - chloro - 4 - (cyclohexylcarbonyl)phenoxyacetic acid obtained as described above then is brominated by substantially the same method described in Example 77, Step D, and thereafter dehydrobrominated by substantially the same procedure described in Example 1, Step C to give 3 - chloro - 4 - (cyclohexyenylcarbonyl)phenoxyacetic acid.

EXAMPLE 78

*2-phenyl-4-(2-methylenebutyryl) phenoxyacetic acid*

STEP A.—PREPARATION OF ETHYL-2-PHENYL-PHENOXYACETATE 2-hydroxydiphenyl (50 g., 0.29 mole) is dissolved in ethyl alcohol (300 ml.) and sodium metal (7.0 g., 0.30 mole) is added in portions. When all the sodium is dissolved, ethyl bromoacetate (50 g., 0.30 mole) is added and the whole is refluxed 4 hours. Sodium bromide precipitates toward the end and care must be taken that the resultant bumping does not become too violent. The solvent is distilled and water (500 ml.) added to the residue. The mixture is extracted with ether, which after washing with 10% sodium hydroxide and water, is dried and evaporated. The resulting oil is distilled under reduced presure to give ethyl 2-phenylphenoxyacetate.

STEP B.—PREPARATION OF ETHYL 2-PHENYL-4-BUTYRYLPHENOXYACETATE

Ethyl 2-phenylphenoxyacetate (11.5 g., 0.044 mole) and n-butyryl chloride (5.0 g., 0.047 mole) are placed in a 3-necked, round bottom flask fitted with a stirrer, drying tube, and Gooch tube. Aluminum chloride (26.5 g., 0.20 mole) is placed in the Gooch flask. Stirring is started and the mixture is warmed on the steam bath while the aluminum chloride is added in small portions over 30 minutes. The mixture then is heated strongly on this steam bath and stirred for 3 hours. The mixture is decomposed with ice and concentrated hydrochloric acid and then extracted into ether. After washing with 10% sodium hydroxide and water, the solution is dried and evaporated to an oil which is distilled under reduced pressure to give ethyl 2-phenyl-4-butyrylphenoxyacetic acid.

STEP C.—PREPARATION OF 2-PHENYL-4-BUTYRYL-PHENOXYACETIC ACID

Ethyl 2-phenyl-4-butyrylphenoxyacetate (10 g., 0.031 mole) is heated on the steam bath and stirred with 10% sodium hydroxide (50 ml.) for 1 hour, cooled and acidified, giving the 2-phenyl-4-butyrylphenoxyacetic acid in the form of a solid which is recrystallized from a mixture of methanol and water.

STEP D.—PREPARATION OF 2-PHENYL-4-(2-METHYL-ENEBUTYRYL)PHENOXYACETIC ACID 2-phenyl-4-butyrylphenoxyacetic acid (5.0 g., 0.017 mole) paraformaldehyde (5.0 g., 0.17 mole) and dimethylamine hydrochloride (5.0 g., 0.062 mole) are mixed well and heated to 120–130° C. for 30 minutes. The vacuum supplied by an aspirator is applied for 1 minute at intervals of 5–6 minutes. The mixture is reduced to an oil which is taken up in isopropyl alcohol (20 ml.) and ether (200 ml.) is added. A solid precipitates. The ether solution is decanted and evaporated to an isopropyl alcohol solution from which 2-phenyl-4-(2-methylenebutyryl) phenoxyacetic acid is precipitated upon the addition of excess water. The product is recrystallized from a mixture of methanol and water.

EXAMPLE 79

*2,4-dichloro-3-(2-methylenebutyryl)phenoxyacetic acid*

STEP A.—PREPARATION OF 2,6-DICHLORO-3-METH-OXY-α-PROPYLBENZYL ALCOHOL 2,6-dichloro-3-methoxybenzaldehyde (109 g., 0.53 mole) is added during 0.5 hour to a solution of propylmagnesium bromide in 600 cc. of ether prepared from 72.4 g. (0.59 mole) of propyl bromide and 14.4 g. (0.59 mole) of magnesium. The mixture is refluxed 1.5 hours and then poured into ice-cold dilute hydrochloric acid. The ether layer is separated, washed with water and dried over sodium sulfate. Evaporation of the ether gives 126 g. of 2,6-dichloro-3-methoxy-α-propylbenzyl alcohol as a yellowish oil.

STEP B.—PREPARATION OF 2,6-DICHLORO-3-METHOXYBUTYROPHENONE

A solution of 126 g. (0.51 mole) of 2,6-dichloro-3-methoxy-α-propylbenzyl alcohol, and 98.5 g. (0.33 mole) of sodium dichromate dihydrate in 150 cc. of water and 400 cc. of acetic acid is heated 1 hour on the steam bath. The solution is diluted with 2.5 liters of water to produce an oily product which is taken up in ether, the ether solution washed with water, and sodium bicarbonate solution, and then dried over sodium sulfate. Evaporation of the ether gives 119 g. of 2′,6′-dichloro-3′-methoxybutyrophenone as a yellow oil.

STEP C.—PREPARATION OF 2′,6′-DICHLORO-3′-HYDROXYBUTYROPHENONE

A mixture of 119 g. (0.48 mole) of 2′,6′-dichloro-3′-methoxybutyrophenone and 191 g. (1.44 mole) of aluminum chloride in 600 cc. of heptane is stirred and heated 2.5 hours on the steam bath. The heptane then is decanted from the viscous precipitate which is hydrolyzed by the addition of ice and dilute hydrochloric acid. The oily product obtained is taken up in ether and purified by distillation yielding 76.5 g. of 2′,6′-dichloro-3′-hydroxybutyrophenone, B.P. 148–150°/1.5 mm., $n_D^{26}$ 1.5558.

Analysis.—Calculated for $C_{10}H_{10}Cl_2O_2$: C, 51.52; H, 4.32. Found: C, 51.67; H, 4.57.

STEP D.—PREPARATION OF 2,4-DICHLORO-3-BUTYRYLPHENOXYACETIC ACID

The alkylation of 2′,6′-dichloro-3′-hydroxybutyrophenone with ethyl bromoacetate and subsequent hydrolysis is carried out by substantially the same procedure as described in Example 42–A. After recrystallization from methylcyclohexane, the 2,4-dichloro-3-butyrylphenoxyacetic acid obtained melts at 103–105° C.

Analysis.—Calculated for $C_{12}H_{12}Cl_2O_4$: C, 49.50; H, 4.16. Found: C, 49.62; H, 4.39.

STEP E.—PREPARATION OF 2,4-DICHLORO-3-[2-(DIMETHYLAMINOMETHYL)BUTYRYL]PHENOXYACETIC ACID HYDROCHLORIDE

A mixture of 2.9 g. (0.01 mole) of 2,4-dichloro-3-butyrylphenoxyacetic acid, 0.42 g. (0.014 mole) of paraformaldehyde, 0.9 g. (0.011 mole) of dimethylamine hydrochloride, and 0.2 cc. of 10% alcoholic hydrogen chloride is heated 1.5 hours on the steam bath. The viscous melt is stirred with 30 cc. of hot ethyl acetate. Decantation of the ethyl acetate gives 2,4-dichloro-3-[2-(dimethylaminomethyl)butyryl]phenoxyacetic acid hydrochloride as a viscous, colorless syrup.

STEP F.—PREPARATION OF 2,4-DICHLORO-3-(2-METHYLENEBUTYRYL)PHENOXYACETIC ACID

The syrupy product obtained in Step E is dissolved in 20 cc. of saturated sodium bicarbonate solution and the solution heated 5 minutes on the steam bath. Acidification precipitates the crystalline 2,4-dichloro-3-(2-methylenebutyryl)phenoxyacetic acid, M.P. 135.5–137.5° C. after recrystallization from aqueous isopropyl alcohol.

Analysis.—Calculated for $C_{13}H_{12}Cl_2O_4$: C, 51.50; H, 3.99; Cl, 23.39. Found: C, 51.49; H, 4.18; Cl, 23.26.

EXAMPLE 80

*3-methyl-4-(2-methylene-3-carboxypropionyl)-phenoxyacetic acid*

STEP A.—PREPARATION OF 3-METHYL-4-(3-CARBOXYPROPIONYL)PHENOXYACETIC ACID

To a solution of 16.6 g. (0.1 mole) of 3-methylphenoxyacetic acid and 10.0 g. (0.1 mole) of succinic anhydride in 100 ml. of carbon bisulfide and 50 ml. of nitrobenzene maintained at 30° C., 60 g. (0.44 mole) of aluminum chloride is added portionwise over a 30 minute period. The reaction mixture is allowed to stand at room temperature for 2–3 days. The solvent is decanted and residual solid is added to a mixture of ice and hydrochloric acid. The solid is collected on the filter, dissolved in bicarbonate solution and extracted with ether. The bicarbonate solution is acidified and the product is recrystallized from water to give 16.5 g. of 3-methyl-4-(3-carboxypropionyl)phenoxyacetic acid, M.P. 160–163° C.

Analysis.—Calculated for $C_{13}H_{14}O_6$: C, 58.64; H, 5.30. Found: C, 58.40; H, 5.33.

STEP B.—PREPARATION OF 3-METHYL-4-(2-METHYLENE-3-CARBOXYPROPIONYL)PHENOXYACETIC ACID

The 3-methyl-4-(3-carboxypropionyl)phenoxyacetic acid (obtained by the above procedure) is converted to the hydrochloride salt of its Mannich base by substantially the same procedure described in Example 3, Step B. The Mannich cpd. then is treated with aqueous sodium bicarbonate by essentially the same method outlined in Example 3, Step C, to give 3-methyl-4-(2-methylene-3-carboxypropionyl)phenoxyacetic acid.

An alternate route for the synthesis of the product of Example 10 is described in the following example.

EXAMPLE 81

*3-chloro-4-(2-methylenebutyl)phenoxyacetic acid*

STEP A.—PREPARATION OF 2-DIMETHYLAMINOMETHYL-2′-CHLORO-4′-HYDROXYBUTYROPHENONE HYDROCHLORIDE

A 250 ml. round-bottomed flask, fitted with a condenser and drying tube is charged with 2′-chloro-4′-hydroxybutyrophenone (73.2 g., 0.368 mole), paraformaldehyde (14.4 g., 0.48 mole), dimethylamine hydrochloride (40 g., 0.49 mole), absolute ethyl alcohol (70 ml.) and concentrated hydrochloric acid (1.5 ml.). The solution is heated on a steam bath under reflux for 3 hours, filtered, and the alcohol evaporated in vacuo. The residue, 2-dimethylaminomethyl-2′-chloro-4′-hydroxybutyrophenone hydrochloride, after recrystallization from water, melts at 89–92° C.

Analysis.—Calculated for $C_{13}H_{19}ClNO_2$: C, 53.43; H, 6.55; N, 4.79. Found: C, 52.94; H, 6.48; N, 4.59.

STEP B.—PREPARATION OF 2-ETHYL-3′-CHLORO-4′-HYDROXYACRYLOPHENONE 2-dimethylaminomethyl-2′-chloro-4′-hydroxybutyrophenone hydrochloride (53.8 g., 0.184 mole) is dissolved in 100 ml. of water, made basic with aqueous sodium bicarbonate and allowed to stand for 3 hours. The solution is acidified and extracted with 200 ml. of ether, the aqueous portion made basic with aqueous sodium bicarbonate and allowed to stand overnight. The aqueous portion is again acidified and extracted with 100 ml. of ether, the ether extracts combined and dried over sodium sulfate. The ether is evaporated in vacuo and the product distilled to yield 21.7 g. (56%) of 2-ethyl-3′-chloro-4′-hydroxyacrylophenone, B. P. 165° C. at 0.02 mm. pressure, M.P. 47–49° C.

Analysis.—Calculated for $C_{11}H_{11}ClO_2$: C, 62.71; H, 5.26. Found: C, 62.21; H, 5.20.

STEP C.—PREPARATION OF 3-CHLORO-4-(2-METHYLENEBUTYRYL)PHENOXYACETIC ACID

A 25 ml. round-bottomed flask fitted with condenser, dropping funnel and magnetic stirrer is charged with 2-ethyl-3′-chloro-4′-hydroxyacrylophenone (5.25 g., 0.025 mole) and sodium hydroxide (1.0 g. in 10 ml. water, 0.0125 mole). The solution is heated on a steam bath while sodium chloroacetate (2.92 g., 0.025 mole in 5 ml. water) is added over 10 minutes. The solution is heated 1 hour, then treated simultaneously with sodium hydroxide (1.0 g. in 5 ml. water, 0.0125 mole) and sodium chloroacetate (2.92 g. in 5 ml. water, 0.025 mole). Heating is continued 3 hours, the solution filtered, cooled and acidified with concentrated hydrochloric acid to pH 4. The acidic solution is extracted with 50 ml. of ether which in turn is extracted with 50 ml. of aqueous sodium bicarbonate. The latter then is acidified to pH 4, extracted with 30 ml. of ether, dried over sodium sulfate and the ether evaporated in vacuo. The residue then is recrystallized from a mixture of benzene and cyclohexane to give 2.6 g. (39%) of 3-chloro-4-(2-methylenebutyryl)phenoxyacetic acid, M.P. 109–110° C. This product does not depress the melting point of a sample prepared as in Example 10.

EXAMPLE 82

*3-chloro-4-[2-(carboxymethylmercaptomethyl) butyryl]phenoxyacetic acid*

By following substantially the same procedure described in Example 5 but replacing the 4-methacryloyl-3-chlorophenoxyacetic acid by an equimolecular amount of 3 - chloro - 4 - (2-methylenebutyryl)phenoxyacetic acid, a thick syrup is obtained which solidifies upon trituration with hot benzene to give 3-chloro-4-[2-(carboxymethylmercaptomethyl)butyryl]phenoxyacetic acid, M.P. 75° C.

*Analysis.*—Calculated for $C_{15}H_{17}ClO_6S$: C, 49.95; H, 4.75; Cl, 9.83. Found: C, 49.76; H, 4.74; Cl, 9.97.

EXAMPLE 83

*2-bromo-3-chloro-4-(2-methylenebutyryl) phenoxyacetic acid*

STEP A.—PREPARATION OF 2′-CHLORO-3′-BROMO-4′-HYDROXYBUTYROPHENONE

This product is prepared by substantially the same method described in Example 74, Step A, using the following reagents:

2-bromo-3-chloroanisole _____ 63.5 g. (0.287 mole).
Butyryl chloride _____ 61.16 g. (0.574 mole).
Carbon disulfide _____ 350 ml.
Aluminum chloride _____ 76.54 g. (0.574 mole).

After the addition of the second portion of aluminum chloride, the carbon disulfide is removed by distillation. An equal volume of dry heptane is added and the mixture is heated on a steam bath with stirring for three hours. After cooling to room temperature, the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semisolid residue. This material is treated with excess 5% aqueous sodium hydroxide solution and heated under reflux for one hour, then cooled and extracted with ether to remove insoluble oil. The clear aqueous solution is acidified with concentrated hydrochloric acid and the resulting oil is extracted with ether, the ethereal solution dried over anhydrous sodium sulfate and the ether removed under reduced pressure to give a solid. After one recrystallization from cyclohexane, one from a mixture of benzene and cyclohexane and one from carbon tetrachloride, there is obtained 61.3 g. (77%) of 2′-chloro-3′-bromo-4′-hydroxybutyrophenone in the form of white prisms, M.P. 107–108.5° C.

*Analysis.*—Calculated for $C_{10}H_{10}BrClO_2$: C, 43.27; H, 3.63. Found: C, 43.79; H, 3.91.

STEP B.—PREPARATION OF 2-BROMO-3-CHLORO-4-BUTYRYLPHENOXYACETIC ACID

This product is prepared by substantially the same method described in Example 74, Step B, using the following reagents:

2′-chloro-3′-bromo-4′-hydroxy
  butyrophenone _____ 60.8 g. (0.219 mole).
Sodium hydroxide _____ 52.56 g. (1.314 mole).
Choloracetic acid _____ 62.09 g. (0.657 mole).
Water _____ 471 ml.

During the addition of the final portion of chloroacetic acid, the reaction mixture partially solidifies and 500 ml. of boiling water is added to effect solution. There is obtained, after 4 recrystallizations from a mixture of benzene and cyclohexane and one from benzene, 30.6 g. (42%) of 2-bromo-3-chloro-4-butyrylphenoxyacetic acid in the form of white needles, M.P. 105.5–107° C.

*Analysis.*—Calculated for $C_{12}H_{12}BrClO_4$: C, 42.95; H, 3.60; Br, 23.81. Found: C, 43.16; H, 3.59; Br, 23.76.

STEP C.—PREPARATION OF 2-BROMO-3-CHLORO-4-(2-METHYLENEBUTYRYL)PHENOXYACETIC ACID

This product is prepared by following substantially the same procedures described in Example 15, Steps B and C, using the following reagents:

2-bromo-3-chloro-4-butyryl-
  phenoxyacetic acid _____ 11.75 g. (0.035 mole).
Paraformaldehyde _____ 1.23 g. (0.0408 mole).
Dimethylamine hydrochloride _ 3.12 g. (0.0382 mole).
Acetic acid _____ 7 drops.

After dissolving the intermediate Mannich product in 1000 ml. of warm water, adding sodium bicarbonate, heating and working up in the usual manner, there is obtained, after one recrystallization from methylcyclohexane and three from carbon tetrachloride, 7.26 g. (60%) of 2-bromo-3-chloro - 4 - (2-methylenebutyryl) phenoxyacetic acid in the form of white needles, M.P. 128–130° C.

*Analysis.*—Calculated for $C_{13}H_{12}BrClO_4$: C, 44.92; H, 3.48; Br, 22.99. Found: C, 44.90; H, 3.71; Br, 22.88.

EXAMPLE 84

*4-(2-methylenebutyryl)-2-chloro-3-methylphenoxyacetic acid*

STEP A.—PREPARATION OF 2-CHLORO-3-METHYLPHENOXYACETIC ACID

The above product is prepared following substantially the same procedure described in Example 74, Step B, using the following substances:

2-chloro-3-methylphenol _____ 28.7 g. (0.20 mole).
Chloroacetic acid _____ 38 g. (0.40 mole).
Sodium hydroxide _____ 32 g. (0.80 mole).

Acidification of the basic reaction mixture yields 28.5 g. (71%) of 2-chloro-3-methylphenoxyacetic acid melting at 184–185° C.

*Analysis.*—Calculated for $C_9H_9ClO_3$: C, 53.88; H, 4.52; Cl, 17.67. Found: C, 54.22; H, 4.39; Cl, 17.15.

STEP B.—PREPARATION OF 4-BUTYRYL-2-CHLORO-3-METHYLPHENOXYACETIC ACID

The above product is prepared following substantially the same procedure as described in Example 1, Step A, using the following substances:

2-chloro-3-methylphenoxyacetic
  acid _____ 25 g. (0.125 mole).
Butyryl chloride _____ 16.6 g. (0.156 mole).
Aluminum chloride _____ 54 g. (0.405 mole).
Carbon disulfed _____ 200 ml.

After treatment of the reaction mixture with ice (500 g.) and concentrated hydrochloric acid (30 ml.), the product is extracted into 400 ml. of ether (which is dried over sodium sulfate) and evaporated in vacuo. The residue is recrystallized from benzene (80 ml.) and cyclohexane (700 ml.) to give 30.8 g. (91%) of 4-butyryl-2-chloro-3-methylphenoxyacetic acid which, after another recrystallization from benzene and cyclohexane, melts at 95–97° C.

*Analysis.*—Calculated for $C_{13}H_{15}ClO_4$: C, 57.67; H, 5.59. Found: C, 57.44; H, 5.77.

STEP C.—PREPARATION OF 4-(2-DIMETHYLAMINOMETHYLBUTYRYL)-2-CHLORO-3 - METHYLPHENOXYACETIC ACID HYDROCHLORIDE

The above product is prepared following substantially the same procedure as described in Example 3, Step B, using the following substances:

4-butyryl-2-chloro-3-methylphe-
  noxyacetic acid _____ 13.36 g. (0.05 mole).
Paraformaldehyde _____ 2.0 g. (0.067 mole).
Dimethylamine hydrochloride __ 5.0 g. (0.0615 mole).
Glacialacetic acid _____ 1.0 ml.

The reaction mixture is recrystallized from ethyl alcohol (100 ml.) and ether (100 ml.) to give 12.5 g. (70%) of 4-(2-dimethylaminomethylbutyryl)-2 - chloro-3-methylphenoxyacetic acid hydrochloride in the form of a white, crystalline solid which melts at 180–182° C.

STEP D.—PREPARATION OF 4-(2-METHYLENEBUTYRYL)-2-CHLORO-3-METHYLPHENOXYACETIC ACID

The above product is prepared following substantially the same procedure described in Example 3, Step C, using the following substances:

| | |
|---|---|
| 4-(2 - dimethylaminomethyl-butyryl) - 2 - chloro - 3-methylphenoxyacetic acid hydrochloride | 12.5 g. (0.0345 mole). |
| Water | 300 ml. |
| Saturated aqueous sodium bicarbonate | 200 ml. |

After heating on a steam bath for 1¼ hours, the reaction mixture is cooled and acidified to pH 4 with dilute hydrochloric acid. The product is extracted with 300 ml. of ether in several portions and dried over sodium sulfate. Evaporation of the ether in vacuo yields 7.7 g. (80%) of 4-(2-methylenebutyryl)-2-chloro-3-methylphenoxyacetic acid which, after several recrystallizations from methylcyclohexane, melts at 89–91° C.

Analysis.—Calculated for $C_{14}H_{15}O_4Cl$: C, 59.47; H, 5.35. Found: C, 59.33; H, 5.48.

EXAMPLE 85

*4-(2-methylenebutyryl)-2-nitro-3-methylphenoxyacetic acid*

STEP A.—PREPARATION OF 2'-METHYL-3'-NITRO-4'-HYDROXYBUTYROPHENONE

The above product is prepared following substantially the same procedure described in Example 74, Step A, using the following substances:

| | |
|---|---|
| 2-nitro-3-methylanisole | 84 g. (0.50 mole). |
| Butyryl chloride | 107 g. (1.0 mole). |
| Carbon disulfide | 400 ml. |
| Aluminum chloride | 134 g. (1.0 mole). |

After the addition of the second portion of aluminum chloride, 350 ml. of heptane (previously dried over aluminum chloride) is added and the reaction mixture heated at 93° C. for 3 hours. The heptane is decanted, and the solid product scraped onto 200 g. of ice. The product is extracted with 300 ml. of ether which is in turn extracted with 300 ml. of 5% aqueous sodium sydroxide. Acidification with dilute hydrochloric acid to pH 4 gives 18.1 g. (16.5%) of crude 2'-methyl-3'-nitro-4'-hydroxybutyrophenone which, after several recrystallizations from methylcyclohexane, melts at 133–134° C.

Analysis.—Calculated for $C_{11}H_{13}NO_4$: C, 59.18; H, 5.87; N, 6.28. Found: C, 59.54; H, 6.01; N, 6.63.

STEP B.—PREPARATION OF 4-BUTYRYL-2-NITRO-3-METHYLPHENOXYACETIC ACID

A 250 ml. round-bottomed flask equipped with a mechanical stirrer and condenser fitted with a calicum chloride tube is charged with 2'-methyl-3'-nitro-4'-hydroxybutyrophenone (4.90 g., 0.022 mole) and ethyl alcohol (60 ml.). Sodium hydride (50% in mineral oil, 1.25 g., 0.025 mole) is added and the solution refluxed on a water bath for five minutes. Ethyl bromoacetate (7.35 g., 0.044 mole) is added and the solution is refluxed on a water bath for 4 hours. Twenty-three ml. of 2N potassium hydroxide is added, the solution is refluxed for 10 minutes and the alcohol is removed by vacuum distillation. The residue is suspended between 200 ml. of water and 100 ml. of ether in a separatory funnel. The aqueous fraction is acidified to pH 4 with conc. hydrochloric acid, extracted with 70 ml. of ether (which is dried over sodium sulfate) and evaporated in vacuo to give the crude product. Recrystallization from acetic acid (30 ml.) and water (180 ml.) gives 3.3 g. (53%) of 4-butyryl-2-nitro-3-methylphenoxyacetic acid in the form of a white solid melting at 134–136° C.

Analysis.—Calculated for $C_{13}H_{15}NO_6$: C, 55.51; H, 5.37; N, 4.98. Found: C, 55.69; H, 5.25; N, 5.00.

STEP C.—PREPARATION OF 4-(2-METHYLENEBUTYRYL)-2-NITRO-3-METHYLPHENOXYACETIC ACID

The above product is prepared following substantially the same procedure as described in Example 3, Steps B and C, using the following substances:

| | |
|---|---|
| 4-butyrylphenoxy-2-nitro-3-methylacetic acid | 3.2 g. (0.0114 mole). |
| Paraformaldehyde | 1.5 g. (0.05 mole). |
| Dimethylamine hydrochloride | 3.6 g. (0.044 mole). |
| Glacial acetic acid | 6 drops. |

The viscous Mannich product is dissolved in aqueous sodium bicarbonate and heated 1 hour on a steam bath. The solution is acidified to pH 4 with dilute hydrochloric acid and extracted with 50 ml. of ether (which is dried over sodium sulfate) and evaporated in vacuo. Recrystallization of the residue from benzene (20 ml.) and cyclohexane (50 ml.) gives 1.4 g. (54%) of 4-(2-methylenebutyryl)-2-nitro-3-methylphenoxyacetic acid in the form of white crystals melting at 95–96° C. Repeated recrystallization from benzene-cyclohexane raises the melting point to 103–105° C.

Analysis.—Calculated for $C_{14}H_{15}NO_6$: C, 57.33; H, 5.16; N, 4.78. Found: C, 57.43; H, 5.12; N, 4.66.

EXAMPLE 86

*4-(2-methylenebutyryl)-3-acetamidophenoxyacetic acid*

STEP A.—PREPARATION OF 2'-ACETAMIDO-4'-HYDROXYBUTYROPHENONE

The above product is prepared following substantially the same procedure described in Example 74, Step A, using the following substances:

| | |
|---|---|
| m-Acetanisidide | 96.5 g. (0.58 mole). |
| Butyryl chloride | 112 g. (1.06 mole). |
| Carbon disulfide | 400 ml. |
| Powdered aluminum chloride | 320 g. (2.40 mole). |

After the addition of the second portion of aluminum chloride, 450 ml. of heptane (previously dried over aluminum chloride) is added. The mixture is heated at 80° C. for 3 hours, cooled, the heptane decanted and the product poured onto 2 kg. ice containing 120 ml. of concentrated hydrochloric acid. Extraction with 1 liter of ether yields 80.0 g. (61%) of 2'-acetamido-4'-hydroxybutyrophenone which, after recrystallization from ethanol (200 ml.) and water (500 ml.), melts at 94–96° C.

Analysis.—Calculated for $C_{12}H_{15}NO_3$: C, 65.14; H, 6.83; N, 6.33. Found: C, 64.84; H, 6.64; N, 6.36.

STEP B.—PREPARATION OF 4-BUTYRYL-3-ACETAMIDOPHENOXYACETIC ACID

The above product is prepared by substantially the same method described in Example 74, Step B, employing the following materials:

| | |
|---|---|
| 2'-acetamido-4'-hydroxybutyrophenone | 15.5 g. (0.07 mole) |
| Chloroacetic acid | 13.2 g. (0.14 mole) |
| Sodium hydroxide | 11.2 g. (0.28 mole) |

After heating, the reaction mixture is cooled and acidified with concentrated hydrochloric acid and extracted with ether. The ether is removed at reduced pressure, the residue dissolved in aqueous sodium bicarbonate solution, filtered from a small amount of insoluble residue and acidified with dilute hydrochloric acid to give 4.2 g. (21%) of crude 4-butyryl-3-acetamidophenoxyacetic acid which after recrystallization from ethyl alcohol (40 ml.) and water (30 ml.) melted at 177–179° C.

STEP C.—PREPARATION OF 4-(2-METHYLENEBUTYR-YL)-3-ACETAMIDOPHENOXYACETIC ACID

A 50 ml. round-bottomed flask is charged with 4-butyryl-3-acetamidophenoxyacetic acid (1.1 g., 0.0039 mole), paraformaldehyde (0.5 g., 0.0167 mole), dimethylamine hydrochloride (1.2 g., 0.0147 mole) and glacial acetic acid (3 drops) and heated on a steam bath for 2 hours. The viscous reaction mixture is extracted into 50 ml. of water, filtered and treated with 20 ml. of saturated aqueous sodium bicarbonate. After heating the solution on a steam bath for 1 hour, it is acidified with dilute hydrochloric acid to pH 4 and extracted with 100 ml. of ether. The ether is dried over sodium sulfate and evaporated in vacuo to give 205 mg. of 4-(2-methylenebutyryl)-3-acetamidophenoxyacetic acid which melts at 99–102° C.

*Analysis.*—Calculated for $C_{15}H_{17}NO_5$: C, 61.84; H, 5.88; N, 4.81. Found: C, 61.83; H, 6.14; N, 4.73.

EXAMPLE 87

*2-chloro-3-(2-methylenebutyryl)phenoxyacetic acid*

STEP A.—PREPARATION OF 2-CHLORO-3-METHOXY-α-PROPYLBENZYL ALCOHOL

By following substantially the same procedure described in Step A, Example 80, but replacing the 2,6-dichloro-3-methoxybenzaldehyde by an equimolecular quantity of 2-chloro-3-methoxybenzaldehyde, and following substantially the same procedure described in Step A of Example 80, there is obtained a 97% yield of 2-chloro-3-methoxy-α-propylbenzyl alcohol.

STEP B.—PREPARATION OF 2'-CHLORO-3'-METHOXYBUTYROPHENONE

By following substantially the same procedure described in Step B of Example 80 but replacing the 2,6-dichloro-3-methoxy-β-propylbenzyl alcohol by an equimolecular quantity of 2-chloro-3-methoxy-α-propylbenzyl alcohol, and following substantially the same procedure described in Step B of Example 80 there is obtained 2'-chloro-3'-methoxybutyrophenone, B.P. 174–180° C. at 22 mm. pressure $n_D^{23}$ 1.5375.

STEP C.—PREPARATION OF 2'-CHLORO-3'-HYDROXYBUTYROPHENONE

By replacing the 2',6'-dichloro-3'-methoxybutyrophenone employed in Step C of Example 80 by an equimolecular quantity of 2'-chloro-3'-methoxybutyrophenone and following substantially the same procedure described in Step C of Example 80 there is obtained 2'-chloro-3'-hydroxybutyrophenone, B.P. 110–120° C. at 0.3 mm. pressure, yield 88%.

*Analysis.*—Calculated for $C_{10}H_{11}ClO_2$: C, 60.46; H, 5.58. Found: C, 59.90; H, 5.54.

STEP D.—PREPARATION OF 2-CHLORO-3-BUTYRYL-PHENOXYACETIC ACID

By replacing the 3-propionylphenol employed in Step A of Example 42 by an equimolecular quantity of 2'-chloro-3'-hydroxybutyrophenone and following substantially the same procedure described in Step A of Example 42, there is obtained 2-chloro-3-butyrylphenoxyacetic acid, M.P. 74.5–76.5° C.

*Analysis.*—Calculated for $C_{12}H_{13}ClO_4$: C, 56.15; H, 5.10. Found: C, 56.00; H, 5.19.

STEP E.—PREPARATION OF 2-CHLORO-3-(2-DIMETHYLAMINOMETHYLBUTYRYL)PHENOXYACETIC ACID HYDROCHLORIDE

By following substantially the same procedure described in Example 3, Step B, but replacing the 4-propionyl-3-chlorophenoxyacetic acid by an equimolecular quantity of 2-chloro-3-butyrylphenoxyacetic acid, there is obtained 2-chloro - 3 - (2-dimethylaminomethylbutyryl)phenoxyacetic acid hydrochloride.

STEP F.—PREPARATION OF 2-CHLORO-3-(2-METHYLENEBUTYRYL)PHENOXYACETIC ACID

The Mannich compound obtained as described in Step E is treated with sodium bicarbonate solution by substantially the same method described in Example 3, Step C, to give 2-chloro-3-(2-methylenebutyryl)phenoxyacetic acid, M.P. 118–119° C. after recrystallization from benzene.

*Analysis.*—Calculated for $C_{13}H_{13}ClO_4$: C, 58.11; H, 4.88; Cl, 13.20. Found: C, 58.24; H, 4.92; Cl, 13.05.

EXAMPLE 88

*2-(2-methylenebutyryl)-3-methylphenoxyacetic acid*

STEP A.—PREPARATION OF 2'-METHOXY-6'-METHYLBUTYROPHENONE

To a solution of 2-methoxy-6-methylphenylmagnesium bromide [prepared from 2-bromo-3-methylanisole (16.5 g., 0.082 mole) and magnesium (2.1 g., 0.086 mole)] in 40 cc. of ether is added a solution of butyronitrile (5.9 g., 0.085 mole) in ether (10 ml.) and the mixture refluxed for 2¼ hours. The reaction product then is poured into a mixture of ice and hydrochloric acid which then is heated 18 hours on the steam bath. The oil that separates is taken up in ether, the ether solution dried and the ether then evaporated to give an 8.4 g. yield of 2'-methoxy-6'-methylbutyrophenone.

STEP B.—PREPARATION OF 2'-HYDROXY-6'-METHYLBUTYROPHENONE

A mixture of 2'-methoxy-6'-methylbutyrophenone (8.4 g., 0.044 mole), aluminum chloride (17.3 g., 0.13 mole) and 60 cc. of heptane is heated 2¼ hours on the steam bath. The heptane then is decanted and the residue hydrolyzed with ice-water. The oil that separates is distilled, yielding 6.2 g. of 2'-hydroxy-6'-methylbutyrophenone, B.P. 155–158° C. at 20 mm. pressure.

*Analysis.*—Calculated for $C_{11}H_{14}O_2$: C, 74.13; H, 7.92. Found: C, 73.89; H, 7.62.

STEP C.—PREPARATION OF 2-BUTYRYL-3-METHYLPHENOXYACETIC ACID

2'-hydroxy-6'-methylbutyrophenone is alkylated with ethyl bromoacetate by substantially the same procedure described in Example 42, Step A, to give 2-butyryl-3-methylphenoxyacetic acid, M.P. 112.5–114.5° C. after recrystallization from benzene.

*Analysis.*—Calculated for $C_{13}H_{16}O_4$: C, 66.08; H, 6.83. Found: C, 66.28; H, 6.84.

STEP D.—PREPARATION OF 2-(2-DIMETHYLAMINOMETHYLBUTYRYL)-3-METHYLPHENOXYACETIC ACID HYDROCHLORIDE

By replacing the 4-propionyl-3-chlorophenoxyacetic acid employed in Example 3, Step B, by an equimolecular quantity of 2-butyryl-3-methylphenoxyacetic acid and following substantially the same procedure described in Step B of Example 3, there is obtained 2-(2-dimethylaminomethylbutyryl)-3-methylphenoxyacetic acid hydrochloride which after recrystallization from isopropyl alcohol melts at 158–160° C.

STEP E.—PREPARATION OF 2-(2-METHYLENEBUTYR-YL)-3-METHYLPHENOXYACETIC ACID

The Mannich compound obtained as described in Step D is treated with sodium bicarbonate solution by substantially the same procedure described in Step C of Example 3 to give 2-(2-methylenebutyryl)-3-methplphenoxyacetic acid which after recrystallization from benzene melts at 81.5–82.5° C.

*Analysis.*—Calculated for $C_{14}H_{16}O_4$: C, 67.73; H, 6.50. Found: C, 67.74; H, 6.44.

EXAMPLE 89

*2-[3-chloro-4-(2-methylenebutyryl)phenoxy]-3-methylbutyric acid*

STEP A.—PREPARATION OF 2-(3-CHLORO-4-BUTYR-YLPHENOXY)-3-METHYLBUTYRIC ACID

Sodium (4.8 g., 0.21 mole) is dissolved in absolute ethanol (150 ml.) and 2'-chloro-4'-hydroxybutyrophenone (39.73 g., 0.20 mole), prepared as described in Example 54, Step B, is added in one portion. The resulting solution is stirred while ethyl 2-bromoisovalerate (41.8 g., 0.20 mole) is added dropwise over ½ hour. The mixture then is heated to boiling for 22 hours with stirring. The alcohol is distilled and to the residue is added a solution of sodium hydroxide (10 g., 0.25 mole) in water (150 ml.). The mixture is heated at 90° C. with stirring for two hours and then acidified with concentrated hydrochloric acid. The cooled mixture is extracted with ether, the ether extract washed with water and then extracted with 10% sodium bicarbonate solution. The bicarbonate extract is washed with ether, shaken with decolorizing carbon and acidified with concentrated hydrochloric acid. The oil that separates is extracted with ether, the ether extract dried over sodium sulfate and the ether then evaporated. The residual yellow oil is distilled, B.P. 183–200° C. at 1 mm. pressure, to give 18.3 g. of product. This product is used directly in the next step. A sample purified for analysis melted at 68–69° C.

Analysis.—Calculated for $C_{15}H_{19}ClO_4$: C, 60.30; H, 6.41; Cl, 11.87. Found: C, 60.59; H, 6.32; Cl, 11.71.

STEP B.—PREPARATION OF 2-[3-CHLORO-4-(2-METHYLENEBUTYRYL)PHENOXY] - 3 - METHYLBUTYRIC ACID

The compound obtained as described in Step A (18.26 g., 0.06 mole), paraformaldehyde (1.98 g., 0.066 mole), dimethylamine hydrochloride (4.98 g., 0.061 mole), acetic acid (0.5 ml.) are mixed and heated at 90–100° C. with stirring for 5 hours. Subsequent treatment of the semi-solid product by substantially the same procedure described in Example 75, Step B, yields 2-[3-chloro-4-(2-methylenebutyryl)phenoxy]-3-methylbutyric acid, 3.91 g., M.P. 94–95.5° C., after recrystallization from isopropyl alcohol.

Analysis.—Calculated for $C_{16}H_{19}ClO_4$: C, 61.83; H, 6.16; Cl, 11.41. Found: C, 62.02; H, 6.26; Cl, 11.39.

A sample of the intermediate Mannich product, before treatment with sodium bicarbonate by the method described in Example 75, Step B, was crystallized from isopropyl alcohol to give 2-[3-chloro-4-(2-dimethylaminomethylbutyryl)phenoxy]-3-methylbutyric acid hydrochloride, M.P. 153–155° C.

Analysis.—Calculated for $C_{18}H_{26}ClNO_4 \cdot HCl$: C, 55.11; H, 6.94; Cl, 18.07. Found: C, 55.36; H, 7.02; Cl, 17.85.

EXAMPLE 90

3-chloro-4-(2-methylene-3,3-dimethylbutyryl)-phenoxyacetic acid

STEP A.—PREPARATION OF 2′-CHLORO-3,3-DIMETHYL-4′-HYDROXYBUTYROPHENONE

The reaction of 3,3-dimethylbutyryl chloride (19.9 g., 0.148 mole), 3-chlorophenetol (23 g., 0.148 mole) and aluminum chloride (61 g., 0.444 mole) in petroleum ether is carried out in substantially the same manner described in Example 57, Step A, to give 9.1 g. of 2′-chloro-3,3-dimethyl-4′-hydroxybutyrophenone, B.P. 128–165° C. at 0.8 mm. pressure, M.P. 97–98° C. after crystallization from cyclohexane.

Analysis.—Calculated for $C_{12}H_{15}ClO_2$: C, 63.53; H, 6.67; Cl, 15.64. Found: C, 63.42; H, 6.69; Cl, 15.38.

STEP B.—PREPARATION OF 3-CHLORO-4-(3,3-DIMETHYLBUTYRYL)PHENOXYACETIC ACID

By following substantially the same procedure described in Example 57, Step B, but replacing the phenol used in Example 57, Step B, by an equimolecular quantity of 2′-chloro-3,3-dimethyl-4′-hydroxybutyrophenone, there is obtained 7.52 g. of 3-chloro-4-(3,3-dimethylbutyryl)phenoxyacetic acid 103–104° C. after crystallization from benzene.

Analysis.—Calculated for $C_{14}H_{17}ClO_4$: C, 59.04; H, 6.01; Cl, 12.31. Found: C, 59.01; H, 5.86; Cl, 12.28.

STEP C.—PREPARATION OF 3-CHLORO-4-(2-METHYLENE - 3,3 - DIMETHYLBUTYRYL)PHENOXYACETIC ACID

A mixture of 3-chloro-4-(3,3-dimethylbutyryl)phenoxyacetic acid (5.4 g., 0.019 mole), paraformaldehyde (2.05 g.), dimethylamine hydrochloride (4.84 g.) and acetic acid (0.5 ml.) is heated at 90–100° C. for 35 hours. The product is suspended in water and extracted with ether, the aqueous layer is separated and made basic with solid sodium bicarbonate and the solution then heated at 80–90° C. for two hours, cooled and acidified with hydrochloric acid. The solid that separates is crystallized from benzene to give 1.6 g. of 3-chloro-4-(2-methylene-3,3-dimethylbutyryl)phenoxyacetic acid, M.P. 122–124° C.

Analysis.—Calculated for $C_{15}H_{17}ClO_4$: C, 60.70; H, 5.78; Cl, 11.95. Found: C, 60.39; H, 6.04; Cl, 11.94.

EXAMPLE 91

2,3-dichloro-4-(2-methyleneisovaleryl)-phenoxyacetic acid

STEP A.—PREPARATION OF 2′,3′-DICHLORO-4′-HYDROXYISOVALEROPHENONE

This product is prepared by substantially the same method described in Example 84, Step A, using the following reagents:

| | |
|---|---|
| 2,3-dichloroanisole | 53.11 g., 0.3 mole. |
| Isovaleryl chloride | 72.35 g., 0.6 mole. |
| Carbon disulfide | 350 ml. |
| Aluminum chloride | 80.00 g., 0.6 mole. |

After one recrystallization from cyclohexane and one from carbon tetrachloride, there is obtained 57.2 g. (77%) of 2′,3′-dichloro-4′-hydroxyisovalerophenone in the form of prisms, M.P. 109.5–111.5° C. An additional recrystallization from cyclohexane gives material melting at 110–112° C.

Analysis.—Calculated for $C_{11}H_{12}Cl_2O_2$: C, 53.46; H, 4.89; Cl, 28.69. Found: C, 53.57; H, 4.94; Cl, 28.51.

STEP B.—PREPARATION OF 2,3-DICHLORO-4-ISOVALERYLPHENOXYACETIC ACID

This product is prepared following substantially the same method described in Example 74, Step B, using the following reagents:

| | |
|---|---|
| 2′,3′-dichloro-4′-hydroxyisovalerophenone | 55.60 g., 0.225 mole. |
| Sodium hydroxide | 54.00 g., 1.350 mole. |
| Chloroacetic acid | 63.79 g., 0.675 mole. |
| Water | 450 ml. |

Two recrystallizations from a mixture of benzene and cyclohexane give 43.8 g. (64%) of 2,3-dichloro-4-isovalerylphenoxyacetic acid in the form of a white solid, M.P. 110.5–112° C.

Two additional recrystallizations from the same mixture do not change the melting point.

Analysis.—Calculated for $C_{13}H_{14}Cl_2O_4$: C, 51.17; H, 4.62; Cl, 23.24. Found: C, 51.42; H, 4.77; Cl, 23.07.

STEP C.—PREPARATION OF 2,3-DICHLORO-4-(2-METHYLENEISOVALERYL)PHENOXYACETIC ACID

This product is prepared by substantially the same method described in Example 74, Step C, using the following reagents:

| | |
|---|---|
| 2,3-dichloro-4-isovalerylphenoxyacetic acid | 10.68 g., 0.035 mole. |
| Paraformaldehyde | 3.69 g., 0.1224 mole. |
| Dimethylamine hydrochloride | 9.36 g., 0.1146 mole. |
| Acetic acid | 21 drops. |

In order to completely form the salt of the Mannich base, the unreacted starting material recovered at the end of the reaction period is recycled using the same quantities of reagents. This process is repeated a second time. The Mannich salt is heated with aqueous sodium bicarbonate and the product combined with that formed directly in the Mannich reaction to give a total of 10.74 g. (97%) of 2,3-dichloro-4-(2 - methyleneisovaleryl)phenoxyacetic acid, M.P. 132–138° C. After one recrystallization from a mixture of benzene and cyclohexane and two from carbon tetrachloride the product is obtained in the form of white needles, M.P. 139–140° C.

*Analysis.*—Calculated for $C_{14}H_{14}Cl_2O_4$: C, 53.02; H, 4.45; Cl, 22.36. Found: C, 53.33; H, 4.27; Cl, 22.30.

EXAMPLE 92

*3-methyl-4-(2-methylene-3-trifluoromethylbutyryl) phenoxyacetic acid*

STEP A.—PREPARATION OF 3 - METHYL - 4 - (3 - TRI-FLUOROMETHYLBUTYRYL)PHENOXYACETIC ACID

Aluminum chloride (38.0 g., 0.28 mole) is added portionwise over 45 minutes to a mixture of 3-methylphenoxyacetic acid (15.4 g., 0.093 mole) and 3-trifluoromethylbutyryl chloride (16.5 g., 0.095 mole) in 250 ml. of carbon disulfide cooled in an ice bath. The mixture is stirred at room temperature for five hours and allowed to stand at room temperature for an additional 18 hours. The solid then is collected on a filter and added portionwise to 500 g. of ice and 80 ml. of concentrated hydrochloric acid. The product is extracted with ether, the ether extract washed with water, dried over sodium sulfate, filtered and evaporated to dryness on the steam bath. The residue is dissolved in 150 ml. of ethanol, cooled in an ice bath and hydrogen chloride passed through the solution for 15 minutes. After heating on the steam bath for four hours, the solution is concentrated to dryness and the residue distilled at 0.3 mm. pressure. The distilled ester then is refluxed on the steam bath for one hour with 25 ml. of ethanol and 40 ml. of 10% aqueous sodium hydroxide. Upon cooling, the solution is acidified with concentrated hydrochloric acid and the solid that forms is collected and recrystallized from a mixture of ether and petroleum ether to give 3-methyl-4-(3-trifluoromethylbutyryl)phenoxyacetic acid, M.P. 91.93° C.

*Analysis.*—Calculated for $C_{14}H_{15}F_3O_4$: C, 55.26; H, 4.97; F, 18.73. Found: C, 55.50; H, 4.91; F, 18.67.

STEP B.—PREPARATION OF 3-METHYL-4-(2-METHYLENE - 3 - TRIFLUOROMETHYLBUTYRYL)PHENOXYACETIC ACID

A mixture of 3-methyl-4-(3-trifluoromethylbutyryl)phenoxyacetic acid (3.0 g., 0.01 mole), dimethylamine hydrochloride (0.9 g., 0.011 mole), paraformaldehyde (0.6 g., 0.03 mole) and glacial acetic acid (5 ml.) is heated at 120° C. for 27 hours. Water (150 ml.) is added and the solid that forms is collected and recrystallized from a mixture of ether and petroleum ether to give 3-methyl-4 - (2 - methylene - 3 - trifluoromethylbutyryl) phenoxyacetic acid, M.P. 116–118° C.

*Analysis.*—Calculated for $C_{15}H_{15}F_3O_4$: C, 56.98; H, 4.78; F, 18.02. Found: C, 57.34; H, 4.76; F, 17.93.

EXAMPLE 93

*3-chloro-4-(2-methylene-4-methylvaleryl)phenoxyacetic acid*

STEP A.—PREPARATION OF 3-CHLORO-4-(4-METHYLVALERYL)PHENOXYACETIC ACID

This product is prepared following substantially the same procedure described in Example 8, Step A, using the following reactants:

| | |
|---|---|
| 4-methylvaleryl chloride | 134.6 g. (0.272 mole). |
| 3-chlorophenoxyacetic acid | 44.8 g. (0.24 mole). |
| Aluminum chloride | 100.8 g. (0.755 mole). |
| Carbon disulfide | 250 ml. |

This product is obtained in the form of a colorless solid and after crystallization from a mixture of ether and ligroin there is obtained 3-chloro-4-(4-methylvaleryl) phenoxyacetic acid, M.P. 89.5–90° C., yield 20 g.

*Analysis.*—Calculated for $C_{14}H_{17}ClO_4$: C, 59.05; H, 6.02. Found: C, 58.81; H, 6.08.

STEP B.—PREPARATION OF 3-CHLORO-4-(2-METHYLENE-4-METHYLVALERYL)PHENOXYACETIC ACID

A mixture of 3-chloro-4-(4-methylvaleryl)phenoxyacetic acid (17.5 g., 0.063 mole), paraformaldehyde (1.91 g., 0.063 mole), dimethylamine hydrochloride (5.15 g., 0.063 mole) and acetic acid (0.5 ml.) is heated at 90–100° C. for 4 hours. The mixture then is dissolved in acetone (40 ml.) and ether added until no further precipitate is formed. The ether-acetone mixture (a) is decanted and the residue dissolved in water. The aqueous solution (b) is extracted with ether, made basic with 10% sodium bicarbonate, heated at 80–90° C. for 15 minutes and acidified. The solid that separates is collected by filtration, M.P. 114–116° C. The ether-acetone extract (a) is extracted with 5% sodium bicarbonate solution in portions until acidification of the aqueous extract yields no further precipitate. The bicarbonate extracts are combined and acidified with hydrochloric acid to give a solid, M.P. 111–114° C. The two crops of solids are combined, dried in air at 65° C. and then crystallized from a 9:10 mixture of cyclohexane and benzene and then from benzene to give 14.1 g. of 3-chloro-4-(2-methylene-4-methylvaleryl)phenoxyacetic acid, M.P. 115–116° C.

*Analysis.*—Calculated for $C_{15}H_{17}ClO_4$: C, 60.70; H, 5.78; Cl, 11.95. Found: C, 60.69; H, 5.89; Cl, 12.00.

EXAMPLE 94

*2,3-dichloro-4-(2-methylene-4-methylvaleryl)phenoxyacetic acid*

STEP A.—PREPARATION OF 4-METHYL-2′,3′-DICHLORO-4′-HYDROXYVALEROPHENONE

This product is prepared by substantially the same method described in Example 84, Step A, using the following reagents:

| | |
|---|---|
| 2,3-dichloroanisole | 53.11 g. (0.3 mole). |
| 4-methylvaleryl chloride | 80.77 g. (0.6 mole). |
| Carbon disulfide | 350 ml. |
| Aluminum chloride | 80.00 g. (0.6 mole). |

After one recrystallization from hexane there is obtained 65.7 g. (84%) of 4-methyl-2′,3′-dichloro-4′-hydroxyvalerophenone in the form of white prisms, M.P. 84–86.5° C. Two additional recrystallizations from hexane raise the melting point to 86–87° C.

*Analysis.*—Calculated for $C_{12}H_{14}Cl_2O_2$: C, 55.19; H, 5.40; Cl, 27.15. Found: C, 55.08; H, 5.42; Cl, 26.93.

STEP B.—PREPARATION OF 2,3-DICHLORO-4-(4-METHYLVALERYL)PHENOXYACETIC ACID

This product is prepared following substantially the same method described in Example 74, Step B, using the following reagents:

| | |
|---|---|
| 4-methyl - 2′,3′ - dichloro - 4′-hydroxyvalerophenone | 60.1 g. (0.23 mole). |
| Sodium hydroxide | 73.6 g. (1.84 mole). |
| Chloroacetic acid | 86.95 g. (0.92 mole). |
| Water | 533 ml. |

One recrystallization from cyclohexane and one from carbon tetrachloride gives 49.5 g. (67%) of 2,3-dichloro-4-(4-methylvaleryl)phenoxyacetic acid in the form of white needles, M.P. 106–108.5° C. Two additional recrystallizations from carbon tetrachloride raise the melting point to 108.5–109.5° C.

*Analysis.*—Calculated for $C_{14}H_{16}Cl_2O_4$: C, 52.68; H, 5.05; Cl, 22.22. Found: C, 52.80; H, 5.08; Cl, 22.02.

STEP C.—PREPARATION OF 2,3-DICHLORO-4-(2-METHYLENE-4-METHYLVALERYL)PHENOXYACETIC ACID

This product is prepared by following substantially the same method described in Example 74, Step C, using the following reagents:

| | |
|---|---|
| 2,3-dichloro-4 - (4-methylvaleryl) phenoxyacetic acid | 11.17 g., 0.035 mole. |
| Paraformaldehyde | 2.46 g., 0.0816 mole. |
| Dimethylamine hydrochloride | 6.24 g., 0.0764 mole. |
| Acetic acid | 14 drops. |

After one recrystallization from carbon tetrachloride there is obtained 8.94 g. (77%) of 2,3-dichloro-4-(2- methylene-4-methylvaleryl)phenoxyacetic acid in the form of white platelets, M.P. 107–109° C. Further recrystallization from carbon tetrachloride does not change the melting point.

*Analysis.*—Calculated for $C_{15}H_{16}Cl_2O_4$: C, 54.40; H, 4.87; Cl, 21.41. Found: C, 54.33; H, 4.73; Cl, 21.20.

EXAMPLE 95

*3-chloro-4-(2-cyclopentaneacryloyl)phenoxyacetic acid*

STEP A.—PREPARATION OF 3-CHLORO-4-(CYCLO-PENTANEACETYL)PHENOXYACETIC ACID

The reaction of cyclopentaneacetyl chloride (58 g., 0.40 mole) with 3-chlorophenoxyacetic acid (72.5 g., 0.4 mole) in the presence of aluminum chloride (174 g., 1.3 mole) is carried out in substantially the same manner described in Example 8, Step A. The product obtained is recrystallized from benzene to give 51.0 g. of 3-chloro-4-(cyclopentaneacetyl)phenoxyacetic acid, M.P. 107.5–108.5° C.

*Analysis.*—Calculated for $C_{15}H_{17}ClO_4$: C, 60.71; H, 5.78; Cl, 11.95. Found: C, 60.72; H, 6.01; Cl, 11.90.

STEP B.—PREPARATION OF 3-CHLORO-4-(2-CYCLO-PENTANEACRYLOYL)PHENOXYACETIC ACID

The compound prepared in Step A (6 g., 0.02 mole), paraformaldehyde (0.9 g., 0.03 mole), dimethylamine hydrochloride (2.43 g., 0.03 mole) and acetic acid (0.5 ml.) are mixed and heated at 80–90° C. for 4 hours. The reaction mixture then is treated as described in Example 31, Steps B and C, to give 2.5 g. of 3-chloro-4-(2-cyclopentaneacryloyl)phenoxyacetic acid which after recrystallization from a mixture of isopropyl alcohol and water melts at 127–128° C.

*Analysis.*—Calculated for $C_{16}H_{17}ClO_4$: C, 62.23; H, 5.55; Cl, 11.49. Found: C, 62.06; H, 5.88; Cl, 11.22.

EXAMPLE 96

*2,3-dichloro-4-(2-cyclopentaneacryloyl) phenoxyacetic acid*

STEP A.—PEPARATION OF 2',3'-DICHLORO-4'-HYDROXY-1-CYCLOPENTANEACETOPHENONE

To a mixture of 2,3-dichloroanisole (38.8 g., 0.213 mole) and cyclopentaneacetyl chloride (25 g., 0.17 mole) in carbon disulfide (250 ml.), there is added, with stirring, aluminum chloride (46.6 g., 0.35 mole). The mixture then is heated at 50–60° C. for 5 hours. The carbon disulfide then is removed by distillation, heptane (200 ml.) and aluminum chloride (26.67 g., 0.2 mole) is added and the mixture stirred and heated on the steam bath for 2 hours. The solvent then is decanted and ice water (400 ml.) is added slowly with external cooling in an ice bath. This is followed by addition of concentrated hydrochloric acid (40 ml.), and extraction with ether. The ether extract is washed with water and the ether then evaporated. The residue is added to 10% sodium hydroxide solution (160 ml.) and the mixture heated on a steam bath for 3 hours to saponify any ester that may have been formed. After acidification with hydrochloric acid, 2',3'-dichloro-4'-hydroxy-1-cyclopentaneacetophenone is obtained, M.P. 86–88° C., 28 g. yield. After recrystallization from a mixture of isopropyl alcohol and water and an additional recrystallization from cyclohexane, the product melts at 87–88° C.

*Analysis.*—Calculated for $C_{13}H_{14}Cl_2O_2$: C, 57.16; H, 5.17; Cl, 25.96. Found: C, 57.77; H, 5.10; Cl, 25.80.

STEP B.—PREPARATION OF 2,3-DICHLORO-4-CYCLOPENTANEACETYLPHENOXYACETIC ACID

By following substantially the same procedure described in Example 57, Step B, but replacing the phenol there used by an equimolecular quantity of 2',3'-dichloro-4'-hydroxy-1-cyclopentaneacetophenone there is obtained a 76% yield of 2,3-dichloro-4-cyclopentaneacetylphenoxyacetic acid which after crystallization from a mixture of ether and hexane and then from a mixture of benzene and hexane, melts at 127–128° C.

*Analysis.*—Calculated for $C_{15}H_{16}Cl_2O_4$: C, 54.41; H, 4.87; Cl, 21.42. Found: C, 54.84; H, 4.92; Cl, 21.36.

STEP C.—PREPARATION OF 2,3-DICHLORO-4-(2-CYCLOPENTANEACRYLOYL)PHENOXYACETIC ACID

A mixture of the compound obtained in Step B (8.3 g., 0.025 mole), paraformaldehyde (1 g., 0.033 mole), dimethylamine hydrochloride (2.03 g., 0.025 mole), and acetic acid (0.5 ml.) is heated at between 80–90° C. for 18 hours. The solid reaction product is suspended in a large volume of hot water (1.5 liters) and solid sodium bicarbonate is added until all the solid dissolves. The solution is heated at between 80–90° C. for ½ hour. Slight cooling causes separation of the sodium salt of 2,3-dichloro-4-(2-cyclopentaneacryloyl)phenoxyacetic acid which is converted to the free acid by acidification with hydrochloric acid while the reaction mixture is still hot. There is thus obtained 5.7 g. of 2,3-dichloro-4-(2-cyclopentaneacryloyl)phenoxyacetic acid which after recrystallization from a mixture of cyclohexane and benzene melts at 142–144° C.

*Analysis.*—Calculated for $C_{16}H_{16}Cl_2O_4$: C, 55.99; H, 4.70; Cl, 20.66. Found: C, 56.09; H, 4.88; Cl, 20.62.

EXAMPLE 97

*3-chloro-4-(2-cyclohexaneacryloyl)phenoxyacetic acid*

STEP A.—PREPARATION OF 3-CHLORO-4-(CYCLOHEXANEACETYL)PHENOXYACETIC ACID

This compound is prepared by substantially the same procedure described in Example 8, Step A, using the following reagents:

| | |
|---|---|
| Cyclohexaneacetyl chloride | 32.3 g., 0.205 mole. |
| 3-chlorophenoxyacetic acid | 36.3 g., 0.205 mole. |
| Aluminum chloride | 43.5 g., 0.325 mole. |
| Carbon disulfide | 240 ml. |

There is thus obtained 22.3 g. of 3-chloro-4-(cyclohexaneacetyl)phenoxyacetic acid which after crystallization from benzene melts at 118–118.5° C.

*Analysis.*—Calculated for $C_{16}H_{19}ClO_4$: C, 61.83; H, 6.16; Cl, 11.41. Found: C, 61.79; H, 6.36; Cl, 11.27.

STEP B.—PREPARATION OF 3-CHLORO-4-(2-CYCLOHEXANEACRYLOYL)PHENOXYACETIC ACID

The compound obtained in Step A (6.2 g., 0.02 mole), paraformaldehyde (0.9 g., 0.03 mole), dimethylamine hydrochloride (2.43 g., 0.03 mole) and acetic acid (0.5 ml.) are mixed and heated at 90–100° C. for 5 hours. The product then is treated by substantially the same procedures described in Example 34, Steps B and C, to give 2.5 g. of 3-chloro-4-(2-cyclohexaneacryloyl)phenoxyacetic acid which after crystallization from benzene melts at 142–143° C.

*Analysis.*—Calculated for $C_{17}H_{19}ClO_4$: C, 63.28; H, 5.94; Cl, 10.89. Found: C, 63.01; H, 5.84; Cl, 10.80.

EXAMPLE 98

*2,3-dichloro-4-(2-cyclohexaneacryloyl)phenoxyacetic acid*

STEP A.—PREPARATION OF 2-CYCLOHEXYL-2',3'-DICHLORO-4'-HYDROXYACETOPHENONE

This product is prepared following substantially the same procedure described in Example 96 but using the following reactants:

| | |
|---|---|
| 2,3-dichloroanisole | 70.0 g., 0.395 mole. |
| Cyclohexaneacetyl chloride | 72.2 g., 0.45 mole. |
| Carbon disulfide | 250 ml. |
| Aluminum chloride | 26.67 g., 0.2 mole. |

There is thus obtained 60 g. of 2-cyclohexyl-2',3'-dichloro-4'-hydroxyacetophenone, M.P. 130–132° C.

STEP B.—PREPARATION OF 2,3-DICHLORO-4-(CYCLOHEXANEACETYL)PHENOXYACETIC ACID

By replacing in Example 57, Step B, the 4-(2-ethylbutyryl)-3-chlorophenol by an equimolecular quantity of 2-cyclohexyl-2',3'-dichloro-4'-hydroxyacetophenone and following substantially the same procedure described in Example 57, Step D, there is obtained 2,3-dichloro-4-(cyclohexaneacetyl)phenoxyacetic acid, M.P. 147–148° C.

*Analysis.*—Calculated for $C_{16}H_{18}Cl_2O_4$: C, 55.66; H, 5.26; Cl, 20.54. Found: C, 56.25; H, 5.18; Cl, 20.55.

STEP C.—PREPARATION OF 2,3-DICHLORO-4-(2-CYCLOHEXANEACRYLOYL)PHENOXYACETIC ACID

A mixture of 2,3-dichloro-4-(cyclohexaneacetyl)phenoxyacetic acid (8.6 g., 0.025 mole), paraformaldehyde (0.75 g., 0.025 mole), dimethylamine hydrochloride (2.02 g., 0.025 mole) and acetic acid (0.5 ml.) is heated at 80–90° C. for 18 hours. The syrupy product obtained is dissolved in hot 10% sodium bicarbonate solution and the hot solution then acidified with hydrochloric acid to give 8.5 g. of 2,3-dichloro-4-(2-cyclohexaneacryloyl)phenoxyacetic acid, which after crystallization from benzene gives 5.2 g. of product melting at 154–155° C.

*Analysis.*—Calculated for $C_{17}H_{18}Cl_2O_4$: C, 57.16; H, 5.07; Cl, 19.95. Found: C, 57.35; H, 4.95; Cl, 19.88.

EXAMPLE 99

*3-chloro-4-(2-phenylacryloyl)phenoxyacetic acid*

STEP A.—PREPARATION OF 3-CHLORO-4-PHENYLACETYLPHENOXYACETIC ACID

Phenylacetyl chloride (54.0 g., 0.35 mole) is reacted with 3-chloroanisole (42.8 g., 0.3 mole) in the presence of aluminum chloride (73.34 g., 0.6 mole) by substantially the same procedure described in Example 57, Step A, to give 2-phenyl-3'-chloro-4'-hydroxyacetophenone, B.P. 170–204° C. at 0.3 mm. pressure. This product is converted to 3-chloro-4-phenylacetylphenoxyacetic acid by treatment with ethyl bromoacetate by substantially the same method described in Example 57, Step B, thus producing 6.3 g. of 3-chloro-4-phenylacetylphenoxyacetic acid which after crystallization from benzene melts at 117–118° C.

*Analysis.*—Calculated for $C_{16}H_{13}ClO_4$: C, 61.83; H, 6.16; Cl, 11.41. Found: C, 61.79; H, 6.36; Cl, 11.27.

STEP B.—PREPARATION OF 3-CHLORO-4-(2-PHENYLACRYLOYL)PHENOXYACETIC ACID 3-chloro-4-phenylacetylphenoxyacetic acid (3.04 g., 0.01 mole) and piperidine (1.87 g., 0.022 mole) are dissolved in methanol (30 ml.) and 37% formaldehyde (1.5 ml.) is added. The mixture is kept at a temperature between about 25 to 30° C. for 1 hour and then boiled for 20 minutes, cooled, diluted with water, acidified with hydrochloric acid and then extracted with ether. The ether extract is extracted with sodium bicarbonate solution. Upon acidification of the bicarbonate extract with hydrochloric acid there is obtained 1.6 g. of 3-chloro-4-(2-phenylacryloyl)phenoxyacetic acid which after crystallization from benzene melts at 124–125° C.

*Analysis.*—Calculated for $C_{17}H_{13}ClO_4$: C, 64.47; H, 4.13; Cl, 11.19. Found: C, 64.27; H, 4.07; Cl, 11.07.

EXAMPLE 100

*3-methyl-4-(2-phenoxyacryloyl)phenoxyacetic acid*

STEP A.—PREPARATION OF 3-METHYL-4-CHLOROACETYLPHENOXYACETIC ACID

Aluminum chloride (80 g., 0.6 mole) is added portionwise over 1 hour to a mixture of 3-methylphenoxyacetic acid (33.3 g., 0.2 mole) and chloroacetyl chloride (22.6 g., 0.2 mole) in 300 ml. of carbon disulfide cooled in an ice bath. The mixture is stirred at room temperature for 1.5 hours and after 17 hours at room temperature the carbon disulfide is decanted. The granular complex obtained is added portionwise to a mixture of ice (500 g.) and hydrochloric acid (75 ml.). The solid which forms is collected on the filter, washed with water, air dried and recrystallized from benzene to give 3-methyl-4-chloroacetylphenoxyacetic acid, M.P. 118–120° C.

*Analysis.*—Calculated for $C_{11}H_{11}ClO_4$: C, 54.44; H, 4.57; Cl, 14.61. Found: C, 54.68; H, 4.66; Cl, 14.45.

STEP B.—PREPARATION OF 3-METHYL-4-PHENOXYACETYLPHENOXYACETIC ACID

A solution of 3-methyl-4-chloroacetylphenoxyacetic acid (2.4 g., 0.01 mole) and phenol (1.88 g.) in 50 ml. of water and 4 ml. of 20% aqueous sodium hydroxide is heated on the steam bath for 1 hour, cooled and acidified. The product obtained is crystallized from a mixture of benzene and petroleum ether to give 3-methyl-4-phenoxyacetylphenoxyacetic acid, M.P. 145–148° C.

*Analysis.*—Calculated for $C_{17}H_{16}O_5$: C, 68.08; H, 5.38. Found: C, 68.31; H, 5.57.

STEP C.—PREPARATION OF 3-METHYL-4-(2-PHENOXYACRYLOYL)PHENOXYACETIC ACID

A mixture of 3-methyl-4-phenoxyacetylphenoxyacetic acid (6.6 g., 0.022 mole), dimethylamine hydrochloride (1.8 g.), paraformaldehyde (1.5 g.), acetic acid (2 drops) and isopropyl alcohol (5 ml.) is heated on the steam bath for 2 hours. The mixture then is heated on the steam bath with 200 ml. of water and 25 ml. of saturated aqueous sodium bicarbonate for 5 minutes, cooled, acidified and extracted with benzene. The benzene extract is washed with water, dried over sodium sulfate, filtered and concentrated. The product is recrystallized from a mixture of benzene and petroleum ether to give 3-methyl-4-(2-phenoxyacryloyl)phenoxyacetic acid, M.P. 103–106° C.

*Analysis.*—Calculated for $C_{18}H_{16}O_5$: C, 69.25; H, 5.16. Found: C, 69.52; H, 5.32.

EXAMPLE 101

*3-methyl-4-(2-benzylmercaptoacryloyl)phenoxyacetic acid*

STEP A.—PREPARATION OF 3-METHYL-4-BENZYLMERCAPTOACETYLPHENOXYACETIC ACID 3-methyl-4-chloroacetylphenoxyacetic acid (2.4 g.), prepared as described in Example 100, Step A, is added to a solution of benzylmercaptan (2.5 ml.) in 50 ml. of ethanol and 4 ml. of 20% aqueous sodium hydroxide and heated under reflux for 15 minutes. The solution is cooled, poured into 100 ml. of water, acidified with hydrochloric acid and extracted with benzene. The benzene extract is washed with water, dried over sodium sulfate, filtered and concentrated. Recrystallization of the product thus obtained from a mixture of benzene and petroleum ether gives 3-methyl-4-benzylmercaptoacetylphenoxyacetic acid, M.P. 74–75° C.

*Analysis.*—Calculated for $C_{18}H_{18}O_4S$: S, 9.71. Found: S, 9.00.

STEP B.—PREPARATION OF 3-METHYL-4-(2-BENZYLMERCAPTOACRYLOYL)PHENOXYACETIC ACID

A mixture of 3-methyl-4-benzylmercaptoacetylphenoxyacetic acid (1.0 g.), dimethylamine hydrochloride (0.3 g.), paraformaldehyde (0.3 g.) and hydrochloric acid (1 drop) is heated on the steam bath for 15 minutes. The mixture is dissolved in 25 ml. of ethanol and 100 ml. of water and heated on the steam bath for 10 minutes with 50 ml. of saturated aqueous sodium bicarbonate. The solution is cooled, acidified with hydrochloric acid and the resulting product recrystallized from a mixture of benzene and petroleum ether to give 3-methyl-4-(2-benzylmercaptoacryloyl)phenoxyacetic acid, M.P. 112–113° C.

*Analysis.*—Calculated for $C_{19}H_{19}O_4S$: C, 66.46; H, 5.58; S, 9.34. Found: C, 66.18; H, 5.28; S, 9.16.

EXAMPLE 102

*3-methyl-4-(2-methylene-4-phenylmercaptobutyryl)phenoxyacetic acid*

STEP A.—PREPARATION OF 4-(4-CHLOROBUTYRYL)-3-METHYLPHENOXYACETIC ACID

Aluminum chloride (33.2 g., 0.2 mole) is added portionwise over 1 hour to a stirred mixture of 3-methylphenoxyacetic acid (33.2 g., 0.2 mole) and 4-chlorobutyryl chloride (28.2 g., 0.2 mole) in 300 ml. of carbon disulfide maintained at 25° C. After standing at room temperature for 24 hours, the carbon disulfide is decanted and the residual granular solid added portionwise to a mixture of 500 g. of ice and 75 ml. of concentrated hydrochloric acid. The product is extracted with ether and the ether extract washed with water, dried over sodium sulfate, filtered and evaporated to dryness on the steam bath. The residue is recrystallized from benzene to give 4-(4-chlorobutyryl)-3-methylphenoxyacetic acid, M.P. 86.5–88° C.

*Analysis.*—Calculated for $C_{13}H_{15}ClO_4$: C, 57.67; H, 5.59; Cl, 13.10. Found: C, 57.52; H, 5.76; Cl, 13.09.

STEP B.—PREPARATION OF 3-METHYL-4-(4-PHENYL-MERCAPTOBUTYRYL)PHENOXYACETIC ACID

A solution of 2.2 ml. of thiophenol in 50 ml. of ethanol containing 1.12 g. of potassium hydroxide and 2.6 g. of 4-(4-chlorobutyryl)-3-methylphenoxyacetic acid is heated on a steam bath for 30 minutes, cooled and poured into 60 ml. of water. The solution is acidified with hydrochloric acid and the resulting oil is extracted with ether. The ethereal extract is washed with water, dried over sodium sulfate, filtered and evaporated to dryness. The residue is recrystallized from carbon tetrachloride to give 3-methyl-4-(4-phenylmercaptobutyryl)phenoxyacetic acid, M.P. 60–62° C.

*Analysis.*—Calculated for $C_{19}H_{20}O_4S$: C, 66.20; H, 5.84. Found: C, 66.18; H, 5.64.

STEP C.—PREPARATION OF 3-METHYL-4-(2-DIMETHYLAMINOMETHYL - 4 - PHENYLMERCAPTOBUTYRYL)PHENOXYACETIC ACID HYDROCHLORIDE

A mixture of 1.5 g. of 3-methyl-4-(4-phenylmercaptobutyryl)phenoxyacetic acid, 0.42 g. of dimethylamine hydrochloride, 0.15 g. of paraformaldehyde and 5 ml. of acetic acid is heated at 100° C. for 1.5 hours. The residue is washed with ether and crystallized from a mixture of alcohol and ether to give 3-methyl-4-(2-dimethylaminomethyl-4-phenylmercaptobutyryl)phenoxyacetic acid hydrochloride, M.P. 161–162° C.

*Analysis.*—Calculated for $C_{22}H_{28}ClNO_4S$: C, 60.40; H, 6.44; N, 3.19. Found: C, 61.02; H, 6.98; N, 2.84.

STEP D.—PREPARATION OF 3-METHYL-4-(2-METHYLENE - 4 - PHENYLMERCAPTOBUTYRYL)PHENOXYACETIC ACID

A solution of 3-methyl-4-(2-dimethylaminomethyl-4-phenylmercaptobutyryl)phenoxyacetic acid hydrochloride (4.5 g.) in 200 ml. of water is heated on the steam bath for 30 minutes with 35 ml. of saturated sodium bicarbonate solution, cooled and acidified with hydrochloric acid. The product is extracted with benzene, the benzene extract washed with water, dried over sodium sulfate, filtered, concenerated and eluted with petroleum ether to give 3-methyl-4-(2-methylene-4-phenylmercaptobutylyl)phenoxyacetic acid, M.P. 81–83° C.

*Analysis.*—Calculated for $C_{20}H_{20}O_4S$: C, 67.40; H, 5.65; S, 8.98. Found: C, 67.61; H, 5.71; S, 9.16.

EXAMPLE 103

*3-methyl-4-(2-dimethylaminomethylacryloyl) phenoxyacetic acid hydrochloride*

STEP A.—PREPARATION OF 4-ACETYL-3-METHYL-PHENOXYACETIC ACID

By replacing in Example 100, Step A, the chloroacetyl chloride by an equimolecular quantity of acetyl chloride and following substantially the same procedure described in Example 100, Step A, there is obtained 4-acetyl-3-methylphenoxyacetic acid which after recrystallization from water melts at 180–182° C.

*Analysis.*—Calculated for $C_{11}H_{12}O_4$: C, 63.45; H, 5.81. Found: C, 63.18; H, 5.55.

STEP B.—PREPARATION OF 3-METHYL-4-(2-DIMETHYLAMINOMETHYLACRYLOYL)PHENOXYACETIC ACID HYDROCHLORIDE

A mixture of 4-acetyl-3-methylphenoxyacetic acid (4.1 g., 0.02 mole), dimethylamine hydrochloride (3.7 g., 0.045 mole), paraformaldehyde (2.3 g., 0.07 mole) and glacial acetic acid (10 ml.) is heated on the steam bath for 24 hours and concentrated to dryness in vacuo. The residue is recrystallized from aqueous isopropyl alcohol to give 3-methyl-4 - (2 - dimethylaminomethylacryloyl) phenoxyacetic acid hydrochloride, M.P. 199–202° C.

*Analysis.*—Calculated for $C_{15}H_{20}ClNO_4$: C, 57.43; H, 6.42; N, 4.46; Cl, 11.30. Found: C, 57.46; H, 6.51; N, 4.38; Cl, 11.06.

EXAMPLE 104

*Ethyl 3-methyl-4-[2-methylene-4-(4-morpholinyl) butyryl]phenoxyacetate*

STEP A.—PREPARATION OF ETHYL 3-METHYL-4-[4-(4-MORPHOLINYL)BUTYRYL]PHENOXYACETATE HYDROCHLORIDE

A solution of 3-methyl-4 - (4-chlorobutyryl)phenoxyacetic acid (5.4 g., 0.02 mole) prepared as described in Example 102, Step A, and morpholine (8.7 g., 0.1 mole) in 30 ml. of benzene and 50 mg. of potassium iodide, is heated under reflux for 24 hours, filtered and concentrated to dryness in vacuo. The residue is heated under reflux for 2 hours with 50 ml. of 30% alcoholic hydrogen chloride and the solution concentrated to dryness in vacuo. Aqueous sodium bicarbonate is added and the mixture is extracted with ether. The ethereal extract is washed with water, dried over sodium sulfate, filtered and evaporated to dryness on a steam bath. The residue is crystallized from alcoholic hydrogen chloride to give ethyl 3-methyl-4-[4-(4-morpholinyl)butyryl]phenoxyacetate hydrochloride, M.P. 131.5–134.5° C.

*Analysis.*—Calculated for $C_{19}H_{28}ClNO_5$: C, 59.14; H, 7.31; N, 3.63. Found: C, 58.92; H, 7.24; N, 3.59.

STEP B.—PREPARATION OF ETHYL 3-METHYL-4-[2-METHYLENE - 4 - (4 - MORPHOLINYL)BUTYRYL]PHENOXYACETATE

A mixture of ethyl 3-methyl-4 - [4-(4-morpholinyl) butyryl]phenoxyacetate hydrochloride (3.8 g., 0.01 mole), paraformaldehyde (0.35 g., 0.011 mole), dimethylamine hydrochloride (0.89 g., 0.011 mole) and glacial acetic acid (5 ml.) is heated on the steam bath for two hours and concentrated to dryness in vacuo. The residue is dissolved in 5 ml. of water and heated on the steam bath for 10 minutes with 35 ml. of a saturated solution of aqueous sodium bicarbonate and then cooled in an ice bath. The oil is extracted with ether and the ethereal extract then washed with water, dried over sodium sulfate, filtered and concentrated to dryness. The residue is distilled in vacuo at 0.05–0.1 mm. pressure to give ethyl 3-methyl-4-[2-methylene-4 - (4-morpholinyl)butyryl]phenoxyacetate as a pale yellow oil.

*Analysis.*—Calculated for $C_{20}H_{27}NO_5$: C, 66.46; H, 7.53; N, 3.88. Found: C, 66.13; H, 7.46; N, 3.72.

The hydrochloride salt of ethyl 3-methyl-4-[2-methylene-4-(4-morpholinyl)butyryl]phenoxyacetate melts at 160–162° C.

*Analysis.*—Calculated for $C_{20}H_{28}ClNO_5$: C, 60.37; H, 7.09; Cl, 8.91. Found: C, 60.12; H, 7.03; Cl, 8.86.

EXAMPLE 105

*3-methyl-4-(2-hydroxyacryloyl)phenoxyacetic acid*

The above product was prepared by the following two methods:

*Method A*

A solution of 3-methyl-4-(2-phenoxyacryloyl)phenoxyacetic acid (1.0 g.) prepared as described in Example 100, in 20 ml. of acetone and 5 ml. of 6 N hydrochloric acid is heated under reflux for 1.5 hours and then concentrated to dryness in vacuo. The residue is recrystallized from a mixture of benzene and petroleum ether to give 3-methyl-4-(2-hydroxyacryloyl)phenoxyacetic acid, M.P. 125–128° C.

*Analysis.*—Calculated for $C_{12}H_{12}O_5$: C, 61.05; H, 5.12. Found: C, 61.09; H, 5.26.

Method B

A mixture of 3-methyl-4-chloroacetylphenoxyacetic acid (2.8 g.) prepared as described in Example 100, Step A, dimethylamine hydrochloride (0.76 g.), and paraformaldehyde (0.3 g.) is heated on the steam bath for 40 minutes. Water (200 ml.) is added and the solution filtered, adjusted to pH 7.2 with sodium bicarbonate solution and heated at 95° C. for 5 minutes. The solution then is cooled, acidified with dilute hydrochloric acid and the product recrystallized from a mixture of benzene and petroleum ether to give 3-methyl-4-(2-hydroxyacryloyl)phenoxyacetic acid which was found to be identical with material prepared by Method A.

EXAMPLE 106

*4-chloro-6-[3-chloro-4-(2-methylacryloyl)phenoxyacetamido]1,3-benzenedisulfonamide*

A mixture of 3-chloro-4-(2-methylacryloyl)phenoxyacetic acid (4.2 g.), prepared as described in Example 2, benzene (50 ml.) and thionyl chloride (10 ml.) is heated on the steam bath for 3 hours and concentrated to dryness in vacuo. Traces of thionyl chloride are removed by repeatedly dissolving the residue in benzene and concentrating to dryness in vacuo. The thus obtained 3-chloro-4-(2-methylacryloyl)phenoxyacetyl chloride (2.4 g.), and 4-chloro-6-amino-1,3-benzenedisulfonamide (2.5 g.) in 60 ml. of dioxane is stirred at room temperature for 24 hours an then heated under reflux for 5 hours, concentrated to dryness in vacuo and the residue recrystallized from a mixture of alcohol and water to give 4-chloro-6-[3-chloro-4-(2-methylacryloyl)-phenoxyacetamido] - 1,3 - benzenedisulfonamide, M.P. 232–235° C.

*Analysis.*—Calculated for $C_{18}H_{17}Cl_2N_3O_7S_2$: N, 8.04. Found: N, 8.15.

EXAMPLE 107

*3-chloro-4-(3-methylacryloyl)phenoxyacetic acid*

STEP A.—PREPARATION OF 3-CHLORO-4-(3-CHLOROBUTYRYL)PHENOXYACETIC ACID

To a suspension of aluminum chloride (33.3 g., 0.25 mole) and 3-chlorophenoxyacetic acid (9.4 g., 0.05 mole), a solution of 3-chlorobutyryl chloride (7.75 g., 0.055 mole) in carbon disulfide (25 ml.) is added over 15 minutes at room temperature. The mixture is stirred at room temperature for 30 minutes and the carbon disulfide decanted. The residue is cooled in an ice bath and treated with 125 ml. of ice water and 25 ml. of concentrated hydrochloric acid. The product is extracted with ether, the ether extract washed with water, dried over sodium sulfate, filtered and evaporated to dryness on the steam bath. The residue is crystallized from a mixture of benzene and hexane to give 3-chloro-4-(3-chlorobutyryl)phenoxyacetic acid, M.P. 102.5–104° C.

*Analysis.*—Calculated for $C_{12}H_{12}Cl_2O_4$: C, 49.50; H, 4.16; Cl, 24.36. Found: C, 49.72; H, 4.31; Cl, 24.34.

STEP B.—PREPARATION OF 3-CHLORO-4-(3-METHYLACRYLOYL)PHENOXYACETIC ACID

A solution of 3-chloro-4-(3-chlorobutyryl)phenoxyacetic acid (1.5 g., 0.005 mole) in methanol (10 ml.) containing freshly fused potassium acetate (1.5 g., 0.015 mole) is allowed to stand at room temperature for five hours and then concentrated to dryness in vacuo at room temperature. The residue is dissolved in water, acidified with dilute hydrochloric acid and the product extracted with ether. The ethereal extract is washed with water, dried over sodium sulfate, filtered and evaporated to dryness on the steam bath. The residue is crystallized from a mixture of benzene and methylcyclohexane to give 3-chloro - 4 - (3 - methylacryloyl)phenoxyacetic acid, M.P. 117–119° C.

*Analysis.*—Calculated for $C_{12}H_{11}ClO_4$: C, 56.59; H, 4.36; Cl, 13.92. Found: C, 56.57; H, 4.54; Cl, 13.72.

EXAMPLE 108

*3-methyl-4-(3-methylacryloyl)phenoxyacetic acid*

To a mixture of 3-methylphenoxyacetic acid (16.6 g., 0.1 mole) and crotonyl chloride (10.5 g., 0.1 mole) in 150 ml. of carbon disulfide, cooled in an ice bath, aluminum chloride (40 g., 0.3 mole) is added portionwise over 45 minutes. The mixture is maintained at a temperature between 0–15° C. for 5 hours and then at room temperature for 18 hours. The yellow complex is collected on the filter and added portionwise to a mixture of ice (250 g.) and concentrated hydrochloric acid (50 ml.). The solid material produced is extracted with ether and the ethereal extract washed with water, dried over sodium sulfate, filtered and concentrated to dryness. The residue is crystallized from a mixture of benzene and methylcyclohexane to give 3-methyl-4-(3-methylacryloyl)phenoxyacetic acid, M.P. 85–87° C.

*Analysis.*—Calculated for $C_{13}H_{14}O_4$: C, 66.65; H, 6.02. Found: C, 66.28; H, 6.09.

EXAMPLE 109

*3-methyl-4-(2-bromo-3-methylacryloyl)-phenoxyacetic acid*

STEP A.—PREPARATION OF 3-METHYL-4-(2,3-DIBROMOBUTYRYL)PHENOXYACETIC ACID

A solution of bromine (3.2 g., 0.02 mole) in chloroform (25 ml.) is added dropwise over 30 minutes to a solution of 3-methyl-4-(3-methylacryloyl)phenoxyacetic acid (4.7 g., 0.02 mole), obtained as described in Example 109, in ether (50 ml.) cooled in an ice bath. After stirring for 45 minutes at room temperature, the solution is concentrated to dryness in vacuo and the residue is crystallized from a mixture of benzene and methylcyclohexane to give 3-methyl-4-(2,3-dibromobutyryl)phenoxyacetic acid, M.P. 119–121° C.

*Analysis.*—Calculated for $C_{13}H_{14}Br_2O_4$: C, 39.62; H, 3.58. Found: C, 40.35; H, 3.80.

STEP B.—PREPARATION OF 3-METHYL-4-(2-BROMO-3-METHYLACRYLOYL)PHENOXYACETIC ACID

A solution of 3-methyl-4-(2,3-dibromobutyryl)phenoxyacetic acid (3.9 g., 0.01 mole) in methanol (50 ml.) containing potassium acetate (3.0 g., 0.03 mole) is stirred at room temperature for 48 hours, filtered and concentrated to dryness in vacuo. The residue is dissolved in water, acidified with dilute hydrochloric acid and the product extracted with ether. The ethereal extract is washed with water, dried over sodium sulfate, filtered, concentrated and eluted with petroleum ether to give 3-methyl - 4 - (2 - bromo - 3 - methylacryloyl)phenoxyacetic acid, M.P. 137–140° C.

*Analysis.*—Calculated for $C_{13}H_{13}BrO_4$: C, 49.86; H, 4.18; Br, 25.52. Found: C, 50.35; H, 4.28; Br, 24.84.

EXAMPLE 110

*2,3-dichloro-4-(2-ethylidenebutyl)phenoxyacetic acid*

STEP A.—PREPARATION OF 2-ETHYL-2',3'-DICHLORO-4'-HYDROXYBUTYROPHENONE

This product is prepared following substantially the same procedure described in Example 83, Step A, using the following reagents:

2,3-dichloroanisole _____ 53.11 g., 0.3 mole.
2-ethylbutyryl chloride _____ 80.77 g., 0.6 mole.
Carbon disulfide _____ 350 ml.
Aluminum chloride _____ 80.00 g., 0.6 mole.

Distillation of the residual oil gives 34.45 g. (44%) of the product in the form of a liquid, B.P. 140–142° C. at 0.5 mm. pressure. After 3 recrystallizations from hexane, 2-ethyl-2',-3'-dichloro-4'-hydroxybutyrophenone is obtained in the form of white needles, M.P. 85–86° C.

*Analysis.*—Calculated for $C_{12}H_{14}Cl_2O_2$: C, 55.19; H, 5.40; Cl, 27.15. Found: C, 55.21; H, 5.64; Cl, 26.98.

STEP B.—PREPARATION OF 2,3-DICHLORO-4-(2-ETHYLBUTYRYL)PHENOXYACETIC ACID

A solution of sodium (2.53 g., 0.11 mole) in absolute ethanol (300 ml.) is treated first with 2-ethyl-2',3'-dichloro-4'-hydroxybutyrophenone (26.12 g., 0.1 mole) and then with ethyl bromoacetate (20.04 g., 0.12 mole) and the resulting clear solution is heated under reflux, with stirring, for 2 hours. Then aqueous 5% potassium hydroxide (11.22 g., 0.2 mole) is added and refluxing with stirring is continued for 1 hour longer. The alcohol is removed by distillation at atmospheric pressure and the boiling aqueous residue is made acid to Congo red test paper by the addition of concentrated hydrochloric acid. An oil separates which solidifies after cooling to room temperature. It is extracted with ether, the ethereal extract dried over anhydrous sodium sulfate, and the ether then is removed under reduced pressure to give 31.9 g. (100%) of 2,3-dichloro-4-(2-ethylbutyryl)phenoxyacetic acid in the form of a white solid, M.P. 128–139° C. One recrystallization from a mixture of benzene and cyclohexane gives 28.7 g. (90%) of the product in the form of needles, melting at 144.5–145.5° C.

Analysis.—Calculated for $C_{14}H_{16}Cl_2O_4$: C, 52.68; H, 5.05; Cl, 22.22. Found: C, 52.75; H, 5.00; Cl, 22.08.

STEP C.—PREPARATION OF 2,3 - DICHLORO - 4 - (2 - BROMO-2-ETHYLBUTYRYL)PHENOXYACETIC ACID

This product is prepared by substantially the same method described in Example 57, Step C, using the following reagents:

2,3-dichloro-4-(2-ethylbutyryl)phenoxyacetic acid _____ 19.26 g., 0.0603 mole.
Bromine _____ 9.64 g., 0.0603 mole.
Glacial acetic acid _____ 530 ml.

The above process gives 23.71 g. (99%) of 2,3-dichloro-4-(2-bromo-2-ethylbutyryl)phenoxyacetic acid in the form of a white solid, M.P. 151.5–152.5° C.

One recrystallizaiton from benzene gives the product in the form of white needles, M.P. 151.5–152.5° C.

Analysis.—Calculated for $C_{14}H_{15}BrCl_2O_4$: C, 42,24; H, 3.80; Cl, 17.81. Found: C, 42.53; H, 4.00; Cl, 17.73.

STEP D.—PREPARATION OF 2,3-DICHLORO-4-(2-ETHYLIDENEBUTYRYL)PHENOXYACETIC ACID

This product is prepared by substantially the same method described in Example 58 using the following reagents:

2,3-dichloro-4-(2-bromo-2-ethylbutyryl)phenoxyacetic acid _____ 19.91 g., 0.05 mole.
Lithium chloride _____ 6.36 g., 0.15 mole.
Dimethylformamide _____ 140 ml.

One recrystallization from a mixture of benzene and cyclohexane gives 14.52 g. (92%) of 2,3-dichloro-4-(2-ethylidenebutyryl)phenoxyacetic acid in the form of white needles, M.P. 124–125.5° C. A second recrystallization from the same solvent mixture does not change the melting point.

Analysis.—Calculated for $C_{14}H_{14}Cl_2O_4$: C, 53.02; H, 4.45; Cl, 22.36. Found: C, 53.28; H, 4.43; Cl, 22.34.

EXAMPLE 111

*4-(2-ethylidenebutyl)-2-methyl-3-chlorophenoxyacetic acid*

STEP A.—PREPARATION OF 2-ETHYL-2'-METHYL-3'-CHLORO-4'-HYDROXYBUTYROPHENONE

The above product is prepared following substantially the same procedure described in Example 57, Step A, using the following substances:

2-methyl-3-chloroanisole _____ 59 g. (0.38 mole).
Aluminum chloride _____ 101 g. (0.76 mole).
Carbon disulfide _____ 440 ml.
2-ethylbutyryl chloride _____ 102 g. (0.76 mole).
Heptane _____ 350 ml.

The crude product obtained as described by the above procedure is recrystallized from 400 ml. of methylcyclohexane to give 40.0 g. (44%) of 2-ethyl-2'-methyl-3'-chloro-4'-hydroxybutyrophenone which melts at 87–89° C.

Analysis.—Calculated for $C_{13}H_{17}ClO_2$: C, 64.86; H, 7.12; Cl, 14.73. Found: C, 65.01; H, 6.88; Cl, 14.40.

STEP B.—PREPARATION OF 4-(2-ETHYLBUTYRYL)-2-METHYL-3-CHLOROPHENOXYACETIC ACID

The above product is prepared following substantially the same procedure described in Example 73, Step B, using the following substances:

2-ethyl-2'-methyl-3'-chloro-4'-hydroxybutyrophenone _____ 36.0 g. (0.15 mole).
Chloroacetic acid _____ 28.3 g. (0.30 mole).
Sodium hydroxide _____ 24 g. (0.60 mole).
Water _____ 120 ml.

The crude product obtained as described by the above procedure is recrystallized from benzene (300 ml.) and cyclohexane (500 ml.) to give 20.0 g. (45%) of 4-(2-ethylbutyryl)2-methyl-3-chlorophenoxyacetic acid which melts at 143–144° C.

Analysis.—Calculated for $C_{15}H_{19}ClO_4$: C, 60.30; H, 6.41; Cl, 11.87. Found: C, 60.58; H, 6.46; Cl, 11.70.

STEP C.—PREPARATION OF 4-(2-BROMO-2-ETHYLBUTYRYL)-2-METHYL-3-CHLOROPHENOXYACETIC ACID

The above product is prepared following substantially the same procedure described in Example 57, Step C, using the following substances:

4 - (2 - ethylbutyryl)-2-methyl-3-chlorophenoxyacetic acid _____ 14.8 g. (0.06 mole).
Bromine _____ 9.63 g. (0.06 mole).
Glacial acetic acid _____ 350 ml.

The crude product (19.2 g., 85%) obtained as described by the above procedure is recrystallized from benzenz (100 ml.) and cyclohexane (350 ml.) to give 16.0 g. of 4-(2-bromo-2-ethylbutyryl)-2-methyl-3-chlorophenoxyacetic acid which melts at 136–137° C.

Analysis.—Calculated for $C_{15}H_{18}BrClO_4$: C, 47.70; H, 4.80; Br, 21.16. Found C, 48.12; H, 4.84; Br. 21.17.

STEP D.—PREPARATION OF 4-(2-ETHYLIDENEBUTYRYL)-2-METHYL-3-CHLOROPHENOXYACETIC ACID

The above product is prepared following substantially the same procedure described in Example 58 using the following substances:

4 - (2 - bromo - 2 - ethylbutyryl) - 2 - methyl -3 - chlorophenoxyacetic acid _____ 13.0 g. (0.345 mole).
Lithium chloride, anhydrous _____ 4.4 g. (0.104 mole).
Dimethylformamide _____ 90 ml.

The crude product (9.8 g., 96%) obtained as described by the above procedure is recrystallized from benzene (100 ml.) and cyclohexane (300 ml.) to give 9.0 of 4-(2-ethylidenebutyryl)-2-methyl-3-chlorophenoxyacetic acid which melts at 132.5–133.5° C.

Analysis.—Calculated for $C_{15}H_{17}ClO_4$: C, 60.71; H, 5.77; Cl, 11.95. Found: C, 60.76; H, 5.83; Cl, 11.83.

EXAMPLE 112

*4 - (2 - ethylidenebutyryl) - 2,3 - dimethylphenoxyacetic acid*

STEP A.—PREPARATION OF 4-(2-ETHYLBUTYRYL)-2,3-DIMETHYLPHENOXYACETIC ACID

The above product is prepared by substantially the same procedure as described in Example 1, Step A, using the following substances:

2,3-dimethylphenoxyacetic acid ____ 90 g. (0.50 mole).
2-ethylbutyryl chloride _____ 84 g. (0.62 mole).
Carbon disulfide _____ 400 ml.
Aluminum chloride _____ 217 g. (1.63 mole).

There is thus obtained 65 g. (47%) of 4-(2-ethyl-butyryl)-2,3-dimethylphenoxyacetic acid which, after recrystallization from methylcyclohexane, melts at 97–98° C.

*Analysis.*—Calculated for $C_{16}H_{22}O_4$: C, 69.04; H, 7.97. Found: C, 68.43; H, 8.07.

STEP B.—PREPARATION OF 4-(2-BROMO-2-ETHYLBUTYRYL)-2,3-DIMETHYLPHENOXYACETIC ACID

The above product is prepared by substantially the same procedure as described in Example 57, Step C, using the following substances:

4 - (2 - ethylbutyryl) - 2,3-di-
 methylphenoxyacetic acid ____ 10.4 g. (0.0374 mole).
Bromide _____ 6.0 g. (0.0374 mole).
Glacial acetic acid _____ 250 ml.

The product, 4 - (2 - bromo-2-ethylbutyryl)-2,3-dimethylphenoxyacetic acid, obtained by the above procedure (13.4 g., 100%), after recrystallization from 160 ml. of cyclohexane, melts at 117–118° C.

*Analysis.*—Calculated for $C_{16}H_{21}BrO_4$: C, 53.79; H, 5.93; Br, 22.37. Found: C, 53.46; H, 5.89; Br. 22.08.

STEP C.—PREPARATION OF 4-(2-ETHYLIDENEBUTYRYL)-2,3-DIMETHYLPHENOXYACETIC ACID

The above product is prepared following substantially the same procedure described in Examlpe 58 using the following substances:

4 - (2 - bromo - 2 - ethylbutyryl)-
 2,3-dimethylphenoxyacetic acid 8.15 g. (0.0228 mole).
Lithium chloride, anhydrous ____ 2.90 g. (0.0684 mole).
Dimethylformamide _____ 60 ml.

The product (6.0 g., 74%) obtained as described by the above procedure is recrystallized from 180 ml. of methylcyclohexane to give 5.0 g. of 4-(2-ethylidene-butyryl)-2,3-dimethylphenoxyacetic acid which melts at 103–104° C.

*Analysis.*—Calculated for $C_{16}H_{20}O_4$: C, 69.54; H, 7.30. Found: C, 69.57; H, 7.36.

EXAMPLE 113

*3 - chloro - 4 - (2 - propylidenepropionyl)phenoxyacetic acid*

STEP A.—PREPARATION OF 3-CHLORO-4-(2-METHYLVALERYL)PHENOXYACETIC ACID 3-chloro-4-(2-propylacryloyl)phenoxyacetic acid (8.7 g.) prepared as described in Example 34, is hydrogenated by substantially the same method described in Example 75, Step A, to give 4.8 g. of 3-chloro-4-(2-methylvaleryl)-phenoxyacetic acid, which after crystallization from benzene melts at 123–124.5° C.

*Analysis.*—Calculated for $C_{14}H_{17}ClO_4$: C, 59.05; H, 6.02. Found: C, 59.12; H, 5.94.

STEP B.—PREPARATION OF 3-CHLORO-4-(2-BROMO-2-METHYLVALERYL)PHENOXYACETIC ACID

The compound obtained in Step A (2.15 g., 0.0075 mole) is brominated by substantially the same procedure described in Example 74, Step C, to give 2.1 g. of 3-chloro - 4-(2-bromo-2-methylvaleryl)phenoxyacetic acid which after crystallization from a 2:1 mixture of cyclohexane and benzene melts at 115–117° C.

*Analysis.*—Calculated for $C_{14}H_{16}BrClO_4$: C, 46.23; H, 4.44; Br, 21.98; Cl, 9.75. Found: C, 46.08; H, 4.56; Br, 21.71; Cl, 9.67.

STEP C.—PREPARATION OF 3-CHLORO-4-(2-PROPYLIDENEPROPIONYL)PHENOXYACETIC ACID

The compound prepared in Step B (12.8 g., 0.0352 mole) is dehydrobrominated by substantially the same procedure described in Example 58, to give 2.2 g. of 3 - chloro - 4 - (2 - propylidenepropionyl)phenoxyacetic acid which after crystallization from a mixture of ether and ligroin melts at 96–97° C.

*Analysis.*—Calculated for $C_{14}H_{15}ClO_4$: C, 59.47; H, 5.35; Cl, 12.54. Found: C, 59.55; H, 5.52; Cl, 12.33.

EXAMPLE 114

*3-chloro-4-(2-propylidenevaleryl)phenoxyacetic acid*

STEP A.—PREPARATION OF 3'-CHLORO-4'-HYDROXY-2-PROPYLVALEROPHENONE

By replacing the 3-chlorophenetol and the 2-ethylbutyryl chloride employed in Example 57, Step A, by equimolecular quantities of 3-chloroanisole and 2-propylvaleryl chloride respectively and following substantially the same procedure described in Step A of Example 57, there is obtained 12.96 g. of 3'-chloro-4'-hydroxy-2-propylvalerophenone in the form of a viscous oil, B.P. 140° C. at 0.5 mm. pressure.

STEP B.—PREPARATION OF 3-CHLORO-4-(2-PROPYLVALERYL)PHENOXYACETIC ACID

The product obtained by the method described in Step A (13.21 g., 0.0518 mole) is added to a solution of sodium (1.19 g., 0.0518 g. atom) dissolved in absolute ethanol (100 ml.). The mixture is heated and stirred while ethyl bromoacetate (8.66 g., 0.0518 mole) is added over a period of 10 minutes. After heating for 6 hours on the steam bath, the ethanol is removed at reduced pressure and the residue treated with sodium hydroxide and worked up by substantially the same procedure described in Example 57, Step B, to give 7.7 g. of 3-chloro-4-(2-propylvaleryl)phenoxyacetic acid which after crystallization from benzene melts at 134–135° C.

*Analysis.*—Calculated for $C_{16}H_{21}ClO_4$: C, 61.44; H, 6.77; Cl, 11.33. Found: C, 61,56; H, 6.88; Cl, 11.14.

STEP C.—PREPARATION OF 3-CHLORO-4-(2-PROPYL-2-BROMOVALERYL)PHENOXYACETIC ACID

The compound obtained in Step B (7.2 g., 0.023 mole) is dissolved in acetic acid (100 ml.) and brominated by substantially the same procedure described in Example 57, Step C, to give 8.05 g. of 3-chloro-4-(2-propyl-2-bromovaleryl)phenoxyacetic acid which after crystallization from a 9:25 mixture of cyclohexane and benzene melts at 125–125.5° C.

*Analysis.*—Calculated for $C_{16}H_{20}BrClO_4$: C, 49.06; H, 5.15; Br, 20.40; Cl, 9.05. Found: C, 49.38; H, 5.12; Br, 20.25; Cl, 8.81.

STEP D.—PREPARATION OF 3-CHLORO-4-(2-PROPYLIDENEVALERYL)PHENOXYACETIC ACID

The bromo compound obtained as described in Step C (7 g., 0.02 mole) is dissolved in dimethylformamide (40 ml.) and lithium bromide (5.6 g., 0.064 mole) is added. The mixture is heated at 80–90° C. for 4 hours and then worked up by substantially the same procedure described in Example 58 to give 3 g. of 3-chloro-4-(2-propylidenevaleryl)phenoxyacetic acid which after crystallization from benzene melts at 114–114.5° C.

*Analysis.*—Calculated for $C_{16}H_{19}ClO_4$: C, 61.83; H, 6.16; Cl,11.53. Found: C, 61.89; H, 6.29; Cl, 11.39.

EXAMPLE 115

*3-chloro-4-senecioylphenoxyacetic acid*

3 - chloro - 4 - (2 - bromoisovaleryl)phenoxyacetic acid (12.3 g., 0.035 mole), prepared as described in Example 38, is added to a solution of trimethylamine (23.6 g., 0.4 mole) in absolute ethanol (150 ml.). The solution is sealed in a glass lined autoclave and heated at 80° C. for 18 hours. On cooling and opening the autoclave, the reaction mixture is found to be composed of a red-brown solution and a white crystalline precipitate of trimethylamine hydrobromide. The solid is removed by filtration and the filtrate concentrated to a small volume by evaporation on a steam bath. When the residue is added to water, there is formed a turbid solution of the trimethylamine salt of the product. Upon acidification with hydrochloric acid (6 N) a solid precipitate is formed and is collected by filtration and dissolved in dilute sodium bicarbonate. The solution is shaken with decolorizing charcoal, filtered and acidified with hydrochloric acid. The dark amber solid that separates (7.3 g., M.P. 120–130° C.) is crystallized from a mixture of cyclohexane (50 ml.) and benzene (70 ml.) and then from benzene to give 1.4 g. of 3-chloro-4-senecioylphenoxyacetic acid, M.P. 134–136° C.

*Analysis.*—Calculated for $C_{13}H_{17}ClO_4$: C, 58.11; H, 4.88; Cl, 13.20. Found: C, 57.69; H, 5.02; Cl, 13.40.

EXAMPLE 116

*3-chloro-4-(2-isopropylidenepropionyl)phenoxyacetic acid*

PREPARATION OF 3-CHLORO-4-(2-ISOPROPYLIDENE-PROPIONYL)PHENOXYACETIC ACID

The compound 4-(2-bromo-2-methylisovaleryl)-3-chlorophenoxyacetic acid (6.5 g., 0.018 mole), obtained by the method described in Example 37, is dissolved in dimethylformamide (40 ml.), lithium chloride (2.3 g., 0.054 mole) is added and the compound is dehydrobrominated by substantially the same procedure described in Example 58 to give 1.5 g. of 3-chloro-4-(2-isopropylidenepropionyl)phenoxyacetic acid which after repeated crystallizations from benzene melts at 144–146° C.

*Analysis.*—Calculated for $C_{14}H_{15}ClO_4$: C, 59.47; H, 5.35; Cl, 12.36. Found: C, 59.68; H, 5.43; Cl, 12.40.

EXAMPLE 117

*3 - chloro-4-(2-isopropylidenebutyryl)phenoxyacetic acid and 3-chloro-4-(2-ethylidene-3-methylbutyryl)phonoxyacetic acid*

STEP A.—PREPARATION OF 3′-CHLORO-4′-HYDROXY-2-ISOPROPYLBUTYROPHENONE

By replacing the cyclopentylacetyl chloride and the 2,3-dichloroanisole employed in Example 96, Step A, by equimolecular quantities of 2-isopropylbutyryl chloride and 3-chloroanisole respectively and following substantially the same procedure described in Example 97, Step A, an oil is obtained and is separted by extraction with ether. The ether extract is dried over sodium sulfate and the ether then evaporated and the residue distilled. The fraction boiling at 156–167° C. at 0.5 mm. pressure (15.8 g.) is collected. The product solidifies and after crystallization from cyclohexane gives 7.14 g. of 3′-chloro-4′-hydroxy-2-isopropylbutyrophenone, M.P. 75–77° C.

*Analysis.*—Calculated for $C_{13}H_{17}ClO_4$: C, 64.86; H, 7.12; Cl, 14.73. Found: C, 64.62; H. 6.93; Cl, 14.71.

STEP B.—PREPARATION OF 3-CHLORO-4-(2-ISOPROPYLBUTYRYL)PHENOXYACETIC ACID

By replacing the phenol used in Example 57, Step B, by an equimolecular quantity of 3′-chloro-4′-hydroxy-2-isopropylbutyrophenone and following substantially the same procedure described in Step B of Example 57 there is obtained 3-chloro-4-(2-isopropylbutyryl)phenoxyacetic acid which after crystallization from a mixture of benzene and hexane melts at 136–137° C.

*Analysis.*—Calculated for $C_{15}H_{19}ClO_4$: C, 60.30; H, 6.41; Cl, 11.87. Found: C, 60.00; H, 6.33; Cl. 11.75.

STEP C.—PREPARATION OF 3-CHLORO-4-(2-BROMO-2-ISOPROPYLBUTYRYL)PHENOXYACETIC ACID

The product obtained in Step B (6.61 g., 0.0221 mole) is brominated by substantially the same procedure described in Example 57, Step C, to give 4 g. of 3-chloro-4-(2-bromo-2-isopropylbutyryl)phenoxyacetic acid which after crystallization from a mixture of benzene and hexane melts at 126–127° C.

*Analysis.*—Calculated for $C_{15}H_{18}BrClO_4$: C, 47.70; H, 4.80; Br, 21.16; Cl, 9.39. Found: C, 47.77; H, 5.00; Br, 20.98; Cl, 9.31.

STEP D.—PREPARATION OF 3-CHLORO-4-(2-ISOPROPYLIDENEBUTYRYL)PHENOXYACETIC ACID AND PREPARATION OF 3-CHLORO-4-(2-ETHYLIDENE-3-METHYLBUTYRYL)PHENOXYACETIC ACID

The compound obtained as described in Step C (4 g., 0.0106 mole) in dimethylformamide (25 ml.) is dehydrobrominated by substantially the same procedure described in Example 58 to give a solid material melting at 91–94° C. The solid is extracted with 800 ml. of hot hexane in 4 portions. Upon combining and cooling, 1.2 g. of the above mixture of compounds is obtained in the form of colorless crystals, M.P. 95–97° C. Nuclear magnetic resonance spectra indicat that the product is essentially a 1:1 mixture of the title compounds.

*Analysis.*—Calculated for $C_{15}H_{17}ClO_4$: C, 60.70; H, 5.78; Cl, 11.95. Found: C, 60.56; H, 5.56; Cl, 12.07.

EXAMPLE 118

*3-chloro-4-(2-isobutylidenepropionyl)phenoxyacetic acid*

STEP A.—PREPARATION OF 3-CHLORO-4-(2-ISOBUTYLPROPIONYL)PHENOXYACETIC ACID 3-chloro-4-(2-methylene-4-methylvaleryl)phenoxyacetic acid (19.05 g., 0.0642 mole), prepared as described in Example 94, is hydrogenated by substantially the same procedure described in Example 75, Step A, to give 13.1 g. of 3-chloro-4-(2-isobutylpropionyl)phenoxyacetic acid which after crystallization from benzene melts at 127–128.5° C.

*Analysis.*—Calculated for $C_{15}H_{19}ClO_4$: C, 60.30; H, 6.41; Cl, 11.87. Found: C, 60.42; H, 6.39; Cl, 11.89.

STEP B.—PREPARATION OF 3-CHLORO-4-(2-BROMO-2-ISOBUTYLPROPIONYL)PHENOXYACETIC ACID

The compound obtained as described in Step A (12.1 g., 0.0405 mole) is brominated by substantially the same procedure described in Example 57, Step C, to give 14.4 g. of 3-chloro-4-(2-bromo-2-isobutylpropionyl)phenoxyacetic acid M.P. 115–116° C.

STEP C.—PREPARATION OF 3-CHLORO-4-(2-ISOBUTYLIDENEPROPIONYL)PHENOXYACETIC ACID

The bromo compound prepared as described in Step B above, (9.5 g., 0.25 mole) is dehydrobrominated by substantially the same procedure described in Example 58 to give 1.8 g. of 3-chloro-4-(2-isobutylidenepropionyl)phenoxyacetic acid which after crystallization from benzene melts at 123–124° C.

*Analysis.*—Calculated for $C_{15}H_{17}ClO_4$: C, 60.70; H, 5.78; Cl, 11.95. Found: C, 61.14; H, 6.00; Cl. 11.80.

EXAMPLE 119

*3-chloro-4-(2-bromo-3-phenylacryloyl)phenoxyacetic acid*

STEP A.—PREPARATION OF 3 - CHLORO - 4 - (2,3 - DIBROMO - 3 - PHENYLPROPIONYL)PHENOXYACETIC ACID 3-chloro-4-(3-phenylacryloyl)phenoxyacetic acid (23.8 g., 0.075 mole) prepared as described in Example 59 is dissolved in acetic acid (300 ml.) at 50° C. and bromine (12 g., 0.075 mole) in acetic acid (20 ml.) is added dropwise with stirring at 40–50° C. over a period of 30 minutes. The reaction mixture then is poured into water (1 liter) containing sodium bisulfite (1–2 g.). An unfilterable, voluminous white solid forms and is extracted with ether. The ether extract is washed with water and dried over sodium sulfate. A sample of the dried ether extract is evaporated to give a pale yellow solid, M.P. 157–158° C. after crystallization from benzene.

*Analysis.*—Calculated for $C_{17}H_{13}Br_2ClO_4$: C, 43.56; H, 2.74; Br, 33.47; Cl, 7.42. Found: C, 43.93; H, 2.87; Br, 32.79; Cl, 7.62.

STEP B.—PREPARATION OF 3-CHLORO-4-(2-BROMO-3-PHENYLACRYLOYL)PHENOXYACETIC ACID

Acetic acid (300 ml.) is added to the dried ether solution obtained in Step A. The mixture is heated on a steam bath in an open flask to evaporate the ether. The precipitate that first forms slowly dissolves. When the ether has completely evaporated, anhydrous potassium carbonate (18.8 g., 0.135 mole) is added cautiously. The mixture then is heated on a steam bath for five hours, cooled and poured into water (1 liter) and the pale yellow solid that forms is collected by filtration, washed with 1 liter of water in small portions and crystallized from a mixture of isopropyl alcohol and water to give 18 g. of 3-chloro-4-(2-bromo-3-phenylacryloyl)-phenoxyacetic acid, M.P. 159–160° C. A small sample, recrystallized twice more from a mixture of isopropyl alcohol and water, melts at 160–161° C.

*Analysis.*—Calculated for $C_{17}H_{12}BrClO_4$: C, 51.60; H, 3.05; Br, 20.19; Cl, 8.96. Found: C, 51.71; H, 3.22; Br, 19.98; Cl, 8.79.

EXAMPLE 120

*3-chloro-4-(2-hydroxy-3-phenylacryoyl)phenoxyacetic acid*

Potassium hydroxide (2.12 g., 0.0378 mole) is dissolved in 95% ethanol (50 ml.) and the insoluble, suspended potassium carbonate that forms is removed by filtration. 3-chloro-4-(2-bromo - 3 - phenylacryloyl)phenoxyacetic acid (5 g., 0.0126 mole) prepared as described in Example 120, is added to this solution and dissolved by shaking. After the mixture has been kept at 25–30° C. for 4 hours, the precipitated potassium bromide is removed by filtration and the filtrate heated on a steam bath for 7 minutes, cooled, poured into water and acidified with hydrochloric acid. A black gum separates. After storing at 25–30° C. for 16 hours, the gum becomes a semi-solid. The dark semi-solid is triturated with saturated sodium bicarbonate solution to give a black solution and a white solid, the sodium salt of the product. The solid is collected by filtration and the adhering dark colored film is removed by washing on the filter with a little saturated sodium bicarbonate solution. The colorless solid then is dissolved in hot water (200 ml.) and the solution cooled, filtered and acidified with 6 N hydrochloric acid. A colloidal white precipitate forms which is coagulated by heating for 1 hour on a steam bath, collected by filtration, dried at 65° C. and crystallized from benzene (40 ml.) to give 1.2 g. of 3-chloro-4-(2-hydroxy - 3 - phenylacryloyl)phenoxyacetic acid, M.P. 145–146 C. An additional crystallization from isopropyl alcohol raises the melting point 147–148° C.

*Analysis.*—Calculated for $C_{17}H_{13}ClO_5$: C, 61.37; H, 3.94; Cl, 10.66. Found: C, 61.50; H, 4.12; Cl, 10.50.

EXAMPLE 121

*1,1-dimethyl-2-[3-chloro-4-(2-methylenebutyryl)-phenoxyacetyl]hydrazine hydrochloride*

1,1-dimethylhydrazine (4.16 g., 0.0696 mole) is dissolved in ether (12 ml.) and added dropwise to an ether (12 ml.) solution of 3-chloro-4-(2-methylenebutyryl)-phenoxyacetyl chloride (10 g., 0.0348 mole), prepared from 3-chloro-4-(2-methylenebutyryl)phenoxyacetic acid and thionyl chloride as described in Example 51. The reaction is vigorous and a white solid precipitate of 1,1-dimethylhydrazine hydrochloride separates. Water (100 ml.) is added and the ether layer separated, washed with water and dried over sodium sulfate. After removal of the sodium sulfate, alcoholic hydrogen chloride (6 N, 2 ml.) is added. A yellow oil separates. The supernatant ether is decanted and to it is added more alcoholic hydrogen chloride (6 N, 3 ml.). The white solid (M.P. 139–140° C.) that separates is crystallized twice from a mixture of isopropyl alcohol and ether to give 2.3 g. of 1,1-dimethyl-2-[3-chloro-4-(2-methylene-butyryl)phenoxyacetyl]hydrazine hydrochloride, M.P. 141–144° C.

*Analysis.*—Calculated for $C_{15}H_{20}Cl_2N_2O_3$: C, 51.89; H, 5.81; N, 8.07. Found: C, 51.86; H, 5.70; N, 8.28.

The first crop of yellow oil obtained in the preceding example is triturated with ether and 6 N alcoholic hydrogen chloride (1 ml.) is added. A tan solid separates and after crystallization from a mixture of isopropyl alcohol and ether, an additional amount (2.69 g.) of less pure product is obtained, M.P. 138–142° C.

EXAMPLE 122

*2-[3-chloro-4-(2-methylenebutyryl)phenoxy]-ethoxyacetic acid*

STEP A.—PREPARATION OF 2-(3-CHLORO-4-BUTYRYLPHENOXY)ETHANOL

3′-chloro-4′-hydroxybutyrophenone (120.0 g., 0.604 mole) is added to a solution of potassium hydroxide (40.0 g., 0.604 mole) is absolute ethanol (250 ml). Ethylene chlorohydrin (48.0 g., 0.604 mole) is added to the resulting yellow solution, and the solution placed in a glass lined autoclave and heated at 150° C. for 6 hours. The sodium chloride that forms is removed by filtration and the filtrate evaporated at reduced pressure, poured into water (100 ml.) and extracted with ether. The ether extract is washed with 5% sodium hydroxide solution (three 60 ml. portions) and then with water and dried over sodium sulfate. The ether is removed by evaporation and the residue distilled, the fraction boiling at 156–170° C. at 0.6 mm. pressure being collected to give 118.5 g. of 2-(3-chloro-4-butyrylphenoxy)ethanol.

STEP B.—PREPARATION OF 2-(3-CHLORO-4-BUTYRYLPHENOXY)ETHOXYACETIC ACID

To a mixture of sodium hydride (53% in mineral oil; 5.92 g., 0.124 mole) in 1,2-dimethoxyethane (100 ml.) is added slowly 2-(3-chloro-4-butyrylphenoxy)ethanol (30.0 g., 0.124 mole) in 1,2-dimethoxyethane (50 ml.) The mixture is stirred for ½ hour and ethyl bromoacetate (20.6 g., 0.124 mole) then is added with stirring. The mixture is refluxed for 3 hours and the 1,2-dimethoxyethane then removed by evaporation. Sodium hydroxide (10.0 g., 0.25 mole) in water (50 ml.) is added to the residue and the mixture heated on a steam bath for 2.75 hours. After cooling, the mineral oil is extracted with ether and the residue is acidified with concentrated hydrochloric acid. The oil that separates is removed, washed with water, dissolved in ether and extracted with 10% sodium bicarbonate solution. The sodium bicarbonate solution then is acidified and the oil that forms is extracted with ether, the ether extract separated and dried over sodium sulfate. After removal of the ether by evaporation, the residue is distilled, the fraction boiling at 190–260° C. at 0.5 mm. pressure being collected to give 14.0 g. of 2-(3-chloro-4-butyrylphenoxy)ethoxyacetic acid.

STEP C.—PREPARATION OF 2-[3-CHLORO-4-(2-METHYLENEBUTYRYL)PHENOXY]ETHOXYACETIC ACID

A mixture of 2-(3-chloro-4-butyrylphenoxy)ethoxyacetic acid (8.65 g., 0.0287 mole), paraformaldehyde (0.9 g., 0.030 mole), dimethylamine hydrochloride (2.45 g., 0.030 mole) and acetic acid (1 ml.) is heated on a steam bath for 3.5 hours. The reaction mixture is added to water and then extracted with ether. The water solution (containing the hydrochloride salt of the Mannich base) is treated with solid sodium bicarbonate and heated at 80–90° C. for 50 minutes. After cooling, the solution is acidified with concentrated hydrochloric acid and extracted with ether. The ethereal extract is dried and the ether then removed by evaporation. Distillation of the residue gives a fraction boiling at 180–210° C. at 0.2 mm. pressure, yield 1.0 g. of 2-[3-chloro-4-(2-methylenebutyryl)phenoxy]ethoxyacetic acid.

*Analysis.*—Calculated for $C_{15}H_{17}ClO_5$: C, 57.60; H, 5.48; Cl, 11.34. Found: C, 57.64; H, 5.46; Cl, 11.42.

EXAMPLE 123

*3-methyl-4-(1-isopropylidene-2-methylbutyryl)-phenoxyacetic acid*

STEP A.—PREPARATION OF 2-ISOPROPYL-3,3′-DIMETHYL-4′-HYDROXYBUTYROPHENONE

To a stirred mixture of 3-methoxytoluene (24.43 g., 0.2 mole), 2-isopropyl-3-methylbutyryl chloride (32.53 g., 0.2 mole) and carbon disulfide (200 ml.) in a 1 liter flask equipped with a reflux condenser and stirrer, aluminum chloride (26.6 g., 0.2 mole) is added slowly with stirring at 10–20° C. by means of an Erlenmeyer flask attached by a Gooch sleeve to a neck of the reaction flask. The mixture then is boiled gently for 6½ hours and the carbon disulfide then removed by distillation. n-Heptane (100 ml.) and aluminum chloride (26.67 g.) then is added and the mixture refluxed for 7 hours, cooled and ice water (400 ml.) added cautiously with stirring and cooling in an ice bath. The mixture then is acidified with concentrated hydrochloric acid (40 ml.) and the organic components extracted with ether. The ether solution is washed with water and extracted with excess 10% sodium hydroxide in several portions. The basic extracts are combined and washed with ether and acidified with hydrochloric acid. The tan solid that separates (M.P. 114–119° C., 12.85 g.) is crystallized from benzene to give 9.67 g. of 2-isopropyl-3,3'-dimethyl-4'-hydroxybutyrophenone, M.P. 123–124.5° C.

*Analysis.*—Calculated for $C_{15}H_{22}O_2$: C, 76.88; H, 9.46. Found: C, 76.94; H, 9.29.

STEP B.—PREPARATION OF 3-METHYL-4-(2-ISOPROPYL-3-METHYLBUTYRYL)PHENOXYACETIC ACID

Sodium (0.816 g., 0.0355 g. atom) is dissolved in anhydrous ethanol (100 ml.) in a suitable apparatus and the product prepared in Step A (8.30 g., 0.0355 mole) added to the solution. The mixture is heated to boiling and ethyl bromoacetate (5.93 g., 0.0355 mole) added and the mixture heated for 4 hours. The alcohol then is evaporated and the residue heated at 80–90° C. with 10% sodium hydroxide (50 ml.) for 4 hours. The mixture is cooled, extracted with ether and acidified with hydrochloric acid and the solid that separates extracted with ether. The ether extract is separated, washed with water and dried over sodium sulfate, the ether evaporated and the residue crystallized from a mixture of benzene and cyclohexane to give 1.9 g. of 3-methyl-4-(2-isopropyl-3-methylbutyryl)phenoxyacetic acid, M.P. 95–95.5° C.

*Analysis.*—Calculated for $C_{17}H_{24}O_4$: C, 69.83; H, 8.27. Found: C, 70.03; H, 8.07.

STEP C.—PREPARATION OF 3-METHYL-4-(2-BROMO-2-ISOPROPYL - 3 - METHYLBUTYRYL)PHENOXYACETIC ACID

The product prepared in Step B (5 g., 0.017 mole) is dissolved in acetic acid (40 ml.) and the solution heated to 50° C. and a few drops of a solution of bromine (2.56 g., 0.016 mole) in acetic acid (20 ml.) is added. The bromine color persists for 30 minutes at which time 48% hydrobromic acid (½ ml.) is added and the red bromine color slowly disappears. The mixture is allowed to cool to 20–25° C. and about ½ of the remaining bromine solution is added during 30 minutes. After an additional 2 hours at 20–30° C., the reaction mixture, which again is pale yellow, is heated to 50° C. and the remainder of the bromine solution added over 30 minutes. The mixture is kept at 20–25° C. for 17 hours and then poured into water containing a little sodium bisulfite. The solid that separates is collected by filtration, washed well with water to give 6.3 g. of 3-methyl-4-(2-bromo-2-isopropyl-3-methylbutyryl)phenoxyacetic acid, M.P. about 140–141° C. with decomposition. Since the compound is unstable, it is used directly in the next step.

STEP D.—PREPARATION OF 3-METHYL-4-(1-ISOPROPYLIDENE - 2 - METHYLBUTYRYL)PHENOXYACETIC ACID

The bromo compound prepared in Step C (5.2 g., 0.0141 mole) and lithium bromide (3.59 g., 0.0411 mole) are placed in dimethylformamide (34 ml.) and heated at 80–90° C. for 5 hours. The mixture then is added to water and the solid that separates is collected and crystallized from a mixture of hexane and benzene with simultaneous decolorizing with activated carbon to give 1.8 g. of 3-methyl-4-(1-isopropylidene-2-methylbutyryl)phenoxyacetic acid, M.P. 110–112° C.

*Analysis.*—Calculated for $C_{17}H_{22}O_4$: C, 70.30; H, 7.63. Found: C, 70.44; H, 7.37.

EXAMPLE 124

2,3-tetramethylene-4-(2-methylenebutyryl)phenoxyacetic acid

STEP A.—PREPARATION OF 2,3-TETRAMETHYLENE-4-BUTYRYLPHENOXYACETIC ACID

2',3'-tetramethylene-4'-hydroxybutyrophenone (12.9 g., 0.06 mole) is dissolved in 400 ml. of warm isopropyl alcohol and then 0.075 mole of sodium hydride is added. To the resulting clear solution is added 12.5 g. (0.075 mole) of ethyl bromoacetate and the solution then is treated by substantially the same method as described in Example 54, Step C, to give 13.9 g. of 2,3-tetramethylene-4-butyrylphenoxyacetic acid, M.P. 100–104° C. Recrystallization from a mixture of benzene and hexane yields pure 2,3-tetramethylene-4-butyrylphenoxyacetic acid, M.P. 106–108° C.

*Analysis.*—Calculated for $C_{16}H_{20}O_4$: C, 69.54; H, 7.30. Found: C, 69.28; H, 7.19.

STEP B.—PREPARATION OF 2,3-TETRAMETHYLENE-4-(2 - DIMETHYLAMINOMETHYLBUTYRYL)PHENOXYACETIC ACID HYDROCHLORIDE

Paraformaldehyde (0.3 g., 0.01 mole), dimethylamine hydrochloride (0.66 g., 0.008 mole) and 2,3-tetramethylene-4-butyrylphenoxyacetic acid (2.0 g., 0.0072 mole) are mixed well in a 50 ml. flask and 10 drops of 6N ethanolic hydrogen chloride is added. The mixture is treated substantially as described in Example 3, Step B, to give an oil which when rubbed under isopropyl alcohol solidifies to yield 1.44 g. of 2,3-tetramethylene-4-(2-dimethylaminomethylbutyryl)phenoxyacetic acid hydrochloride, M.P. 162–166° C. Recrystallization from isopropyl alcohol raises the melting point to 179–183° C.

STEP C.—PREPARATION OF 2,3-TETRAMETHYLENE-4-(2-METHYLENEBUTYRYL)PHENOXYACETIC ACID 2,3-tetramethylene-4 - (2-dimethylaminomethylbutyryl) phenoxyacetic acid hydrochloride (1.1 g., 0.003 mole) is dissolved in 20 ml. warm water and adjusted to pH 8 with sodium bicarbonate solution. This clear solution is treated substantially as described in Example 3, Step C, to yield an oil which solidifies. Recrystallization of the solid product from n-butyl chloride produces 0.6 g. of pure 2,3-tetramethylene-4-(2-methylenebutyryl)phenoxyacetic acid, M.P. 89–91° C.

*Analysis.*—Calculated for $C_{17}H_{20}O_4$: C, 70.81; H, 6.99. Found: C, 70.54; H, 7.10.

EXAMPLE 125

2,3-trimethylene-4-(2-methylenebutyryl)phenoxyacetic acid

STEP A.—PREPARATION OF 2,3-TRIMETHYLENE-4-BUTYRYLPHENOXYACETIC ACID

By replacing the phenoxyacetic acid and the isobutyryl chloride employed in Example 1, Step A, by equimolecular quantities of 2,3-trimethylenephenoxyacetic acid and butyryl chloride respectively and following substantially the same procedure described in Example 1, Step A, there is obtained a white solid which is removed by filtration. Recrystallization of the solid from a mixture of benzene and hexane gives 2,3-trimethylene-4-butyrylphenoxyacetic acid, M.P. 116–118° C.

*Analysis.*—Calculated for $C_{15}H_{18}O_4$: C, 68.68; H, 6.92. Found: C, 68.49; H, 6.85.

STEP B.—PREPARATION OF 2,3 - TRIMETHYLENE - 4-(2 - DIMETHYLAMINOMETHYLBUTYRYL)PHENOXYACETIC ACID HYDROCHLORIDE

By replacing the 4-propionyl-3-chlorophenoxyacetic acid employed in Example 3, Step B, by an equimolecular quantity of 2,3-trimethylene-4-butyrylphenoxyacetic acid and following substantially the same procedure described in Example 3, Step B, there is obtained 2,3-trimethylene - 4-(2 - dimethylaminomethylbutyryl)phenoxyacetic acid hydrochloride, M.P. 170–171.5° C.

*Analysis.*—Calculated for $C_{18}H_{25}NO_4 \cdot HCl$: C, 60.75; H, 7.36. Found: C, 60.45; H, 7.35.

STEP C.—PREPARATION OF 2,3-TRIMETHYLENE-4-(2-METHYLENEBUTYRYL)PHENOXYACETIC ACID

The Mannich compound obtained as described in Step B is treated with an aqueous solution of sodium bicarbonate and then worked up by substantially the same procedures described in Example 3, Step C, to give 2,3-trimethylene-4 - (2 - methylenebutyryl)phenoxyacetic acid, M.P. 80–82° C.

*Analysis.*—Calculated for $C_{16}H_{18}O_4$: C, 70.05; H, 6.61. Found: C, 70.26; H, 6.82.

EXAMPLE 126

*3-methyl-4-[2-(1-piperidylmethyl)acryloyl]phenoxyacetic acid hydrochloride*

By replacing the dimethylamine hydrochloride in Example 104, Step B, by an equimolar amount of piperidine hydrochloride there is obtained 3-methyl-4-[2-(1-piperidylmethyl)acryloyl]phenoxyacetic acid hydrochloride.

EXAMPLE 127

*3-methyl-4-[2-(1-pyrrolidylmethyl)acryloyl]phenoxyacetic acid hydrochloride*

By replacing the dimethylamine hydrochloride in Example 104, Step B, by an equimolar amount of pyrrolidine hydrochloride, there is obtained 3-methyl-4-[2-(1-pyrrolidylmethyl)acryloyl]phenoxyacetic acid hydrochloride.

EXAMPLE 128

*3-methyl-4-{2-[1-(4-methyl)piperazinylmethyl]acryloyl}phenoxyacetic acid hydrochloride*

By replacing the dimethylamine hydrochloride in Example 104, Step B, by an equimolar amount of N-methylpiperazine hydrochloride, there is obtained 3-methyl-4-{2-[1-(4-methyl) - piperazinylmethyl]acryloyl}phenoxyacetic acid hydrochloride.

EXAMPLE 129

*3-methyl-4-(2-p-tolylmercaptoacryloyl)phenoxyacetic acid*

STEP A.—PREPARATION OF 3 - METHYL - 4 - p - TOLYLMERCAPTOACETYLPHENOXYACETIC ACID

To a cooled solution of 5.0 g. (0.02 m.) of p-methylthiophenol in 100 ml. of ethanol and 8 ml. of 20% aqueous sodium hydroxide, 4.8 g. (0.02 m.) of 3-methyl-4-chloroacetylphenoxyacetic acid is added. The mixture is heated under reflux for 30 minutes, cooled, poured into 150 ml. of water, acidified with hydrochloric acid and extracted with benzene. The benzene extract is washed with water, dried over sodium sulfate, filtered and concentrated. Crystallization of the product from a mixture of benzene and petroleum ether gives 3-methyl-4-p-tolylmercaptoacetylphenoxyacetic acid, M.P. 117–119° C.

*Analysis.*—Calculated for $C_{18}H_{18}O_4S$: C, 65.45; H, 5.49; S, 9.69. Found: C, 65.83; H, 5.49; S, 9.65.

STEP B.—PREPARATION OF 3-METHYL-4-(2-p-TOLYLMERCAPTOACRYLOYL)PHENOXYACETIC ACID

A mixture of 1 g. of 3-methyl-4-p-tolylmercaptoacetylphenoxyacetic acid, 1.0 g. of dimethylamine hydrochloride and 1.0 g. of paraformaldehyde is heated on the steam bath for 20 minutes with intermittent application of vacuum. The mixture is dissolved in 25 ml. of ethanol, added to 100 ml. of water and 50 ml. of sodium bicarbonate solution, filtered and acidified. The product is extracted with benzene, washed with water, dried over sodium sulfate, filtered and concentrated. Crystallization from a mixture of benzene and petroleum ether gives 3-methyl-4 - (2 - p - tolylmercaptoacryloyl)phenoxyacetic acid.

EXAMPLE 130

*3-chloro-4-[2-(4-methylcyclohexyl)acryloyl]phenoxyacetic acid*

STEP A.—PREPARATION OF 3-CHLORO-4-[2-(4-METHYLCYCLOHEXYL)ACETYL]PHENOXYACETIC ACID

By following substantially the same procedure described in Example 98, Step A, but substituting an equimolar amount of 4-methylcyclohexylacetyl chloride for the cyclohexylacetyl chloride there used there is obtained 3-chloro-4-[2-(4 - methylcyclohexyl)acetyl]phenoxyacetic acid.

STEP B.—PREPARATION OF 3-CHLORO-4-[2-(4-METHYLCYCLOHEXYL)ACRYLOYL]PHENOXYACETIC ACID

The reaction of the compound obtained in Step A with equimolar amounts of paraformaldehyde, dimethylamine hydrochloride and acetic acid according to the process of Example 34, Step B, and then treating the Mannich compound obtained with aqueous sodium bicarbonate by the method described in Example 34, Step C, there is obtained 3-chloro-4-[2-(4 - methylcyclohexyl)acryloyl]phenoxyacetic acid.

EXAMPLE 131

*3-chloro-4-[3-(4-methoxyphenyl)acryloyl]phenoxyacetic acid*

The above product is prepared by following substantially the same procedure described in Example 59 using an equimolar amount of 4-methoxybenzaldehyde in place of the benzaldehyde used in that example to give 3-chloro-4-[3-(4-methoxyphenyl)acryloyl]phenoxyacetic acid.

EXAMPLE 132

*3-chloro-4-[2-(3-isopropylbenzylidene)propionyl]phenoxyacetic acid*

This product is prepared following essentially the same procedure described in Example 61 employing an equimolar amount of 3-isopropylbenzaldehyde in place of the benzaldehyde used in that example to give 3-chloro-4-[2-(3-isopropylbenzylidene)propionyl]phenoxyacetic acid.

EXAMPLE 133

*3-chloro-4-[3-(2-methylthiophenyl)acryloyl]phenoxyacetic acid*

The above product is prepared following essentially the same procedure described in Example 59 using an equimolar amount of 2-methylthiobenzaldehyde in place of the benzaldehyde used in that example to give 3-chloro-4-[3-(2-methylthiophenyl)acryloyl]phenoxyacetic acid.

EXAMPLE 134

*3-chloro-4-[2-(4-chlorobenzyl)-acryloyl]phenoxyacetic acid*

STEP A.—PREPARATION OF 3-CHLORO-4-[3-(4-CHLOROPHENYL)ACRYLOYL]PHENOXYACETIC ACID

The above compound is prepared following essentially by the method described in Example 59 using an equimolar amount of 4-chlorobenzaldehyde in place of the benzaldehyde used in that example to give 3-chloro-4-[3-(4-chlorophenyl)acryloyl]phenoxyacetic acid.

STEP B.—PREPARATION OF 3-CHLORO-4-[3-(4-CHLOROPHENYL)PROPIONYL]PHENOXYACETIC ACID

The compound obtained in Step A is converted to 3-chloro - 4 - [3-(4-chlorophenyl)propionyl]phenoxyacetic acid by following essentially the same process described in Example 37, Step A.

STEP C.—PREPARATION OF 3-CHLORO-4-[2-(4-CHLOROBENZYL)ACRYLOYL]PHENOXYACETIC ACID

This compound is prepared following essentially the method of Example 75, Step B, using an equimolar amount of the compound prepared in Step B, above, in place of the 3-chloro-4-(3-phenylpropionyl)phenoxyacetic acid used in that example to give 3-chloro-4-[2-(4-chlorobenzyl)acryloyl]phenoxyacetic acid.

EXAMPLE 135

*3-chloro-4-[2-(4-propylbenzyl)acryloyl]phenoxyacetic acid*

STEP A.—PREPARATION OF 3-CHLORO-4-[3-(4-PROPYLPHENYL)ACRYLOYL]PHENOXYACETIC ACID

The above compound is prepared following essentially the same method described in Example 59 using an equimolar amount of 4-propylbenzaldehyde in place of the benzaldehyde used in that example to give 3-chloro-4-[3-(4-propylphenyl)acryloyl]phenoxyacetic acid.

STEP B.—PREPARATION OF 3-CHLORO-4-[3-(4-PROPYLPHENYL)PROPIONYL]PHENOXYACETIC ACID

The compound prepared in Step A is hydrogenated in essentially the same manner as described in Example 37, Step A to give 3-chloro-4-[3-(4-propylphenyl)propionyl]phenoxyacetic acid.

STEP C.—PREPARATION OF 3-CHLORO-4-[2-(4-PROPYLBENZYL)ACRYLOYL]PHENOXYACETIC ACID

The compound is prepared by following substantially the method of Example 75, Step B, using an equimolar amount of 3-chloro-4-[3-(4-propylphenyl)propionyl]phenoxyacetic acid in place of the 3-chloro-4-(3-phenylpropionyl)phenoxyacetic acid used in that example to give 3-chloro-4-[2-(4-propylbenzyl)acryloyl]phenoxyacetic acid.

EXAMPLE 136

*3-chloro-4-[2-(4-methoxybenzyl)acryloyl]phenoxyacetic acid*

STEP A.—PREPARATION OF 3-CHLORO-4-[3-(4-METHYLPHENYL)ACRYLOYL]PHENOXYACETIC ACID

The above compound is prepared by following essentially the method described in Example 59 using an equimolar amount of 4-methoxybenzaldehyde in place of the benzaldehyde used in that example to give 3-chloro-4-[3-(4-methoxyphenyl)acryloyl]phenoxyacetic acid.

STEP B.—PREPARATION OF 3-CHLORO-4-[3-(4-METHOXYPHENYL)PROPIONYL]PHENOXYACETIC ACID

The compound obtained in Step A is converted to 3-chloro-4-[3-(4-methoxyphenyl)propionyl]phenoxyacetic acid following essentially the same process described in Example 37, Step A.

STEP C.—PREPARATION OF 3-CHLORO-4-[2-(4-METHOXYBENZYL)ACRYLOYL]PHENOXYACETIC ACID

This compound is prepared following essentially the same method of Example 75, Step B, using an equimolar amount of 3-chloro-4-[3-(4-methoxyphenyl)propionyl]phenoxyacetic acid, in place of the 3-chloro-4-(3-phenylpropionyl)phenoxyacetic acid used in that example to give 3-chloro-4-[2-(4-methoxybenzyl)acryloyl]phenoxyacetic acid.

EXAMPLE 137

*2-{2-[3-chloro-4-(2-methylenebutyryl)phenoxy]ethylthio}-acetic acid*

STEP A.—PREPARATION OF 2-(3-CHLORO-4-BUTYRYLPHENOXY)ETHYL CHLORIDE 2-(3-chloro-4-butyrylphenoxy)ethanol prepared as is described in Example 123, Step A, is treated with thionyl chloride in pyridine solution to obtain 2-(3-chloro-4-butyrylphenoxy)ethyl chloride.

STEP B.—PREPARATION OF 2-[2-(3-CHLORO-4-BUTYRYLPHENOXY)ETHYLTHIO]ACETIC ACID 2-(3-chloro-4-butyrylphenoxy)ethyl chloride is heated with an aqueous-alcoholic solution of one equivalent of mercaptoacetic acid and two equivalents of sodium hydroxide. Acidification of the reaction mixture precipitates 2-[2-(3-chloro-4-butyrylphenoxy)ethylthio]acetic acid.

STEP C.—PREPARATION OF 2-{2-[3-CHLORO-4-(2-METHYLENEBUTYRYL)PHENOXY]ETHYLTHIO}ACETIC ACID

By replacing the 2-(3-chloro-4-butyrylphenoxy)ethoxyacetic acid of Example 123, Step C, with an equimolar quantity of 2-[2-(3-chloro-4-butyrylphenoxy)ethylthio]acetic acid and proceeding essentially as in Example 123, Step C, there is obtained 2-{-2-[3-chloro-4-(2-methylenebutyryl)phenoxy]ethylthio}acetic acid.

The following example illustrates an alternate method for the preparation of the compound prepared in Example 15.

EXAMPLE 138

*2,3-dichloro-4-(2-methylenebutyryl)phenoxyacetic acid*

STEP A.—PREPARATION OF 4-BUTYRYL-2,3-DICHLOROPHENOL

Butyryl chloride 128.0 g. (1.2 mole) and 2,3-dichloroanisole 197.7 g. (1.11 mole) are added to carbon disulfide 400 ml. in a 2-liter, 3-necked, round-bottomed flask equipped with a stirrer, reflux condenser [protected by a calcium chloride tube and a Gooch sleeve bearing a 250 ml. Erlenmeyer flask containing anhydrous aluminum chloride (160 g.)]. While the reaction mixture is cooled in an ice bath, aluminum chloride 160 g. (1.4 mole) is added in small portions with stirring at such a rate that the temperature of the reaction mixture does not exceed 20–25° C. The ice bath is removed and the mixture stirred at room temperature for 1 hour, then in a water bath at 55° C. for 45 minutes and then kept at room temperature overnight. n-heptane (400 ml.) and aluminum chloride (160 g.) are added, the condenser set for distillation, the mixture stirred and heated in a water bath, heated by means of a steam bath, and the carbon disulfide distilled. A second portion of heptane (400 ml.) is added, the condenser set for reflux, the reaction mixture stirred and heated in a bath at 80° C. for 3 hours and then allowed to cool. The heptane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted with two liters of 5% sodium hydroxide used in portions. The sodium hydroxide extract is stirred with decolorizing charcoal and filtered through Super-cel by suction. Upon acidification the light brown solid that separates, is collected by filtration, washed with water and dried at 100° C. for 3 hours. The dried solid is dissolved in hot benzene (1 liter) and the insoluble matter removed by filtration. Upon cooling, the slightly colored solid that separates is dissolved in hot benzene (750 ml.), the solution allowed to cool to room temperature and then chilled to 10° C. in a refrigerator to give 203 g. (85%) of 4-butyryl-2,3-dichlorophenol, M.P. 109–110.5° C., which is collected by filtration.

*Analysis.*—Calculated for: $C_{10}H_{10}Cl_2O_2$: C, 51.52; H, 4.32; Cl, 30.42. Found: C, 51.70; H, 4.24; Cl, 30.32.

STEP B.—PREPARATION OF ETHYL 4-BUTYRYL-2,3-DICHLOROPHENOXYACETATE

Glycol dimethyl ether [glyme] (100 ml.) is placed in a 1-liter, 4-necked round-bottomed flask equipped with a stirrer, reflux condenser (protected by a calcium chloride tube) and a dropping funnel. Sodium hydride 53% in mineral oil 10.3 g. (0.215 mole) then is added cautiously and the mixture stirred while a solution of 4-butyryl-2,3-dichlorophenol 50.0 g. (0.215 mole) in glyme (150 ml.) is added over a period of one-half hour. After frothing has subsided, ethyl bromoacetate 35.9 g. (0.215 mole) is added gradually with stirring. The mixture then is stirred and heated on a steam bath for 3½ hours, and most of the glyme then removed by distillation. Ether (400 ml.) and sufficient water to dissolve the precipitated sodium bromide are added. The ether layer is separated, washed with water and dried over sodium sulfate. The ether is evaporated and the residue distilled, and the portion boiling at 180°–195° C. at 0.5 mm. pressure collected. On standing, the distillate soon solidifies to a white solid, yielding 64 g. (95%) of ethyl 4-butyryl-2,3-dichlorophenoxyacetate, M.P. 53–54° C.

*Analysis.*—Calculated for $C_{14}H_{16}Cl_2O_4$: C, 52.68; H, 5.05; Cl, 22.22. Found: C, 52.79; H, 5.03; Cl, 22.07.

STEP C.—PREPARATION OF 4-BUTYRYL-2,3-DICHLOROPHENOXYACETIC ACID

Potassium hydroxide 1.32 g. (0.02 mole) is dissolved in absolute methanol 15 ml. and added to ethyl 4-butyryl-2,3-dichlorophenoxyacetate 3.0 g. (0.095 mole). The ester dissolves and at once a white solid separates. The solid (2.07 g.) is collected by filtration and dissolved in water. Upon acidification with hydrochloric acid, a white solid (M.P. 102–103° C.) separates. Crystallization from benzene yields 1.5 g. (54%) of 4-butyryl-2,3-dichlorophenoxyacetic acid, M.P. 100–101° C. After resolidifying the product melts at 110–111° C.

*Analysis.*—Calculated for $C_{12}H_{12}Cl_2O_4$: C, 49.51; H, 4.15; Cl, 24.36. Found: C, 49.40; H, 4.06; Cl, 24.44.

STEP D.—PREPARATION OF 2,3-DICHLORO-4-(2-METHYLENEBUTYRYL)PHENOXYACETIC ACID

The 4-butyryl-2,3-dichlorophenoxyacetic acid is converted to 2,3-dichloro-4-(2-methylenebutyryl)phenoxyacetic acid by substantially the same procedures described in Example 15, Steps B to C to give the product having the same melting point and analysis recited in Example 15, Step C.

The novel compounds of this invention are effective diuretic and/or saluretic agents. Because of this property, they are useful in therapy for the treatment of conditions resulting from an excessively high concentration of electrolyte in the body or an excessively high retention of fluid in the body such as in the treament of edematous conditions resulting, for example, from congestive heart failure.

It will be appreciated that the dosage of the novel compounds of this invention will vary over a wide range depending upon the age and weight of the patient to be treated, upon the particular ailment to be treated, and the relative potency of the selected diuretic agent. For these reasons, tablets, pills, capsules, and the like containing, for example, 25, 50, 100, 150, 250, 500 mg. or more of active ingredient can be made available for the symptomatic adjustment of the dosage to the individual patient. These dosages appear to be well below the toxic dose of the novel compounds of this invention as evidenced by the acute intravenous $LD_{50}$ in mice of one of the compounds falling within the scope of the invention, that is of compound 4-(2-methylenebutyryl)-3-chlorophenoxyacetic acid (the preparation of which is described in Example 10). The intravenous $LD_{50}$ in mice of this compound is found to be 316 mg./kg. and upon oral administration the $LD_{50}$ is 904 mg./kg. This compound also has been administered without any toxic manifestations to dogs at a dosage of 20 mg./kg. per day in three doses over a period of eight weeks. Similar acute toxicity data was observed when the product of Example 2 is administered to mice. The intravenous $LD_{50}$ of this compound, 4-methacryloyl-3-chlorophenoxyacetic acid, is 453 mg./kg.

As each of the compounds of this invention can be incorporated in a dosage form similar to that described in the following examples, or in other dosage forms suitable for oral or parenteral administration which can be prepared by well-known methods, only a few examples are included herein to illustrate the preparation of representative dosage forms.

EXAMPLE 140

*Dry-filled capsules containing 50 mg. of active ingredient per capsule*

| | Per capsule mg. |
|---|---|
| 4-(2-methylenebutyryl)-3-chlorophenoxyacetic acid | 50 |
| Lactose | 174 |
| Magnesium stearate | 1 |
| | 225 |

*Capsule Size No. 2.*—The 4-(2-methylenebutyryl)-3-chlorophenoxyacetic acid is reduced to a No. 60 powder, lactose then is passed through a No. 60 bolting cloth onto the powder and the combined ingredients are admixed for 10 minutes and then filled into No. 2 dry gelatin capsules.

Similar dry-filled capsules can be prepared by replacing the 4-(2-methylenebutyryl)-3-chlorophenoxyacetic acid by any of the other novel compounds of this invention such as, for example, replacing the active ingredient employed in Example 140 by 50 mg. of one or another of the following compounds:

| | Preparation described in: |
|---|---|
| 4 - methacryloyl - 3 - chlorophenoxyacetic acid | Example 2. |
| 2,3 - dichloro - 4 - (2 - methylenebutyryl) phenoxyacetic acid | Example 15. |
| 2,3 - dimethyl - 4 - (2 - methylenebutyryl) phenoxyacetic acid | Example 22. |
| 2 - methyl - 3 - chloro - 4 - (2 - methylenebutyryl)-phenoxyacetic acid | Example 33. |
| 4-[2 - (dimethylaminomethyl)propionyl] 3 - chlorophenoxyacetic acid Hydrochloride | Example 3, Step B. |
| 4 - [2 - (dimethylaminomethyl)butyryl] 3 - chlorophenoxyacetic acid Hydrochloride | Example 10, Step B. |
| 4 - (2 - bromopropionyl) - 3 - chlorophenoxyacetic acid | Example 6. |
| 3 - chloro - 4 - (2 - bromoisovaleryl)phenoxyacetic acid | Example 38. |

The following example illustrates a method by which a compressed tablet can be made containing one or another of the novel compounds of this invention as the active ingredient.

EXAMPLE 141

*Compressed tablet containing 50 mg. of active ingredient per tablet*

| | Per tablet mg. |
|---|---|
| 4 - (2 - methylenebutyryl) - 3 - chlorophenoxyacetic acid | 50 |
| Lactose U.S.P. No. 80 powder | 130 |
| Starch (as 12½% paste) | 6 |
| Add: | |
| Cornstarch | 3 |
| Magnesium stearate | 1 |
| | 190 |

The 4-(2-methylenebutyryl)-3-chlorophenoxyacetic acid and the lactose are mixed thoroughly and then granulated with the starch paste. While moist, the granulation is passed through a No. 14 screen and then dried at 45° C. in an oven. After thorough drying, the material is passed several times through a No. 14 screen and the cornstarch is passed through a No. 90 bolting cloth onto the granulation and blended, whereafter the magnesium stearate is passed through a No. 60 bolting cloth onto the granulation and thoroughly blended therewith. The material then is compressed into tablets, each weighing 190 mg. and containing 50 mg. of active ingredient per tablet.

The above formulation can be employed to prepare compressed tablets of the other novel compounds of this invention described hereinabove.

It is also contemplated to combine two or more of the compounds of this invention in a unit dosage form or to combine one or more of the compounds with other known diuretic agents, or hypotensive agents, or with other desired therapeutic and/or nutritive agents in dosage unit form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. A compound of the formula:

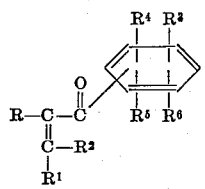

wherein A is a member selected from the group consisting of oxygen and sulfur; B is a member selected from the group consisting of alkylene, mononuclear arylene, alkyleneoxyalkyl and mononuclear alkylenearyl; at least one of R, $R^1$ and $R^2$ represents a group other than hydrogen wherein R, $R^1$ and $R^2$ each represents a member selected from the group consisting of hydrogen, hydroxy, halogen, trihalomethyl-lower alkyl, lower alkyl, carboxylower alkyl di-lower alkylaminomethyl, 1-pyrrolidylmethyl, 1-piperidylmethyl, 4-morpholinylethyl, 4-methylpiperazinylmethyl, lower alkylthio, lower cycloalkyl, mononuclear aryl halo substituted mononuclear aryl, hydroxy substituted mononuclear aryl, lower alkoxy substituted mononuclear aryl, lower alkylthio substituted mononuclear aryl nuclear alkoxy substituted mononuclear aralkyl, nuclear halo substituted mononuclear aralkyl, mononuclear aralkyl, mononuclear aralkylthio, mononuclear aryloxy, mononuclear arylthio, mononuclear arylthioalkyl and, taken together, the R and $R^1$ radicals may be joined, together with the carbon atoms to which they are attached, to form a cycloalkylidene ring containing 5 to 6 nuclear carbon atoms; $R^3$, $R^4$, $R^5$ and $R^6$ each represents a member selected from the group consisting of hydrogen, hydroxy, halogen, lower alkyl, lower alkoxy, mononuclear aryl, lower alkylthio, nitro, acetamido, amino and, taken together, with the nuclear carbon atoms to which they are attached the $R^3$ and $R^4$ radicals may be joined to form an alkylene chain containing from 3 to 4 carbon atoms between their points of attachment; and X is a member selected from the group consisting of hydroxyl, and alkali metal and alkaline earth metal salts thereof, alkoxyl, dialkylamino substituted alkoxyl, amino, an amino group of the formula $-NR^7R^8$ wherein $R^7$ and $R^8$ are similar or dissimilar members selected from the group consisting of alkyl, phenyl and, taken together with the nitrogen atom to which they are attached, an heterocyclic ring selected from morpholinyl, piperazinyl or pyrrolidyl, and hydrazino or hydrazino substituted by one or more alkyl groups.

2. A compound of the formula:

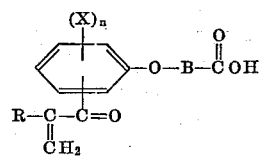

wherein B is lower alkylene, R is lower alkyl, X is halogen and $n$ is an integer having a value of 1–4.

3. A compound of the formula:

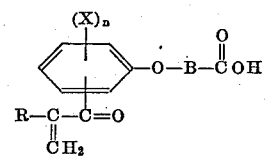

wherein B is lower alkylene, R is lower alkyl, X is lower alkyl and $n$ is an integer having a value of 1–4.

4. 4-chloro-3-methacryloylphenoxyacetic acid.

5. 2,4 - dimethyl - 5-(2 - methylenebutyryl)phenoxyacetic acid.

6. A compound of the formula:

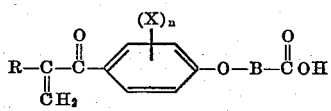

wherein B is lower alkylene, R is lower alkyl, X is halogen and $n$ is an integer having a value of 1–4.

7. A compound of the formula:

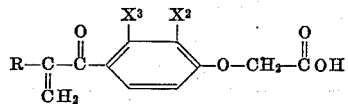

wherein R is lower alkyl and $X^2$ and $X^3$ are halogen.

8. A compound of the formula:

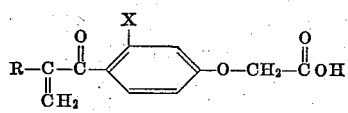

wherein R is lower alkyl and X is halogen.

9. 3 - chloro - 4 - methacryloylphenoxyacetic acid.

10. 3 - chloro - 4 - (2 - methylenebutyryl)phenoxyacetic acid.

11. 2,3 - dichloro - 4 - (2 - methylenebutyryl)phenoxyacetic acid.

12. A compound of the formula:

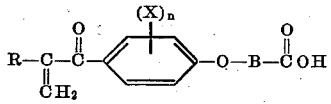

wherein B is lower alkylene, R is lower alkyl, X is lower alkyl and $n$ is an integer having a value of 1–2.

13. 3-methyl - 4 - (2-methylenebutyryl)phenoxyacetic acid.

14. 2,3-dimethyl - 4 - (2 - methylenebutyryl)phenoxyacetic acid.

15. A compound of the formula:

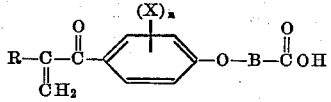

wherein B is lower alkylene, R is trihalomethyl substituted lower alkyl, X is lower alkyl and $n$ is an integer having a value of 1–2.

16. A compound of the formula:

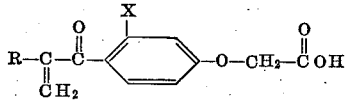

wherein R is trihalomethyl substituted lower alkyl and X is lower alkyl.

17. 3 - methyl - 4-(2 - methylene - 3 - trifluoromethyl-butyryl)phenoxyacetic acid.

18. A compound of the formula:

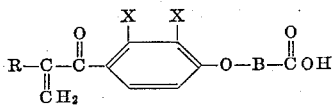

wherein B is lower alkylene, R is lower alkyl, one X is halogen and the remaining X is lower alkyl.

19. A compound of the formula:

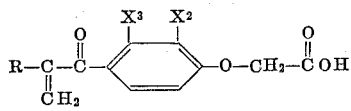

wherein R is lower alkyl, $X^2$ is halogen and $X^3$ is lower alkyl.

20. A compound of the formula:

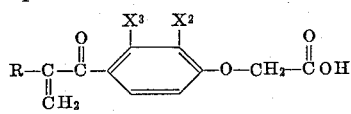

wherein R is lower alkyl, $X^2$ is lower alkyl and $X^3$ is halogen.

21. 2-methyl-3-chloro-4-(2-methylenebutyryl)phenoxyacetic acid.

22. 2-chloro - 3 - methyl-4-(2-methylenebutyryl)-phenoxyacetic acid.

23. A compound of the formula:

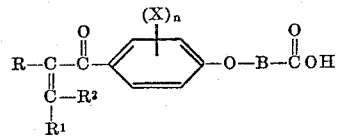

wherein B is lower alkylene, R, $R^1$ and $R^2$ are lower alkyl, X is halogen and $n$ is an integer having a value of 1–2.

24. A compound of the formula:

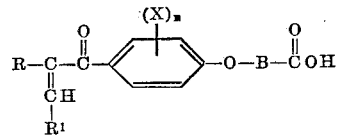

wherein B is lower alkylene, R and $R^1$ are lower alkyl, X is halogen and $n$ is an integer having a value of 1–2.

25. A compound of the formula:

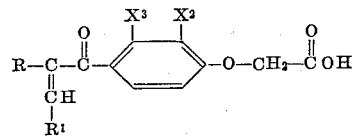

wherein R and $R^1$ are lower alkyl and $X^2$ and $X^3$ are halogen.

26. 2,3 - dichloro - 4 - (2 - ethylidenebutyryl)phenoxyacetic acid.

27. 4-(2 - ethylidenebutyryl) - 3 - chlorophenoxyacetic acid.

28. A compound of the formula:

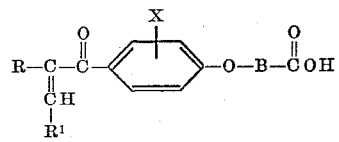

wherein B is lower alkylene, R is lower alkyl, $R^1$ is mononuclear aryl and X is halogen.

29. A compound of the formula:

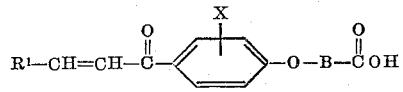

wherein B is lower alkylene, $R^1$ is mononuclear aryl and X is halogen.

30. 4 - (2 - benzylidenepropionyl) - 3 - chlorophenoxyacetic acid.

31. A compound of the formula:

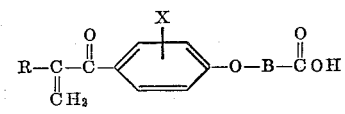

wherein B is lower alkylene, R is lower alkyl and X is lower alkoxy.

32. 3-methoxy - 4 - (2-methylenebutyryl)phenoxyacetic acid.

33. A compound of the formula:

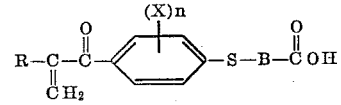

wherein B is lower alkylene, R is lower alkyl, X is halogen and $n$ is an integer having a value of 1–4.

34. A compound of the formula:

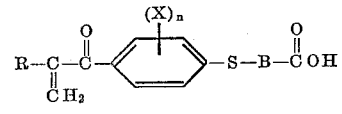

wherein B is lower alkylene, R is lower alkyl, X is lower alkyl and $n$ is an integer having a value of 1–4.

35. 3 - chloro - 4 - methacryloylphenylmercaptoacetic acid.

36. 3 - methyl - 4 - methacryloylphenylmercaptoacetic acid.

References Cited by the Examiner

UNITED STATES PATENTS 3,010,995  11/1961  Litvan et al. _____ 260—521 X
3,010,996  11/1961  Litvan et al. _____ 260—521 X

OTHER REFERENCES

Blicke, Organic Reactions, vol. I, pp. 304–390, 318, 319 (1960).

LORRAINE A. WEINBERGER, *Primary Examiner.*

CHARLES B. PARKER, LEON ZITVER, *Examiners.*

R. K. JACKSON, M. S. JAROSZ, S. B. WILLIAMS,
*Assistant Examiners.*

UNITED STATES PATENT OFFICE
CERTIFICATE OF CORRECTION

Patent No. 3,255,241                                  June 7, 1966

Everett M. Schultz et al.

It is hereby certified that error appears in the above numbered patent requiring correction and that the said Letters Patent should read as corrected below.

Column 32, line 10, strike out "$C_{14}H_{18}O_4$: C, 67.18; H, 7.25", and insert instead -- $C_{12}H_{16}O_2$: C, 74.97; H, 8.39 --; column 34, line 35, for "EXAMPLE 47" read -- EXAMPLE 48 --; column 36, line 51, for "50.1" read -- 50.01 --; line 55, for "MCl" read -- HCl --; column 58, line 20, strike out "3-chloro-4-(2-methylenebutyl)phenoxyacetic acid", and insert instead -- 3-chloro-4-(2-methylenebutyryl)-phenoxyacetic acid --; column 83, lines 46 and 47, strike out "1,1-dimethyl-2-[3-chloro-4-(2-methylenebutyryl)-phenoxyacetic]hydrazine hydrochloride", and insert instead -- 1,1-dimethyl-2-[3-chloro-4-methylenebutyryl)-phenoxyacetyl]hydrazine hydrochloride --; column 93, lines 25 to 35, the formula should appear as shown below instead of as in the patent:

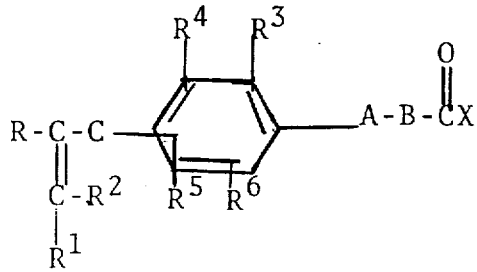

Signed and sealed this 5th day of September 1967.

(SEAL)
Attest:

ERNEST W. SWIDER                           EDWARD J. BRENNER
Attesting Officer                        Commissioner of Patents